United States Patent [19]
Nawata et al.

[11] Patent Number: 5,996,440
[45] Date of Patent: Dec. 7, 1999

[54] SUPPORTING STRUCTURE OF A PEDAL DEVICE FOR A VEHICLE

[75] Inventors: Katsumi Nawata, Susono; Masakazu Chiba, Numazu; Hiroshi Isono, Susono, all of Japan

[73] Assignee: Toyota Jidosha Kabushiki Kaisha, Toyota, Japan

[21] Appl. No.: 09/173,180

[22] Filed: Oct. 15, 1998

Related U.S. Application Data

[62] Division of application No. 08/702,190, Aug. 23, 1996.

[30] Foreign Application Priority Data

Aug. 31, 1995 [JP] Japan .................................. 7-223735
Apr. 30, 1996 [JP] Japan .................................. 8-109909

[51] Int. Cl.[6] .............................. G05G 1/14; B60K 28/14
[52] U.S. Cl. ................................ 74/512; 74/513; 74/560; 280/274
[58] Field of Search ........................... 74/512, 513, 514, 74/560, 562; 280/274, 275, 335

[56] References Cited

U.S. PATENT DOCUMENTS

| | | |
|---|---|---|
| 3,911,760 | 10/1975 | Elbers et al. . |
| 5,010,782 | 4/1991 | Asano et al. . |
| 5,078,024 | 1/1992 | Cicotte et al. . |
| 5,086,663 | 2/1992 | Asano et al. . |
| 5,460,061 | 10/1995 | Redding et al. . |
| 5,555,774 | 9/1996 | Lauring et al. . |
| 5,588,338 | 12/1996 | Carr et al. . |
| 5,615,749 | 4/1997 | Kato ........................................ 180/274 |
| 5,848,558 | 12/1998 | Isono et al. ............................... 74/512 |

FOREIGN PATENT DOCUMENTS

| | | |
|---|---|---|
| 2 437 337 | 4/1980 | France . |
| 92 17 184 U | 5/1994 | Germany . |
| 44 09 235 A1 | 10/1994 | Germany . |
| 44 09 285 A1 | 10/1994 | Germany . |
| 44 09 324 A1 | 10/1994 | Germany . |
| 63-54615 | 3/1988 | Japan . |
| 1-73464 | 5/1989 | Japan . |
| 2 031 814 | 4/1980 | United Kingdom . |

*Primary Examiner*—Vinh T. Luong
*Attorney, Agent, or Firm*—Oliff, Berridge, PLC

[57] ABSTRACT

A supporting structure of a pedal device for a vehicle includes a pedal bracket and a displacement controlling device. The pedal bracket is fixed to a vehicle body and supports a rotating shaft portion of a suspended-type pedal device for a vehicle. The displacement controlling device transmits an external force of a predetermined value or greater to the rotating shaft portion supported by the pedal bracket at a time when the external force is applied to a front portion of a vehicle, and controls displacement of a stepping surface of the pedal device such that the rotating shaft portion is moved substantially toward a rear of the vehicle.

2 Claims, 76 Drawing Sheets

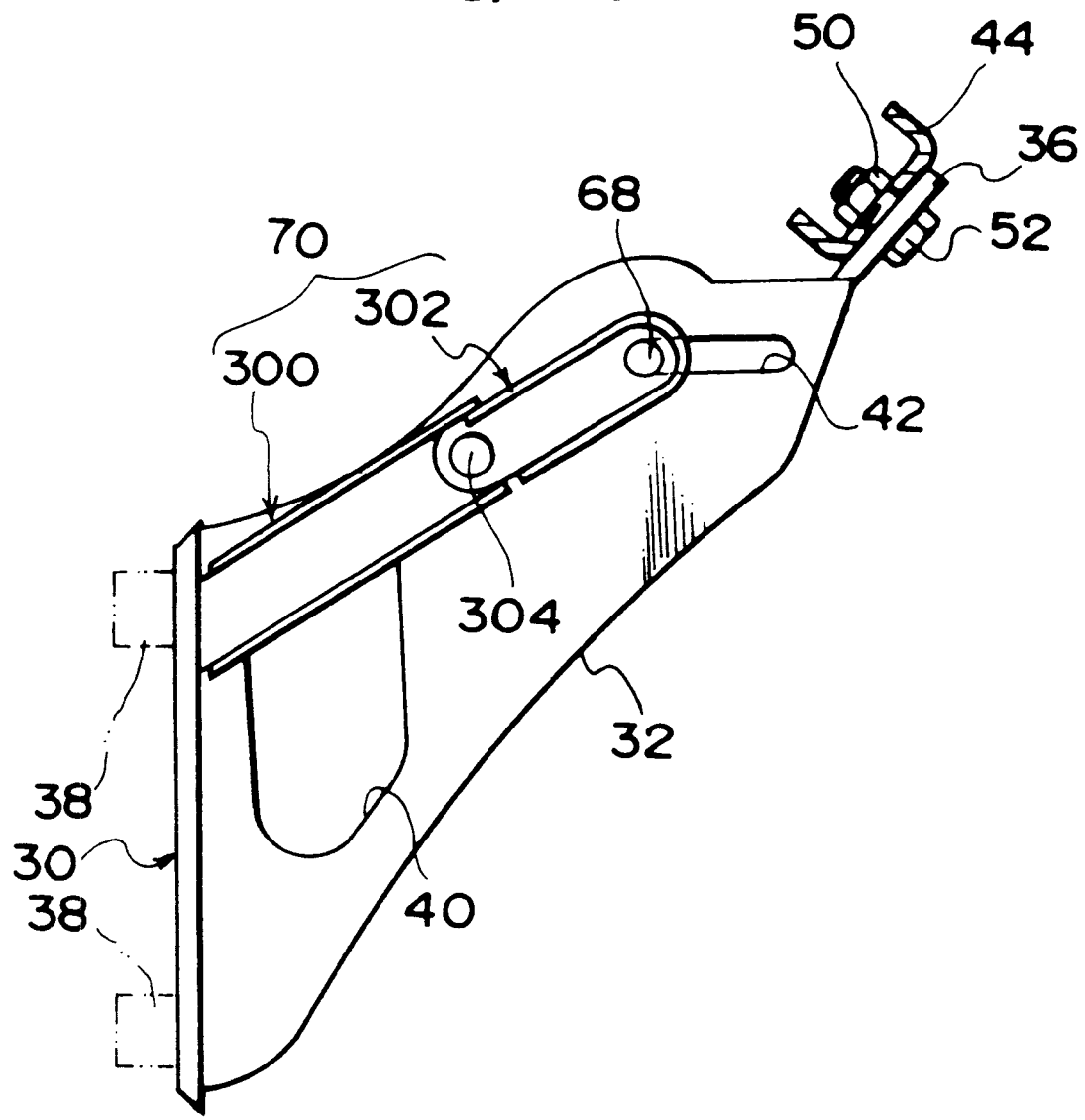

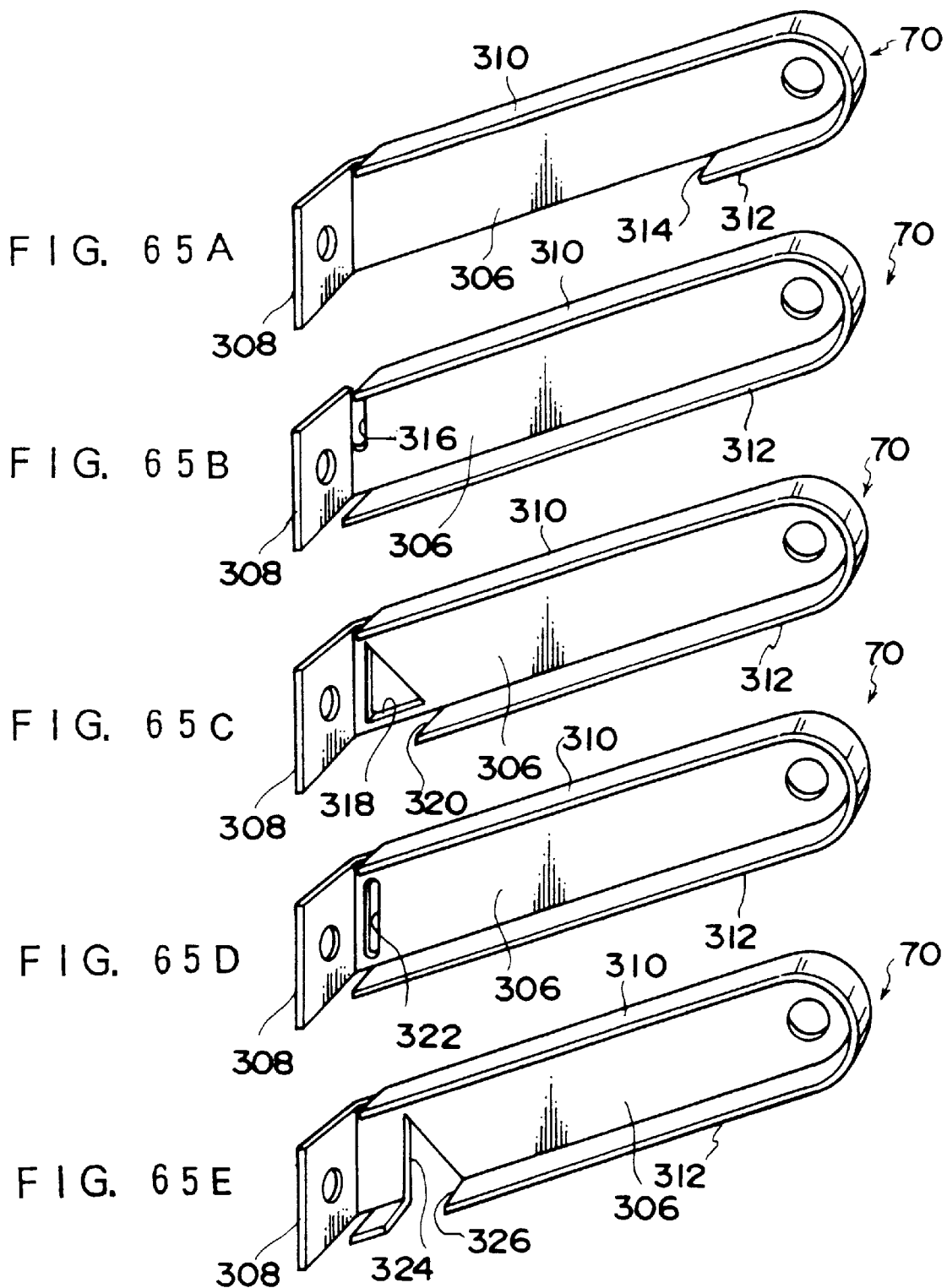

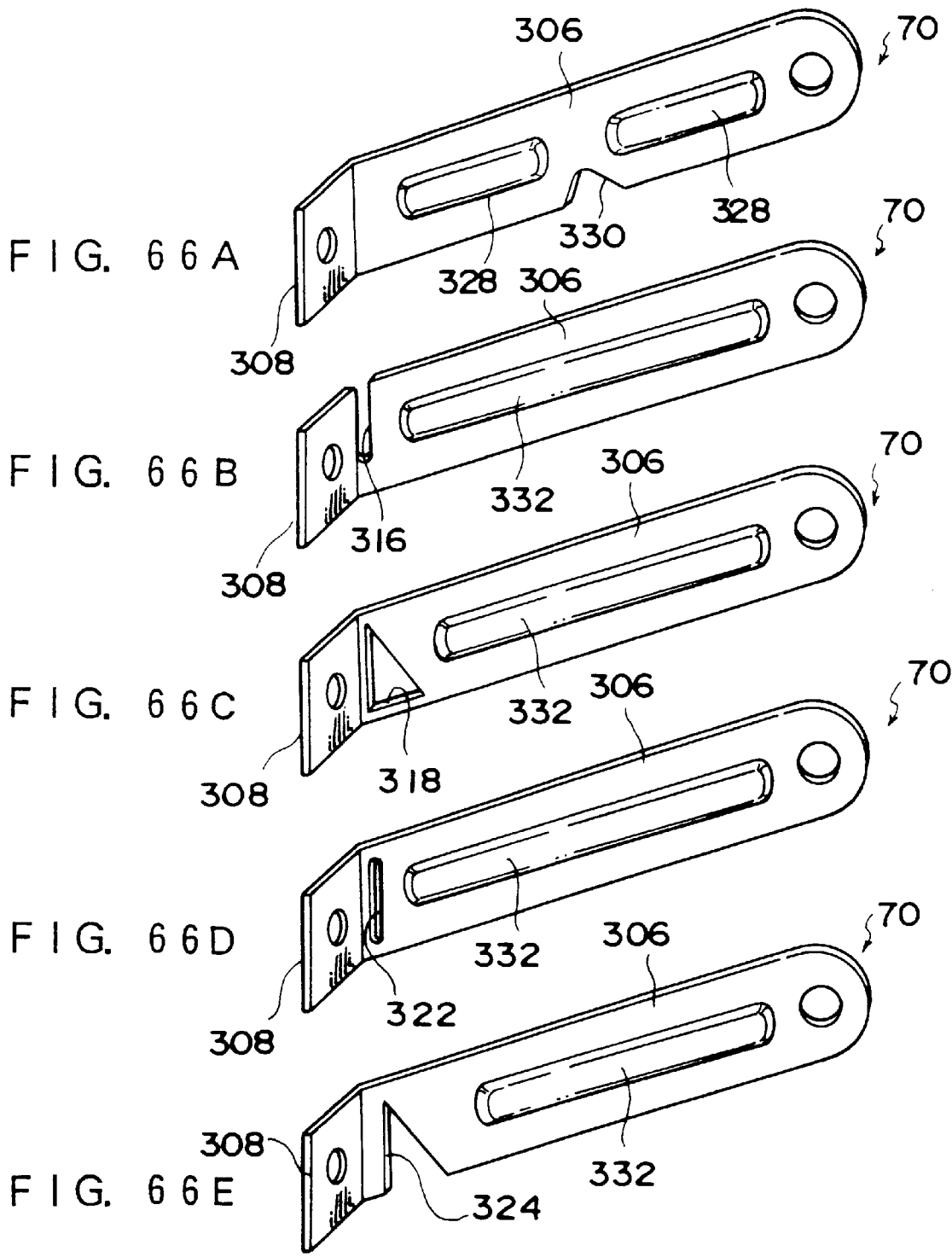

5,996,440

SUPPORTING STRUCTURE OF A PEDAL DEVICE FOR A VEHICLE

This is a Division of application Ser. No. 08/702,190 filed Aug. 23, 1996. The entire disclosure of the prior application is hereby incorporated by reference herein in its entirety.

FIELD OF THE INVENTION

The present invention relates to a supporting structure of a pedal device for a vehicle.

DESCRIPTION OF THE RELATED ART

Various conventional structures have been devised as countermeasures at the time an external force of a predetermined value or greater is applied from the front of a vehicle. For example, DE 4409235 A1, DE 4409285 A1, and DE 4409324 A1 disclose moving a rotating shaft, around which a pedal rotates, away from a pedal bracket. The structure disclosed in Japanese Utility Model Application Laid-Open (JP-U) No. 1-73464 will be described hereinafter as an example of such countermeasures.

As illustrated in FIG. 77, in the structure disclosed in JP-U No. 1-73464, a steering column 402 which covers a steering shaft 400 is supported at a vehicle body by a tilt bracket 408, which is formed from an upper plate member 404 and a pair of side plate members 406, and by a shaft 410, which passes through the side plate members 406 and supports the bottom end of the steering column 402.

A knee protector 412, which is shaped as a substantially circular arc shaped surface and is elastically deformable, is disposed at the lower side of the tilt bracket 408. The knee protector 412 is elastically supported at the lower side of the steering column 402 via elastically deformable stays 414.

In accordance with the above structure, when an external force of a predetermined value or greater is applied from the front of the vehicle, the vehicle occupant starts to initially move toward the front of the vehicle, and accordingly, the knees of the vehicle occupant start to inertially move in the same direction while the knees of the vehicle occupant are bent as the starting point of bending. Therefore, if the knee protector 412 were not provided, the driver's knees might contact the tilt bracket 408. However, if the knee protector 412 is disposed beneath the tilt bracket 408 as described above, the driver's knees only contact the knee protector 412.

This structure in which the knee protector 412 is provided is useful as a countermeasure at the time that an external force of a predetermined value or greater is applied from the front of the vehicle. However, countermeasures for protecting the legs of the vehicle occupant can also be studied from other points of view.

The present inventors conceived of the idea of the present invention from this standpoint, conducted various experiments and arrived upon extremely effective countermeasures which control the displacement of a pedal device for a vehicle such as a brake pedal at the time that an external force of a predetermined value or greater is applied from the front of the vehicle, by focusing on the deformation and the displacement behavior of the body panel and the like at the time such an external force is applied.

SUMMARY OF THE INVENTION

In view of the aforementioned, an object of the present invention is to provide a supporting structure of a pedal device for a vehicle which can control the displacement of a stepping surface of a pedal device for a vehicle at the time that an external force of a predetermined value or greater is applied from the front of the vehicle.

A first aspect of the present invention is a supporting structure of a pedal device for a vehicle comprising: a pedal bracket fixed to a vehicle body and supporting a rotating shaft portion of a suspended-type pedal device for a vehicle; and displacement controlling means for transmitting an external force of a predetermined value or greater to the rotating shaft portion supported by the pedal bracket at the time when the external force is applied to a front portion of a vehicle, and controlling displacement of a stepping surface of the pedal device such that the rotating shaft portion is moved substantially toward a rear of the vehicle.

A second aspect of the present invention is a supporting structure of a pedal device for a vehicle comprising: a pedal bracket fixed to a vehicle body and supporting a rotating shaft portion of a suspended-type pedal device for a vehicle; external force detecting means for detecting an external force applied to a front portion of a vehicle; amount of movement determining means for determining an amount of movement of the rotating shaft portion of the pedal device on the basis of results of detection by the external force detecting means; and displacement controlling means for, on the basis of results of determination by the amount of movement determining means, controlling displacement of a stepping surface of the pedal device such that the rotating shaft portion is moved substantially toward a rear of the vehicle.

A third aspect of the present invention is a supporting structure of a pedal device for a vehicle comprising: a pedal bracket fixed to a vehicle body and supporting a rotating shaft portion of a suspended-type pedal device for a vehicle; a swinging link supported at the pedal bracket so as to be swingable around the rotating shaft portion, one end portion of the swinging link being connected to an operational force transmitting means which transmits, to a stepping force augmenting means, stepping force applied to a stepping surface of the pedal device; linking means for transmitting, to the operational force transmitting means, rotational force substantially toward a front of a vehicle around a central axis of rotation of the pedal device by linking another end portion of the swinging link with an end portion of the pedal device at a side opposite the stepping surface of the pedal device; and displacement controlling means for transmitting to a rotating shaft portion of the swinging link external force of a predetermined value or greater at the time when the external force is applied to a front portion of the vehicle, and controlling displacement of the stepping surface of the pedal device via the linking means such that the rotating shaft portion of the swinging link is moved substantially toward a rear of the vehicle.

A fourth aspect of the present invention is a supporting structure of a pedal device for a vehicle comprising: a pedal bracket fixed to a vehicle body and supporting a rotating shaft portion of a suspended-type pedal device for a vehicle; a swinging link supported at the pedal bracket so as to be swingable around the rotating shaft portion, one end portion of the swinging link being connected to an operational force transmitting means which transmits, to a stepping force augmenting means, stepping force applied to a stepping surface of the pedal device, and another end portion of the swinging link being relatively rotatably connected one of directly and indirectly to an end portion of the pedal device at a side opposite the stepping surface of the pedal device, so that the swinging link transmits, to the operational force transmitting means, rotational force substantially toward a front of a vehicle around the rotating shaft portion of the pedal device; and displacement controlling means for controlling displacement of the stepping surface of the pedal device by absorbing rotational force which is of a predetermined value or greater and which is substantially toward a rear of the vehicle around a central axis of rotation of the pedal device and which is applied to the pedal device via the swinging link at the time when an external force of a predetermined value or greater is applied to a front portion of the vehicle.

A fifth aspect of the present invention is a supporting structure of a pedal device for a vehicle in which, in any of the first through the third aspects, the displacement controlling means has: connecting means for connecting the rotating shaft portion and a load receiving portion which is disposed further toward a front of the vehicle than the pedal device and which is displaced substantially toward the rear of the vehicle by receiving external force of a predetermined value or greater applied to the front portion of the vehicle, a rigidity of the connecting means in a longitudinal direction of the vehicle being set higher than a rigidity of the pedal bracket in the longitudinal direction of the vehicle; and guiding means, provided at the pedal bracket, for guiding movement of the rotating shaft portion substantially toward the rear of the vehicle.

A sixth aspect of the present invention is a supporting structure of a pedal device for a vehicle in which the fifth aspect further comprises hinge means for joining the connecting means and the load receiving portion such that the connecting means and the load receiving portion are rotatable relative to one another.

A seventh aspect of the present invention is a supporting structure of a pedal device for a vehicle in which, in the fifth aspect, the load receiving portion is disposed further toward the front of the vehicle than a dash panel of the vehicle.

An eighth aspect of the present invention is a supporting structure of a pedal device for a vehicle in which, in the fifth aspect, the pedal bracket has a pair of side wall portions which buckles substantially in the longitudinal direction of the vehicle when an external force of a predetermined value or greater is applied to the front portion of the vehicle, and the connecting means is disposed at outer sides of the pair of side wall portions, and deforming portions, which deform the pair of side wall portions toward an inner side of the pair of side wall portions when the external force is applied, are provided at the pair of side wall portions.

A ninth aspect of the present invention is a supporting structure of a pedal device for a vehicle in which, in the eighth aspect, the deforming portions are disposed such that positions of the deforming portions are offset relative to one another in the longitudinal direction of the vehicle.

A tenth aspect of the present invention is a supporting structure of a pedal device for a vehicle in which, in the fifth aspect, the pedal bracket has a pair of side wall portions which buckles substantially in the longitudinal direction of the vehicle when an external force of a predetermined value or greater is applied to the front portion of the vehicle, and the connecting means is disposed at an inner side of the pair of side wall portions.

An eleventh aspect of the present invention is a supporting structure of a pedal device for a vehicle in which, in the tenth aspect, the connecting means is formed so as to be joined to the load receiving portion at one place and so as to be joined to the rotating shaft portion at a plurality of places.

A twelfth aspect of the present invention is a supporting structure of a pedal device for a vehicle in which, in the eleventh aspect, a region at which the connecting means is joined to the load receiving portion is disposed at an inner side of the pedal bracket and is offset toward an outer side of the vehicle.

A thirteenth aspect of the present invention is a supporting structure of a pedal device for a vehicle in which, in the fifth aspect, the connecting means has a bending means which is provided such that a longitudinal direction portion of the connecting means in a vicinity of the rotating shaft portion bends in a guiding direction of the guiding means due to application of a load of a predetermined value or greater.

A fourteenth aspect of the present invention is a supporting structure of a pedal device for a vehicle in which, in the thirteenth aspect, the connecting means has a stopper means for restricting an amount of bending of the bending means to a predetermined amount.

A fifteenth aspect of the present invention is a supporting structure of a pedal device for a vehicle in which, in the fourteenth aspect, bending of the bending means is caused by buckling of the connecting means, and the connecting means has a plate-shaped portion whose surface direction is a direction of thickness of the connecting means.

A sixteenth aspect of the present invention is a supporting structure of a pedal device for a vehicle in which, in either the fifth or the sixth aspect, the guiding means is structured such that a locus of movement of the rotating shaft portion is a substantially circular arc shaped locus which is oriented substantially toward the rear of the vehicle and downwardly.

A seventeenth aspect of the present invention is a supporting structure of a pedal device for a vehicle in which, in the sixteenth aspect, the guiding means is elongated holes provided in the pedal bracket, the elongated holes being provided such that a width of each of the elongated holes increases, along a direction in which the rotating shaft portion moves, to a dimension which is greater than a diameter dimension of the rotating shaft portion.

An eighteenth aspect of the present invention is a supporting structure of a pedal device for a vehicle in which, in the fifth aspect, the guiding means is elongated holes provided in the pedal bracket, an inner peripheral thickness dimension of each of the elongated holes decreasing along a moving direction of the rotating shaft portion.

A nineteenth aspect of the present invention is a supporting structure of a pedal device for a vehicle in which, in the tenth aspect, the guiding means is elongated holes provided in the pedal bracket, and the rotating shaft portion has a fastening member and a torque transmission preventing means which prevents transmission of fastening torque of the fastening member to peripheral portions of the elongated holes.

A twentieth aspect of the present invention is a supporting structure of a pedal device for a vehicle in which, in either the sixteenth or the seventeenth aspect, the guiding means has a slide-contact portion which, when the rotating shaft portion moves along the elongated holes, slide-contacts an end portion of the pedal device at a side opposite the stepping surface of the pedal device and guides movement of the end portion of the pedal device at the side opposite the stepping surface of the pedal device.

A twenty-first aspect of the present invention is a supporting structure of a pedal device for a vehicle in which, in the twentieth aspect, corner portions in a direction of thickness of the end portion of the pedal device at the side opposite the stepping surface of the pedal device are chamfered to a predetermined curvature.

A twenty-second aspect of the present invention is a supporting structure of a pedal device for a vehicle in which, in the twenty-first aspect, a cross-sectional configuration of the end portion of the pedal device at the side opposite the stepping surface of the pedal device is substantially T-shaped.

A twenty-third aspect of the present invention is a supporting structure of a pedal device for a vehicle in which, in the twentieth aspect, the elongated holes are provided such that a width of a region of each of the elongated holes at a side in a direction of movement of the rotating shaft portion increases toward the slide-contact portion.

A twenty-fourth aspect of the present invention is a supporting structure of a pedal device for a vehicle in which the sixteenth aspect further comprises assisting means for assisting force for moving the rotating shaft portion substantially toward the rear of the vehicle at the time when an external force of a predetermined value or greater is applied to the front portion of the vehicle.

A twenty-fifth aspect of the present invention is a supporting structure of a pedal device for a vehicle in which, in the twentieth aspect, the pedal bracket has a regulating means at a region at which the pedal bracket and a member at a vehicle body are fixed, the regulating means regulating rotation of the pedal bracket as seen in plan view.

A twenty-sixth aspect of the present invention is a supporting structure of a pedal device for a vehicle in which, in the twenty-fifth aspect, the regulating means is a pair of side plates which is provided at the member at the vehicle body and between which a portion of the pedal bracket is interposed.

A twenty-seventh aspect of the present invention is a supporting structure of a pedal device for a vehicle in which, in the twenty-fifth aspect, the regulating means is provided with a plurality of points, along a substantially longitudinal direction of the vehicle, which are fixing portions of the pedal bracket and the member at the vehicle body.

A twenty-eighth aspect of the present invention is a supporting structure of a pedal device for a vehicle in which, in the fifth aspect, a region at which the pedal bracket and a member at a vehicle body are fixed is provided in a vicinity of a final end portion of the guiding means in a guiding direction thereof.

A twenty-ninth aspect of the present invention is a supporting structure of a pedal device for a vehicle in which the fifth aspect further comprises a brake switch bracket holding a brake switch and applying rotational force toward the front of the vehicle to the pedal device when an external force of a predetermined value or greater is applied to the front portion of the vehicle.

In accordance with the first aspect of the present invention, when an external force of a predetermined value or greater is applied to the front portion of the vehicle, due to the displacement controlling means, the external force is transmitted to the rotating shaft portion of the suspended-type pedal device for a vehicle, and the rotating shaft portion is moved substantially toward the rear of the vehicle. By moving the rotating shaft portion substantially toward the rear of the vehicle in this way, the displacement of the stepping surface of the pedal device is controlled.

In accordance with the second aspect, when an external force of a predetermined value or more is applied to the front portion of the vehicle, the external force is detected by the external force detecting means. Next, based on the results of detection by the external force detecting means, the amount of movement determining means determines the amount of movement of the rotating shaft portion of the suspended-type pedal device for a vehicle. Based on the results of determination by the amount of movement determining means, the rotating shaft portion is moved substantially toward the rear of the vehicle by the displacement controlling means. By moving the rotating shaft portion substantially toward the rear of the vehicle in this way, the displacement of the stepping surface of the pedal device can be controlled.

In accordance with the third aspect of the invention, when an external force of a predetermined value or greater is applied to the front end of the vehicle, due to the displacement controlling means, the external force is transmitted to the rotating shaft portion of the swinging link, and this rotating shaft portion is moved substantially toward the rear of the vehicle. By moving the rotating shaft portion of the swinging link substantially toward the rear of the vehicle in this way, the displacement of the stepping surface of the pedal device is controlled via the linking means which links the other end portion of the swinging link and the end portion of the suspended-type pedal device for a vehicle at the side opposite the stepping surface thereof.

In accordance with the fourth aspect of the present invention, when an external force of a predetermined value or greater is applied to the front portion of the vehicle, the operational force transmitting means is displaced substantially toward the rear of the vehicle. As a result, rotational force substantially toward the rear of the vehicle around the center of rotation of the pedal device is applied to the pedal device via the swinging link which directly or indirectly connects the operational force transmitting means and the end portion of the pedal device at the side opposite the stepping surface thereof such that the operational force transmitting means and the end portion are rotatable relatively to one another. When the rotational force substantially toward the rear of the vehicle becomes a predetermined value or greater, the rotational force is absorbed by the displacement controlling means, and the displacement of the stepping surface of the pedal device is thereby controlled.

In accordance with the fifth aspect, when an external force of a predetermined value or greater is applied to the front portion of the vehicle, the external force is transmitted to the load receiving portion which is disposed further toward the front of the vehicle than the pedal device. As a result, the load receiving portion receives the external force, and is displaced substantially toward the rear of the vehicle. Accordingly, the displacement of the load receiving portion at this time is transmitted to the rotating shaft portion via the connecting means. Because the rigidity of the connecting means in the longitudinal direction is set to be greater than the rigidity of the pedal bracket in the longitudinal direction, even if the pedal bracket buckles in the longitudinal direction, the connecting means does not buckle, and the displacement of the load receiving portion is reliably transmitted to the rotating shaft portion. In this way, the rotating shaft portion is moved smoothly substantially toward the rear of the vehicle while being guided by the guiding means provided at the pedal bracket. Due to the rotating shaft portion being moved substantially toward the rear of the vehicle in this way, the displacement of the stepping surface of the pedal device can be controlled.

In the present invention, the displacement control means is structured so as to include a mechanical structure which is the connecting means and the guiding means, and there are few structural elements. Therefore, reliable operation can be achieved. Further, the structure can be simplified, and operational reliability can be improved.

In accordance with the sixth aspect, when an external force of a predetermined value or greater is applied to the front portion of the vehicle, the external force is transmitted to the load receiving portion which is disposed further toward the front of the vehicle than the pedal device. As a result, the load receiving portion receives the external force and is displaced substantially toward the rear of the vehicle. In accordance with the selection of the load receiving portion, the displacement direction of the connecting means may deviate beyond the set range with respect to the guiding direction of the guiding means. However, in accordance with the present aspect, because the connecting means and the load receiving portion are joined by the hinge means so as to be rotatable relative to one another, even if such a deviation occurs, the deviation can be absorbed. Further, the rotating shaft portion can be smoothly moved along the guiding means.

In accordance with the seventh aspect of the invention, the load receiving portion is disposed further toward the front of the vehicle than the dash panel. Therefore, an external force of a predetermined value or greater applied from the front of the vehicle is transmitted to the rotating shaft portion in a short time and the amount of displacement of the rotating shaft portion substantially toward the rear of the vehicle is increased, as compared with a case in which the rotating shaft portion is moved substantially toward the rear of the vehicle by using the displacement of the dash panel substantially toward the rear of the vehicle. Accordingly, the rotating shaft portion can be moved quickly and reliably substantially toward the rear of the vehicle.

In accordance with the eighth aspect, when an external force of a predetermined value or greater is applied to the front portion of the vehicle, the pair of side wall portions of the pedal bracket buckles substantially in the longitudinal direction of the vehicle. In the present aspect, the deforming portions, which deform the pair of side wall portions toward the inner sides thereof, are provided at the pair of side wall portions. Therefore, the pair of side wall portions buckles while deforming toward the inner sides thereof. As a result, interference between the side wall portions of the pedal bracket and the connecting means at the time the pedal bracket buckles can be prevented. Further, the rotating shaft portion can be moved quickly and reliably substantially toward the rear of the vehicle.

In accordance with the ninth aspect of the present invention, the opposing deforming portions are disposed so as to be offset from one another. Therefore, when the side wall portions deform toward the inner sides thereof at the deforming portions, the opposing deforming portions do not interfere with one another. Further, the rotating shaft portion can be moved more quickly and reliably substantially toward the rear of the vehicle.

In accordance with the tenth aspect, because the connecting means is provided at the inner side of the pair of side wall portions of the pedal bracket, interference between the side wall portions of the pedal bracket and the connecting means at the time that the pedal bracket buckles can be prevented. More specifically, when a structure in which the pair of side wall portions of the pedal bracket is buckled substantially in the longitudinal direction of the vehicle is employed, usually, the side wall portions deform toward the outer sides thereof. Accordingly, if the connecting means is disposed at the inner side of the pair of side wall portions of the pedal bracket as in the present aspect, interference between the side wall portions of the pedal bracket and the connecting means can be prevented. The rotating shaft portion can be moved quickly and reliably substantially toward the rear of the vehicle.

In accordance with the eleventh aspect of the present invention, the connecting means is joined to the load receiving portion at one place, and is joined to the rotating shaft portion at a plurality of places. Therefore, regardless of the direction of input of a load transmitted to the connecting means from the load receiving portion, the load can be transmitted to the rotating shaft portion. As a result, it is difficult for wrenching force to be generated at the rotating shaft portion at the time the rotating shaft portion moves. The rotating shaft portion can be moved reliably substantially toward the rear of the vehicle regardless of the direction of input of the load transmitted from the rotating shaft portion to the connecting means.

In accordance with the twelfth aspect, a joining region at the connecting means for joining the connecting means to the load receiving portion is offset toward the vehicle outer side of the pedal bracket inner portion. Therefore, load can be reliably transmitted to the rotating shaft portion via the connecting means particularly in cases in which external force of a predetermined value or greater is applied from the front of the driver's seat side or the like. Further, the rotating shaft portion can be moved reliably substantially toward the rear of the vehicle.

In accordance with the thirteenth aspect of the present invention, when load of a predetermined value or greater is applied to the connecting means and the direction of the load applied to the connecting means at that time is offset from the guiding direction of the guiding means, the rotating shaft portion side of the connecting means is bent in the guiding direction of the guiding means by the bending means provided at the connecting means. Therefore, the direction in which the rotating shaft portion is pushed via the connecting means coincides with the guiding direction of the guiding means. Accordingly, the rotating shaft portion can be moved smoothly and reliably along the guiding means toward the rear of the vehicle.

In accordance with the fourteenth aspect of the present invention, because the stopper means, which restricts the amount of bending of the bending means to a predetermined amount, is provided, the bending means does not bend more than necessary. Accordingly, the amount of bending of the bending means is appropriate.

In accordance with the fifteenth aspect, bending by the bending means is generated by the buckling of the connecting means, and the plate-shaped portion, whose surface direction is the direction of thickness of the connecting means, is provided at the connecting means. Therefore, the rigidity which is purposely decreased in order to buckle the connecting means is compensated for by the plate-shaped portion. Accordingly, the connecting means can be buckled while the necessary rigidity of the connecting means is maintained.

In accordance with the sixteenth aspect, the guiding means is structured such that the locus of movement of the rotating shaft portion is a substantially circular arc shaped locus directed substantially toward the rear of the vehicle and downwardly. Therefore, when an external force of a predetermined value or greater is applied to the front portion of the vehicle, the rotating shaft portion is moved substantially toward the rear of the vehicle and downwardly along this locus. As a result, the stepping surface of the pedal device can be actively displaced toward the front of the vehicle as compared with a case in which the guiding direction by the guiding means (i.e., the locus of movement of the rotating shaft portion prescribed by the guiding means) is the substantially longitudinal direction of the vehicle.

In accordance with the seventeenth aspect of the present invention, the guiding means is structured by the elongated holes provided in the pedal bracket, and the width of each elongated hole increases, along the moving direction of the rotating shaft portion, to a dimension greater than the diameter dimension of the rotating shaft portion. Therefore, the sliding resistance at the time the rotating shaft portion moves along the elongated holes is decreased. Accordingly, the rotating shaft portion can be moved smoothly and reliably along the elongated grooves substantially toward the rear of the vehicle.

In accordance with the eighteenth aspect of the invention, the guiding means is structured by the elongated holes provided in the pedal bracket, and the inner peripheral thickness dimension of each elongated hole decreases along the moving direction of the rotating shaft portion. Therefore, as the rotating shaft portion moves along the elongated holes, the contact surface area between the rotating shaft portion and the inner peripheral surfaces of the elongated holes decreases. As a result, the sliding resistance when the rotating shaft portion moves along the elongated holes is decreased. Accordingly, the rotating shaft portion can be moved smoothly and reliably along the elongated holes substantially toward the rear of the vehicle.

In accordance with the nineteenth aspect, the guiding means is structured by the elongated holes provided in the pedal bracket, the rotating shaft portion is structured by using the fastening member, and the rotating shaft portion is structured to include the torque transmission preventing means which prevents the transmission of the fastening torque of the fastening member to the peripheral portions of the elongated holes. Therefore, the assembled state of the rotating shaft portion is a state in which the fastening torque of the fastening member, which is a principal portion of the rotating shaft portion, is not transmitted to the peripheral portions of the elongated holes. As a result, movement of the rotating shaft portion along the elongated holes is smooth and reliable as compared with a structure in which the fastening torque of the fastening member, which is a principal portion of the rotating shaft portion, is transmitted to the peripheral portions of the elongated holes.

In accordance with the twentieth aspect of the present invention, the guiding means is structured by the elongated holes and by the slide-contact portion. The elongated holes are provided at the pedal bracket and support the rotating shaft portion such that the rotating shaft portion is movable. When the rotating shaft portion moves along the elongated holes, the end portion of the pedal device at the side opposite the stepping surface slide-contacts the slide-contact portion, and the slide-contact portion guides the movement of the end portion of the side opposite the stepping surface. Therefore, when the rotating shaft portion moves along the elongated holes, the end portion of the pedal device at the side opposite the stepping surface slide-contacts the slide-contact portion while the rotating shaft portion moves along the elongated holes. Accordingly, the movement of the rotating shaft portion can be guided reliably.

In accordance with the twenty-first aspect of the present invention, at the end portion of the pedal device at the side opposite the stepping surface, the corner portions at the sides in the direction of thickness are chamfered to a predetermined curvature. Therefore, even if wrenching force is applied to the pedal device at the time the rotating shaft portion moves along the elongated holes, the end portion of the pedal device at the side opposite the stepping surface and the slide-contact portion are not in a line-contact state, and can be maintained in a plane-contact state of a predetermined contact surface area. Accordingly, the contact surface pressure between the end portion of the pedal device at the side opposite the stepping surface and the slide-contact portion is prevented from becoming excessively large, and the contact surface pressure can be lowered to an appropriate degree. Accordingly, the end portion of the pedal device at the side opposite the stepping surface can be smoothly moved along the slide-contact portion.

In accordance with the twenty-second aspect of the present invention, the sectional configuration of the end portion of the pedal device at the side opposite the stepping surface is substantially T-shaped. Therefore, the contact surface area between the end portion at the side opposite the stepping surface and the slide-contact portion increases. As a result, the contact surface pressure between the end portion at the side opposite the stepping surface and the slide-contact portion can be decreased. Accordingly, the end portion of the pedal device at the side opposite the stepping surface can be moved even more smoothly along the slide-contact portion. Further, in a case in which wrenching force is applied to the pedal device when the rotating shaft portion moves along the elongated holes, because the cross-sectional configuration of the end portion of the pedal device at the side opposite the stepping surface is substantially T-shaped, a reaction force in a direction of offsetting the wrenching force is generated. As a result, a stable posture of the pedal device can be maintained.

In accordance with the twenty-third aspect, the width of the region of the elongated hole at the side in the direction of movement of the rotating shaft portion increases toward the slide-contact portion. Therefore, even if wrenching force is applied to the pedal device when the rotating shaft portion moves along the elongated holes, the tolerance with respect to the wrenching increases to the extent that the width of the elongated hole is increased. Accordingly, the end portion of the pedal device at the side opposite the stepping surface can be moved even more smoothly along the slide-contact portion.

In accordance with the twenty-fourth aspect, an assisting means is added which assists the force for moving the rotating shaft portion substantially toward the rear of the vehicle, when an external force of a predetermined value or greater is applied to the front portion of the vehicle. Therefore, the force for moving the rotating shaft portion substantially toward the rear of the vehicle can be augmented. Further, the rotating shaft portion can be moved rapidly and reliably substantially toward the rear of the vehicle.

In accordance with the twenty-fifth aspect of the invention, a regulating means, which regulates the rotation of the pedal bracket as seen in plan view, is provided at the fixing region of the pedal bracket for fixing the pedal bracket to a member at the vehicle body. Therefore, the rotation of the pedal bracket as seen in plan view, which rotation accompanies the movement of the rotating shaft portion, can be prevented. Further, the rotating shaft portion can be reliably moved substantially toward the rear of the vehicle.

In accordance with the twenty-sixth aspect, the regulating means is structured so as to include a pair of side plates which are provided at a member at the vehicle body and between which is interposed a portion of the pedal bracket. Therefore, the structure of the regulating means is simple, and the rotation of the pedal bracket as seen in plan view, which rotation accompanies the movement of the rotating shaft portion, can be prevented with a simple structure.

In accordance with the twenty-seventh aspect of the present invention, the regulating means is structured such that a plurality of fixing regions at the pedal bracket for fixing the pedal bracket to a member at the vehicle body are provided so as to be aligned substantially in the longitudinal direction of the vehicle. Therefore, the structure of the regulating means is simple, and the rotation in plan view of the pedal bracket, which rotation accompanies the movement of the rotating shaft portion, can be prevented by a simple structure.

In accordance with the twenty-eighth aspect of the present invention, the fixing region at the pedal bracket for fixing the pedal bracket to a member at the vehicle body is set in a vicinity of the final end side in the guiding direction of the guiding means. Therefore, force applied to the pedal brake at the time the rotating shaft portion moves can be efficiently received. Further, the rotating shaft portion can be reliably moved substantially toward the rear of the vehicle.

In accordance with the twenty-ninth aspect of the present invention, a brake switch bracket is also provided. Therefore, when an external force of a predetermined value or greater is applied to the front portion of the vehicle, rotational force toward the front of the vehicle can be applied to the pedal device.

BRIEF DESCRIPTION OF THE DRAWINGS

FIG. 63 is a side view focusing on a push plate and illustrating a supporting structure of a pedal device for a vehicle relating to a thirteenth embodiment.

FIG. 65A is a perspective view illustrating another embodiment for bending the push plate.

FIG. 65B is a perspective view illustrating another embodiment for bending the push plate.

FIG. 65C is a perspective view illustrating another embodiment for bending the push plate.

FIG. 65D is a perspective view illustrating another embodiment for bending the push plate.

FIG. 65E is a perspective view illustrating another embodiment for bending the push plate.

FIG. 66A is a perspective view illustrating an embodiment in which beads have been added to the push plate structure illustrated in FIG. 65A.

FIG. 66B is a perspective view illustrating an embodiment in which a bead has been added to the push plate structure illustrated in FIG. 65B.

FIG. 66C is a perspective view illustrating an embodiment in which a bead has been added to the push plate structure illustrated in FIG. 65C.

FIG. 66D is a perspective view illustrating an embodiment in which a bead has been added to the push plate structure illustrated in FIG. 65D.

FIG. 66E is a perspective view illustrating an embodiment in which a bead has been added to the push plate structure illustrated in FIG. 65E.

DESCRIPTION OF THE PREFERRED EMBODIMENTS

A first embodiment of the present invention will be described with reference to FIGS. 1 through 9. In the figures, arrow FR points toward the front of the vehicle, whereas arrow UP points toward the top of the vehicle.

Figure 1:
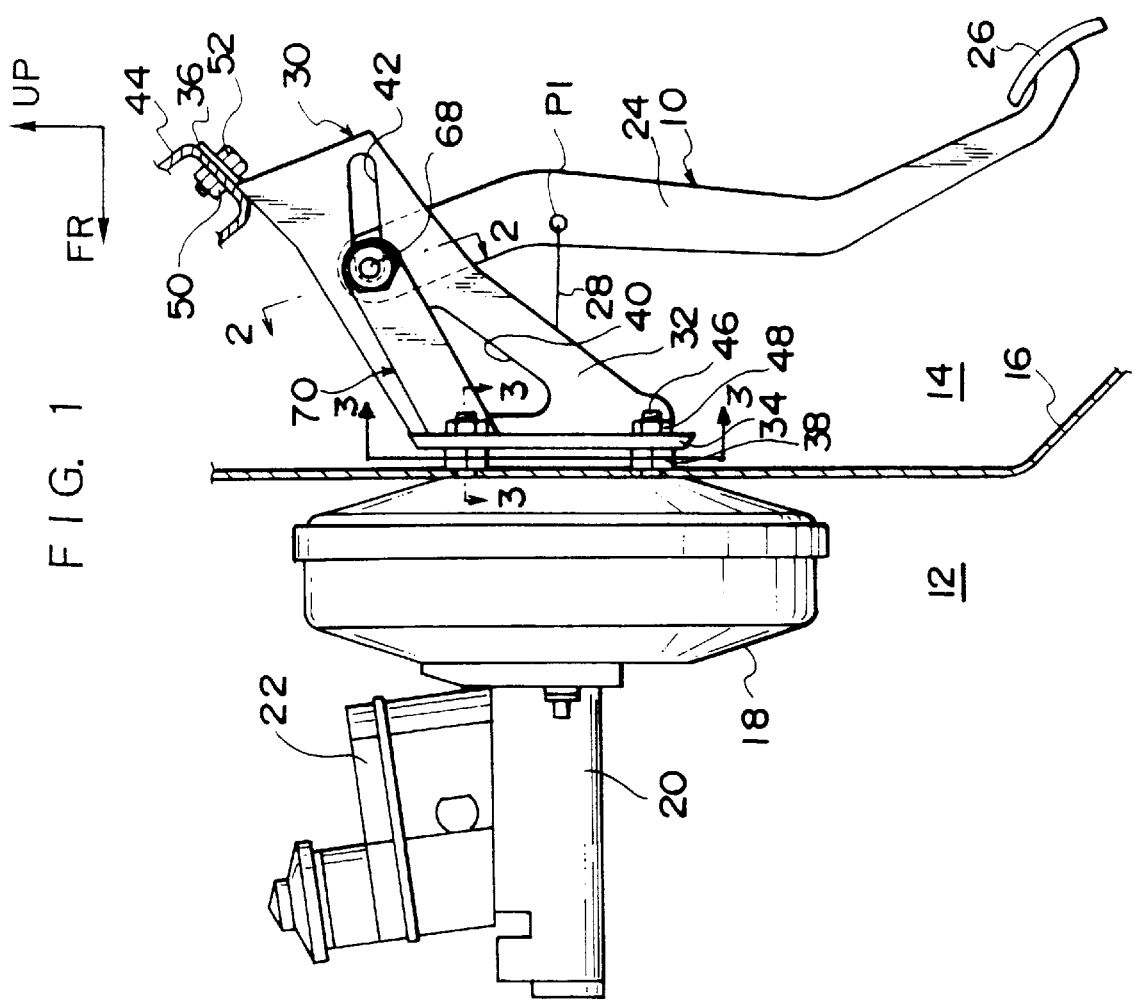
FIG. 1 is a side view illustrating a supporting structure of a pedal device for a vehicle relating to a first embodiment.

The structure of the periphery of a push rod connected type, suspended type brake pedal 10 as viewed from a side surface is illustrated schematically in FIG. 1. As shown in the figure, a dash panel 16, which partitions an engine room 12 of the vehicle and a vehicle compartment interior space 14, is disposed substantially vertically at the side of the brake pedal 10 toward the front of the vehicle (i.e., at the side of the brake pedal 10 in the direction of arrow FR in the figure). The brake pedal 10, to which the stepping force of a driver is applied, is disposed at the side of the dash panel 16 toward the rear of the vehicle (i.e., at the side of the dash panel 16 in the direction opposite arrow FR). A brake booster 18, a master cylinder 20 and a reservoir tank 22 are provided integrally at the side of the dash panel 16 toward the front of the vehicle. The brake booster 18 augments the stepping force of the driver applied to the brake pedal 10. The master cylinder 20 converts the pressure augmented by the brake booster 18 into hydraulic pressure. The reservoir tank 22 houses and replenishes brake fluid in accordance with changes in the volume of the hydraulic pressure system.

The brake pedal 10 includes a pedal supporting portion 24 and a pedal pad 26. The pedal supporting portion 24 is formed by appropriately bending a narrow plate member. The pedal pad 26 is provided at the lower end portion of the pedal supporting portion 24 (i.e., the end portion in the direction opposite to the arrow UP), and the stepping force of the driver is applied to the pedal pad 26. The distal end portion of a push rod (operating rod) 28, which projects from the brake booster 18 and passes through the dash panel 16, is connected, via a clevis and a clevis pin (indicated collectively by P1), to the intermediate portion of the pedal supporting portion 24 of the brake pedal 10, so that the distal end portion of the push rod 28 and the intermediate portion of the pedal supporting portion 24 are relatively rotatable.

At the brake pedal 10, the upper end portion of the pedal supporting portion 24 (i.e., the end portion in the direction of arrow UP) is swingably supported by a pedal bracket 30.

Figure 3:
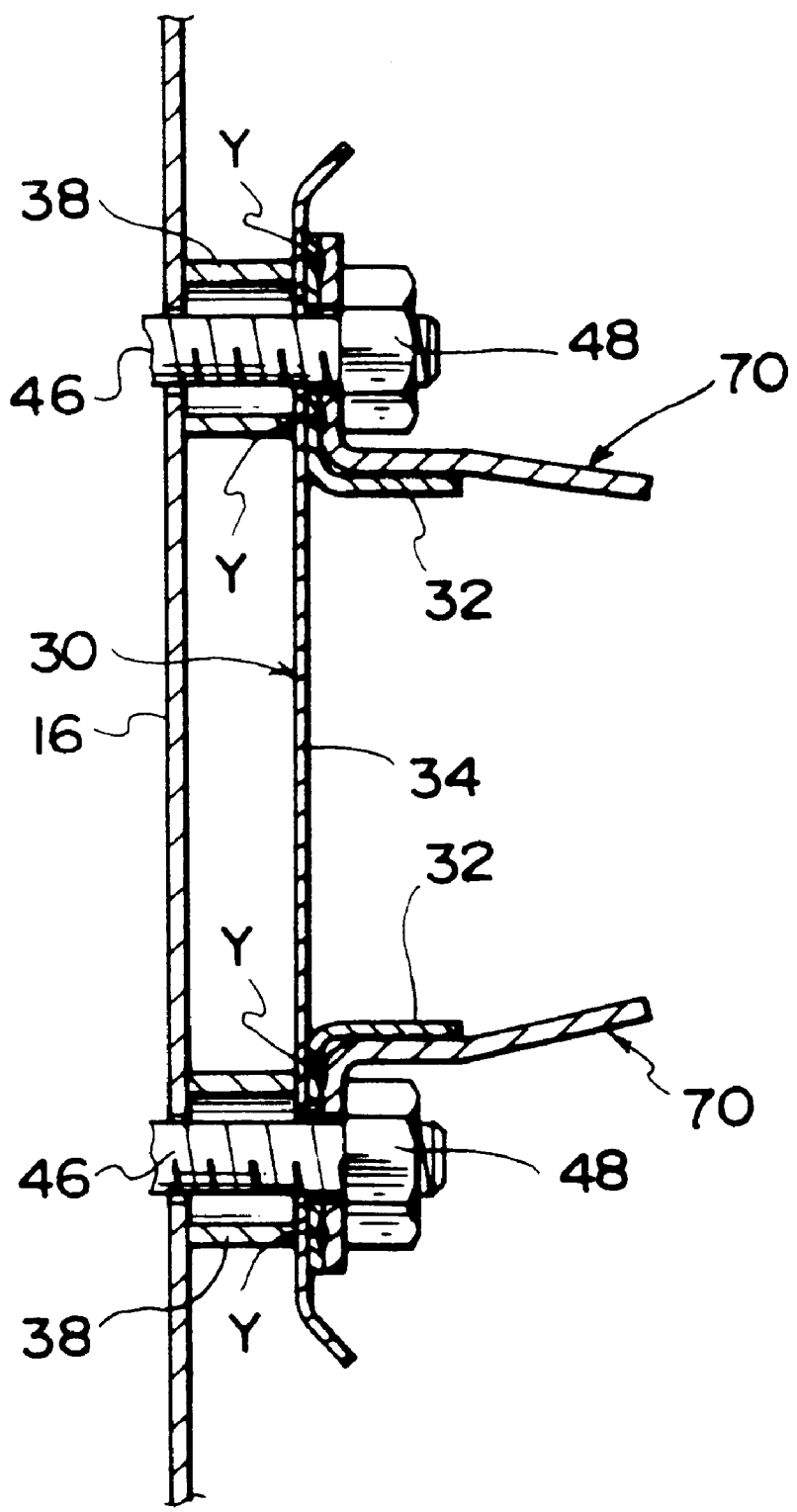
FIG. 3 is a cross-sectional view taken along line 3—3 of FIG. 1.
Figure 4:
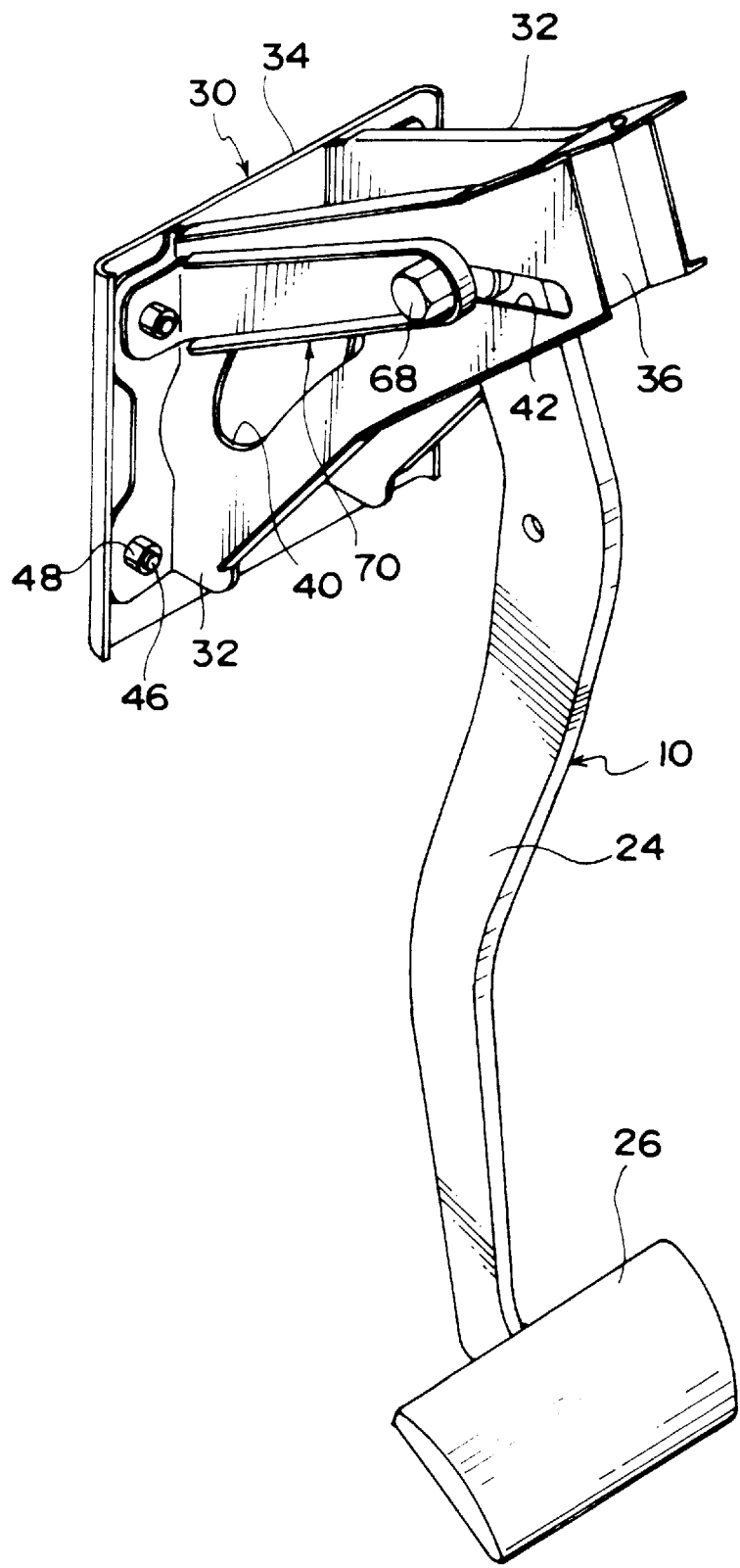
FIG. 4 is a perspective view of the supporting structure of a pedal device for a vehicle of FIG. 1 in an assembled state.

First, the structure of the respective portions of the pedal bracket 30 and the assembled structure of the pedal bracket 30 will be described with reference to FIGS. 1, 3 and 4. As illustrated in FIG. 4, the pedal bracket 30 is structured by a pair of side plates 32, a base plate 34, and a rear plate 36. The pair of side plates 32 are disposed parallel to one another. The base plate 34 is connected to the front end portions of the side plates 32 and forms a mounting seat surface at the front side. The rear plate 36 is connected between the rear end portions of the side plates 32 and forms a mounting seat surface at the rear side. In plan view, the pedal bracket 30 has a substantially rectangular frame shape. A plurality of pipe-like collars 38 (see FIGS. 1 and 3) are fixed in advance to predetermined regions at the front surface side of the base plate 34. A substantially triangular hole 40, for tuning the rigidity of the side plate 32 in the longitudinal direction, is formed in the front portion of each side plate 32. An elongated hole 42, which is elongated in the longitudinal direction of the vehicle, is formed in the rear portion of each side plate 32.

The base plate 34 of the pedal bracket 30 having the above-described structure is fixed to the dash panel 16. The rear plate 36 of the pedal bracket 30 is fixed to a bracket 44 at the vehicle body. In this way, the pedal bracket 30 is assembled to the vehicle body. The bracket 44 at the vehicle body is fixed to a reinforcing member at the vehicle body which may be a cowl inner panel, which connects the left and right front pillars, or an instrument panel reinforcement, which is disposed along the transverse direction of the vehicle. More specifically, in a state in which the respective collars 38 are pushed against the dash panel 16, stud bolts 46 (see FIG. 3) projecting from the brake booster 18 are inserted into the collars 38. In this state, by screwing nuts 48 with the stud bolts 46, the base plate 34 of the pedal bracket 30 is fixed to the dash panel 16. An unillustrated dash insulator serving as an unillustrated sound insulator is interposed between the dash panel 16 and the base plate 34. Alternatively, weld nuts may be welded in advance to the surface at the front side of the dash panel 16, and mounting bolts may be screwed into the weld nuts from the base plate 34 side. The upper end portion of the rear plate 36 is bent toward the rear of the vehicle. In a state in which this bent portion is abutted against the bracket 44 at the vehicle body (see FIG. 1), the rear plate 36 of the pedal bracket 30 is fixed to the bracket 44 at the vehicle body by a mounting bolt 52 being screwed with a weld nut 50 of the bracket 44 at the vehicle body.

Figure 2:
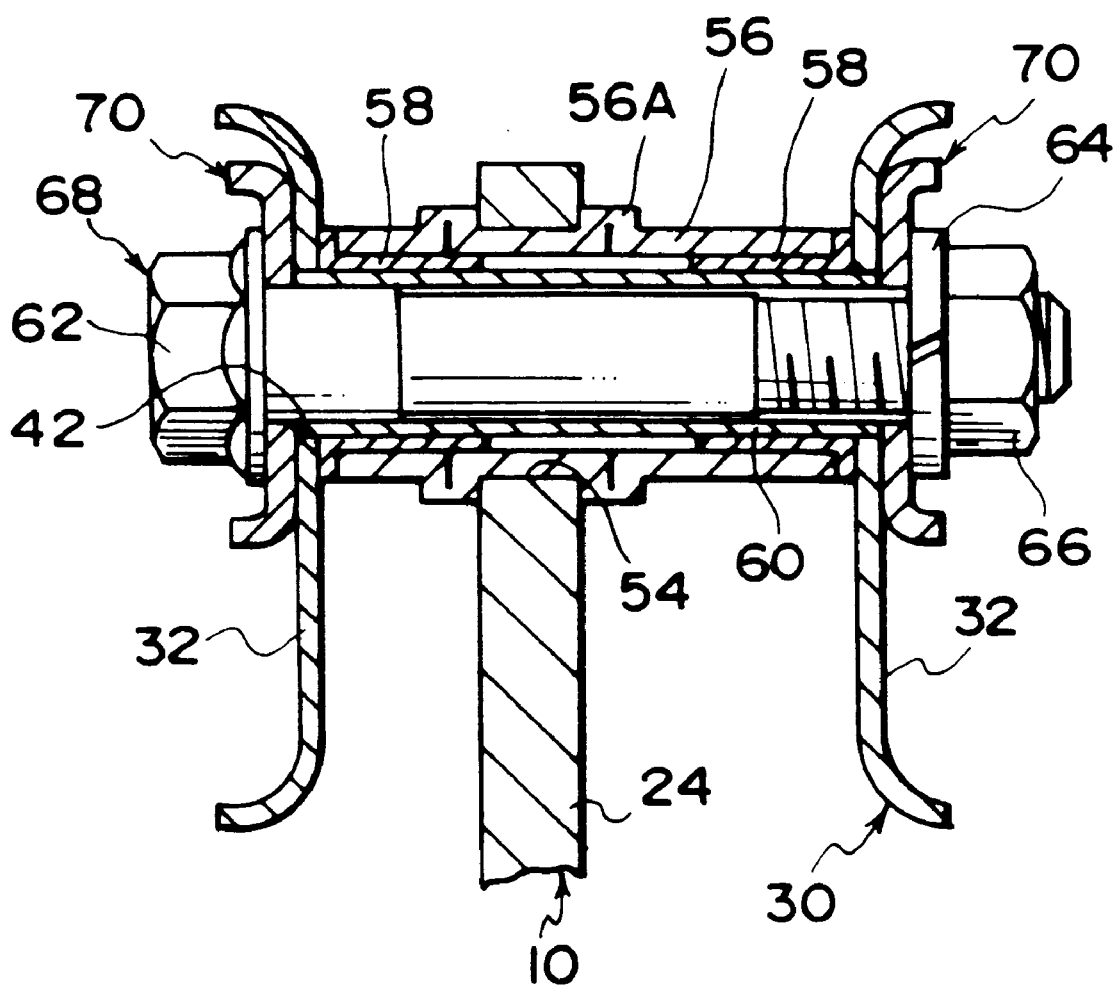
FIG. 2 is a cross-sectional view taken along line 2—2 of FIG. 1.
Figure 5:
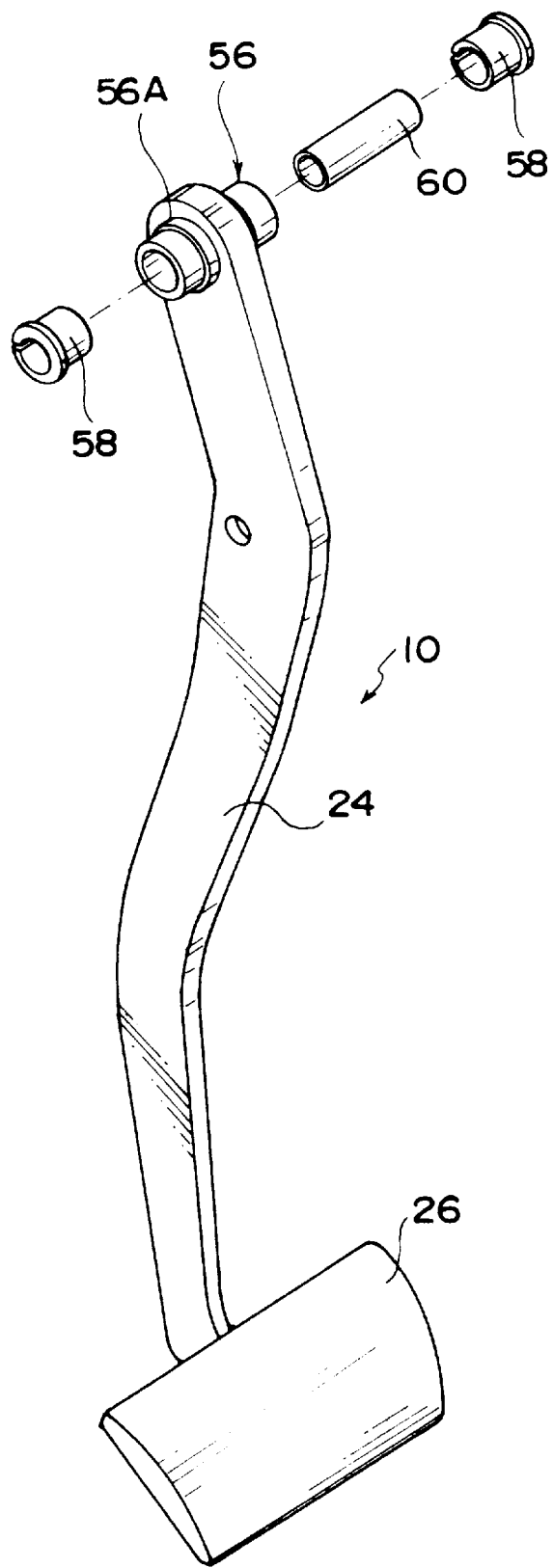
FIG. 5 is an exploded perspective view illustrating the structure of a rotating shaft portion of a brake pedal illustrated in FIG. 1.

Next, a shaft-supporting structure of the upper end portion of the brake pedal 10 will be described with reference to FIGS. 2, 4 and 5. As illustrated in FIGS. 2 and 4, the upper end portion of the pedal supporting portion 24 of the brake pedal 10 is disposed between the pair of side plates 32 of the pedal bracket 30. An unillustrated return spring engages with the pedal supporting portion 24 of the brake pedal 10 so that the pedal supporting portion 24 is always urged to return to its initial position. A circular through hole 54 is formed in the upper end portion of the pedal supporting portion 24 at a position which opposes the previously-described elongated holes 42. A substantially cylindrical pedal boss 56 is disposed so as to penetrate through the through hole 54. A pair of large diameter portions 56A is formed at the axial direction intermediate portion of the pedal boss 56. The pedal supporting portion 24 is disposed between these large diameter portions 56A so that the position of the brake pedal 10 in the transverse direction of the vehicle is prevented from shifting. As illustrated in FIG. 5, a bush 58, which is formed from a cylindrical portion and a collar portion, is fit into each axial direction side portion of the pedal boss 56 as illustrated in FIG. 5. The distance between the outer end surfaces of the collar portions of the bushes 58 substantially coincides with the distance between the inner surfaces of the pair of side plates 32. A cylindrical collar 60 is inserted in the bushes 58. In a state in which the axial direction side portions of the collar 60 are inserted in the elongated holes 42 of the pair of side plates 32, a washer faced bolt 62 is inserted into the collar 60. A nut 66 is screwed, via a washer 64, with the passed-through end portion of the washer faced bolt 62. In this way, the upper end portion of the pedal supporting portion 24 of the brake pedal 10 is supported to the pedal bracket 30 so as to be swingable around a rotating shaft portion 68 which is formed by the washer faced bolt 62 and the nut 66 (i.e., the rotating shaft portion 68 is the center of rotation (swinging)). The outer diameter dimension of the collar 60 is set to be slightly smaller than the groove width of the elongated holes 42.

When an external force of a predetermined value or greater is applied to the vehicle front portion, the rotating shaft portion 68 of the brake pedal 10 is moved substantially toward the rear of the vehicle. In the first embodiment, a structure for controlling the displacement of the pedal pad 26 (the stepping surface) of the brake pedal 10 at this time is provided. This structure will be described in detail hereinafter.

As illustrated in FIGS. 1 through 4, a push plate 70, which is formed by bending a narrow plate member into a substantial L-shape in plan view, is disposed at the thickness direction outer side of each of the side plates 32 of the pedal bracket 30. The front end portion of the push plate 70 is bent outwardly in the transverse direction of the vehicle so as to form a flange portion which is easily welded by spot welding or the like at one or two places to a flange portion of the side plate 32 which is formed in the same way at the front end portion of the side plate 32. (The portions which are welded are denoted by the letter "Y" in FIG. 3.) Instead of welding, the respective flange portions may be easily fixed together by a tape having high adhesive strength, rivets, nuts/bolts, or the like. In this way, shifting in the positions of the flange portions at the front end portions of the push plates 70 and the flange portions of the side plates 32 of the pedal bracket 30 before assembly to the dash panel 16 is prevented. In the state in which the three portions are superposed together, i.e., in the state in which the flange portions at the front end portions of the push plates 70, the flange portions of the side plates 32 of the pedal bracket 30, and the base plate 34 are superposed together, the front end portions of the push plates 70 are fixed to the dash panel 16 side by the nuts 48 and the stud bolts 46 which project from the brake booster 18.

The rear end portions of the push plates 70 project at a substantially rearward incline along the direction in which the side plates 32 project from the base plate 34, and are disposed at the vehicle transverse direction outer sides of the front end positions of the elongated holes 42 of the pedal bracket 30. A slight gap is provided between the push plate 70 and the side plate 32. When the rotating shaft portion 68 of the brake pedal 10 is assembled, the rear end portion of one of the push plates 70 is interposed between the head portion washer surface of the washer faced bolt 62 and one of the side plates 32. The rear end portion of the other push plate 70 is interposed between the washer 64 and the other side plate 32. In this state, as described above, the rear end portions of the push plates 70 are connected to the rotating shaft portion 68 by the washer faced bolt 62 and the nut 66.

The rigidity of the push plates 70 in the longitudinal direction of the vehicle is set to be greater than the rigidity of the pedal bracket 30 in the longitudinal direction. The bending rigidity of the push plates 70 in the transverse direction of the vehicle (i.e., in the direction of thickness of the push plates 70) is also set to be sufficiently high. Relative tuning of the rigidity of the push plates 70 in the longitudinal direction of the vehicle with respect to the pedal bracket 30 may be carried out by the above-mentioned method using the holes 40 formed in the side plates 32 of the pedal bracket 30, or by a method in which the push plates 70 and the pedal bracket 30 are provided with different plate thicknesses, or by a method in which reinforcing portions such as flanges are provided, or the like.

Next, the operation and the effects of the first embodiment will be described.

When the vehicle is traveling normally, the brake pedal 10 is maintained at its initial position due to the urging force of the return spring. In this state, if a driver applies stepping force to the pedal pad 26 of the brake pedal 10, the brake pedal 10 swings substantially toward the front of the vehicle around the rotating shaft portion 68, and the push rod 28 is pushed in the same direction.

When an external force of a predetermined value or greater is applied from the front of the vehicle, the following operation is carried out. Note that although external force may be applied from the front of the vehicle in various forms, here, explanation is given of an example in which the backward displacement velocity of the dash panel 16 is much larger than the backward displacement velocity of the connecting point (P1) of the brake pedal 10 and the push rod 28, i.e., a case in which the driver is stepping down on the brake pedal 10. More specifically, in this case, it can be presumed that the dash panel 16 is first displaced rearward and then rearward displacement of the master cylinder 20 follows. Further, because the driver is stepping down on the brake pedal P1, the rearward displacement velocity of the dash panel 16 is much larger than the rearward displacement velocity of the connecting point (P1) of the brake pedal 10 and the push rod 28.

In this case, when load applied from the front of the vehicle is received and the dash panel 16 is displaced rearward, the pair of side plates 32 of the pedal bracket 30 buckle in the longitudinal direction. More specifically, the pedal bracket 30 is assembled by the base plate 34 being fixed to the dash panel 16 and the rear plate 36 being fixed to the bracket 44 at the vehicle body which is fixed to a reinforcing member at the vehicle body. Further, the holes 40 are formed in the pair of side plates 32 in order to decrease the rigidity of the side plates 32 in the longitudinal direction. Therefore, when an external force of a predetermined value or greater is applied from the front of the vehicle and the dash panel 16 is displaced rearward, load toward the rear of the vehicle is inputted to the side plates 32 from the base plate 34, and a reaction force toward the front of the vehicle is inputted to the side plates 32 from the rear plate 36. Therefore, the side plates 32 buckle substantially toward the rear of the vehicle (in the longitudinal direction).

However, the rigidity of the push plates 70 in the longitudinal direction is set higher than the rigidity of the pedal bracket 30 in the longitudinal direction. Therefore, the push plates 70 do not buckle in the longitudinal direction, and are pushed as is by the dash panel 16 and by the base plate 34 so as to be displaced rearwardly. Accordingly, the rotating shaft portion 68 of the brake pedal 10, which is shaft-supported at the rear end portions of the push plates 70, moves substantially toward the rear of the vehicle along the elongated holes 42 of the pedal bracket 30. As a result, torque substantially toward the front of the vehicle is applied to the pedal pad 26 of the brake pedal 10 around the connecting point (P1), and the pedal pad 26 is displaced substantially toward the front of the vehicle.

In this way, in the first embodiment, the elongated holes 42, whose longitudinal direction is the longitudinal direction of the vehicle and which support the rotating shaft portion 68 of the brake pedal 10, are formed in the pedal bracket 30, and the push plates 70 are provided which, when an external force of a predetermined value or greater is applied to the front portion of the vehicle, utilize the deformation of the dash panel 16 so as to move the rotating shaft portion 68 substantially toward the rear of the vehicle along the elongated holes 42. Therefore, the pedal pad 26 of the brake pedal 10 can be displaced substantially toward the front of the vehicle. In other words, in accordance with the first embodiment, when an external force of a predetermined value or greater is applied from the front of the vehicle, the rearward displacement of the dash panel 16 is used to effect control such that the pedal pad 26 of the brake pedal 10 is displaced substantially toward the front of the vehicle. As a result, bending of the driver's knee, which is caused by the inertial movement of the driver when an external force of a predetermined value or greater is applied from the front of the vehicle, can be suppressed, and therefore, the driver's knee can be kept away from the steering column.

In the first embodiment, reliable operation can be achieved because displacement of the pedal pad 26 of the brake pedal 10 is controlled by a mechanical structure having few parts wherein the elongated holes 42 are formed in an existing pedal bracket and an existing rotating shaft portion, which is held within the elongated holes 42, is connected to the newly-provided push plates 70. As a result, simplicity of the structure can be achieved, and the reliability of the operation can be improved.

In the first embodiment, the pair of push plates 70 and the pedal bracket 30 are together fastened to the dash panel 16. However, it is not necessary for the push plates 70 and the pedal bracket 30 to be fastened together, and the push plates 70 may be mounted directly to the dash panel 16.

In the first embodiment, a structure is employed in which the elongated holes 42 are formed in the pedal bracket 30 as guide means which guide the movement of the rotating shaft portion 68. However, any of various structures may be used as the structure of the guide means. For example, in a ninth embodiment of the present invention which will be described later, a push plate 200 is disposed at the inner side of the pair of side plates 32 and, in place of the elongated holes 42, guide rails having U-shaped cross-sections or the like may be disposed at regions corresponding to the side plates 32.

Instead of the elongated holes 42 formed in the side plates 32, the rear ends of the elongated holes may be extended toward the rear so as to extend to the rear ends of the side plates 32 (i.e., notch-like elongated holes may be used).

In the first embodiment, the front end portions of the push plates 70 are fixedly mounted to the dash panel 16 side. However, the present invention is not limited to the same, and the front end portions of the push plates 70 may be hinge-joined to the dash panel 16 side. Hereinafter, several examples will be described with reference to FIGS. 6 through 9.

Figure 6:
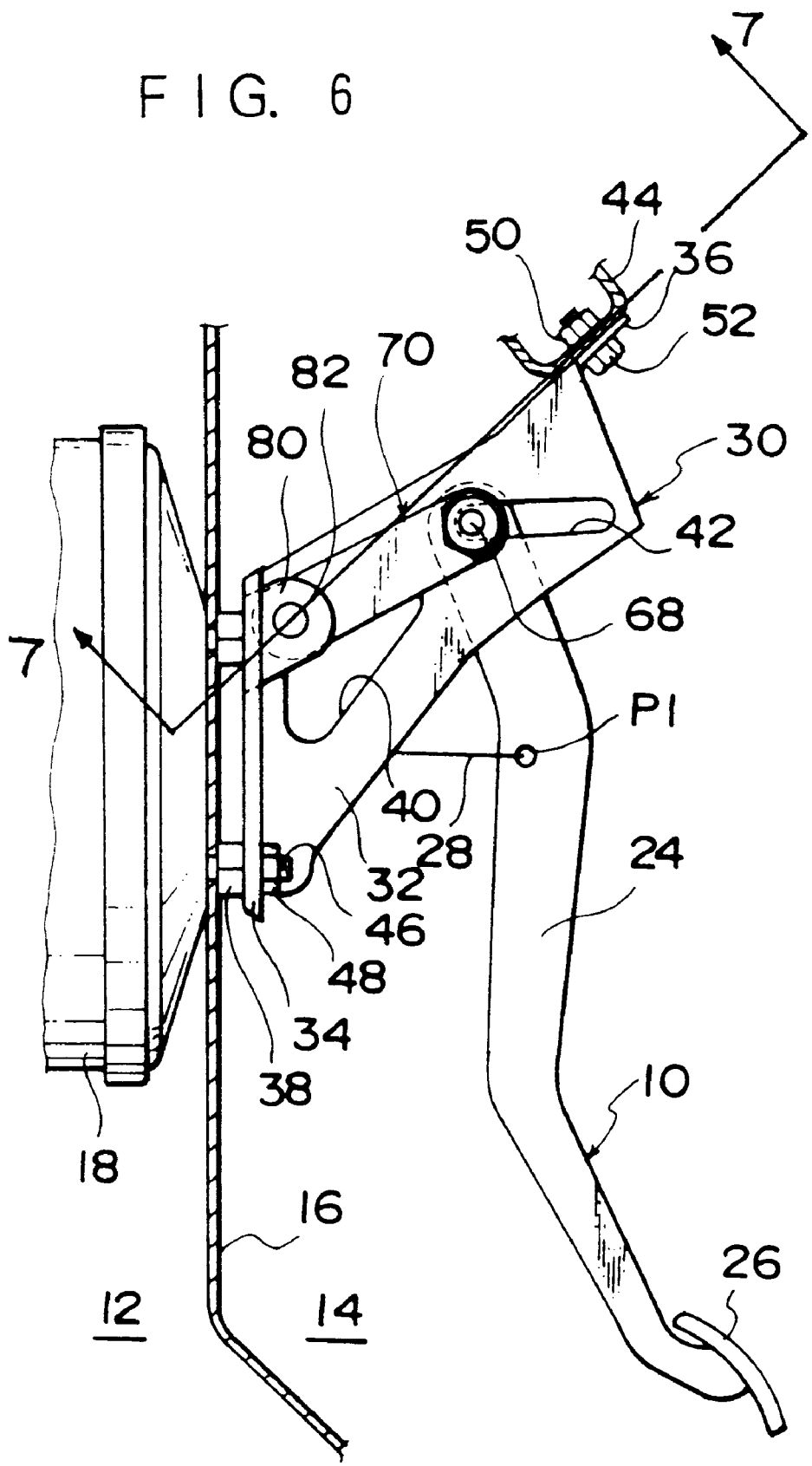
FIG. 6 is a side view corresponding to FIG. 1 and illustrating an embodiment in which a mounting portion of a push plate illustrated in FIG. 1 has a hinge structure.

In the embodiment illustrated in FIG. 6, receiving portions 80, which are substantially U-shaped in plan view, are fixed to the base plate 34 of the pedal bracket 30. The front end portions of the push plates 70 are inserted into the receiving portions 80. (Here, the flange portions which are bent outwardly as illustrated in FIG. 3 are not provided.) In this state, the receiving portions 80 and the front end portions are hinge-joined by hinge pins 82. In this case, even if the angle at which the push plates 70 are set and assembled is slightly offset with respect to the elongated holes 42, due to the dash panel 16 being displaced rearwardly at a slight angle with respect to the initial planar direction (the vertical direction), the front end portions of the push plates 70 swing in vertical directions around the hinge pins 82, and the offset can be absorbed. Accordingly, regardless of the direction of the rearward displacement of the dash panel 16, the rotating shaft portion 68 can be smoothly moved toward the rear along the elongated holes 42.

Figure 7:
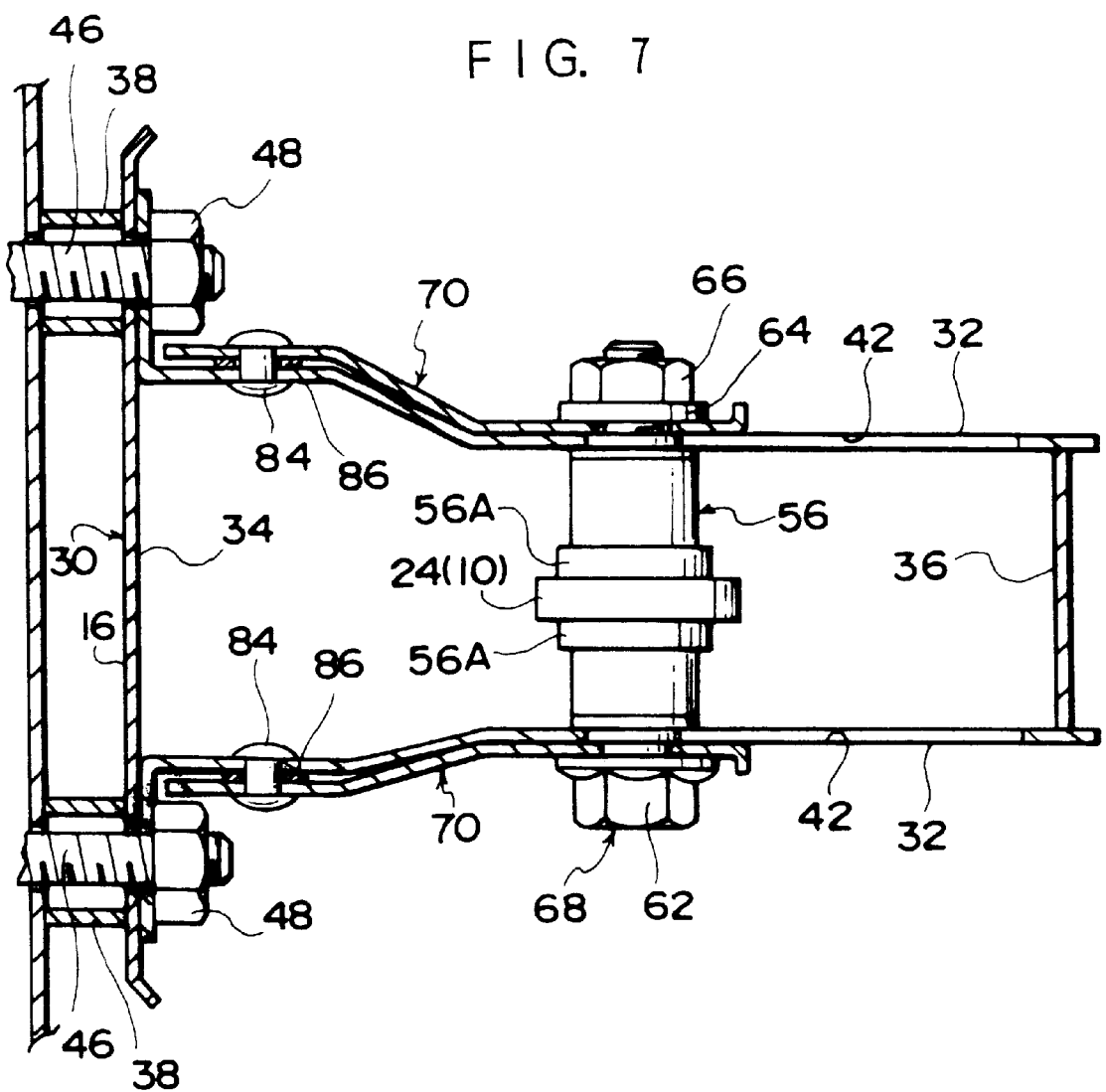
FIG. 7 is a horizontal sectional view taken along line 7—7 of FIG. 6 focusing on a pedal bracket and illustrating an embodiment in which rivets are used in place of receiving portions and hinge pins of FIG. 6.

In the embodiment illustrated in FIG. 7, the front end portions of the push plates 70 are pin-joined by rivets 84 to the front end portion sides of the side plates 32 of the pedal bracket 30. Thin washers 86 formed of a resin such as teflon or the like are interposed between the front end portions of the push plates 70 and the front end portion sides of the side plates 32. In this way, the push plates 70 are rotatable around the rivets 84.

Figure 8:
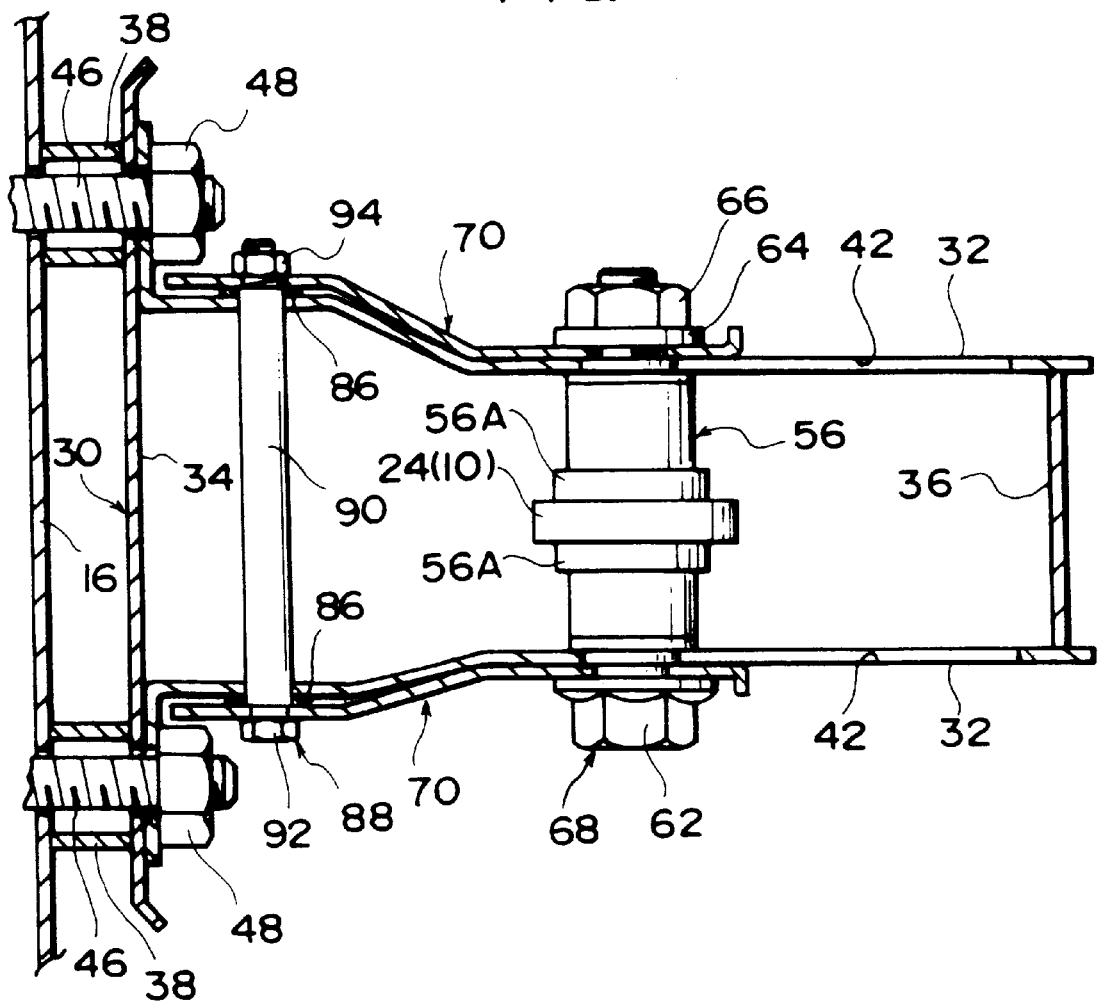
FIG. 8 is a horizontal sectional view corresponding to FIG. 7 and illustrating an embodiment in which a rotating shaft portion is used in place of the receiving portions and hinge pins of FIG. 6.
Figure 9:
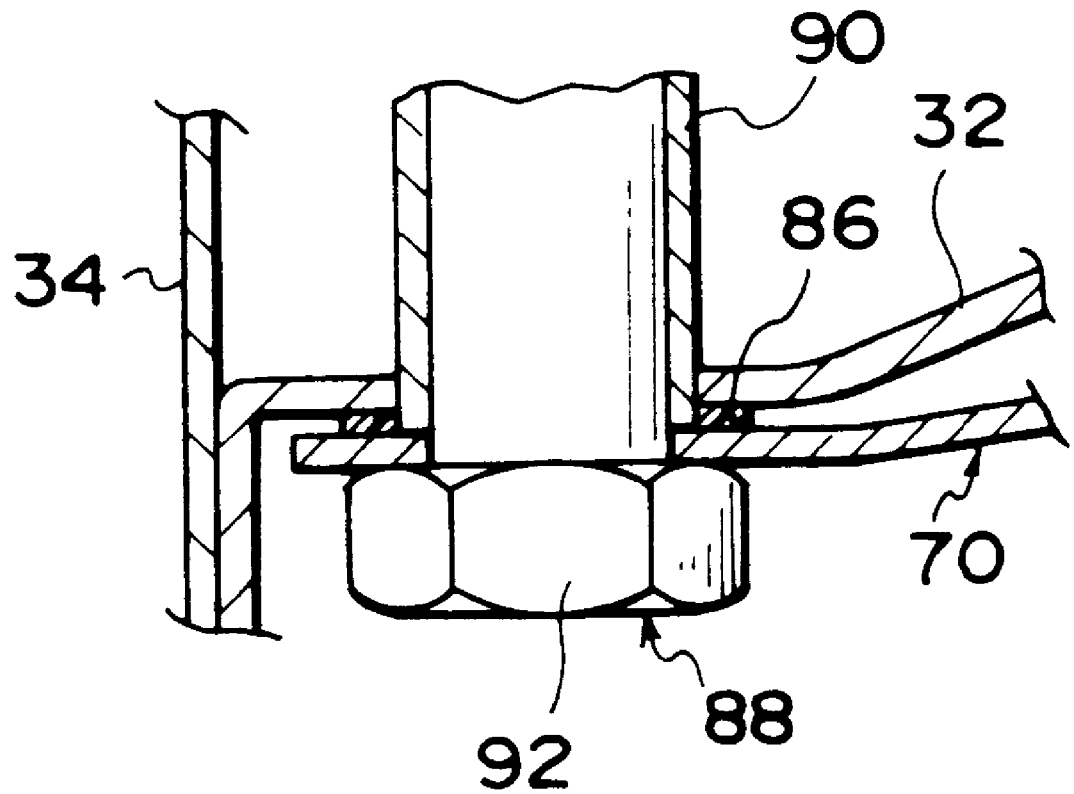
FIG. 9 is an enlarged view illustrating a vicinity of a head portion of the rotating shaft portion illustrated in FIG. 8.

In the embodiment illustrated in FIGS. 8 and 9, the front end portions of the push plates 70 and the front end portion sides of the side plates 32 are pin-joined not by the rivets 84, but rather, by a rotating shaft portion 88. The axial length of the rotating shaft portion 88 is slightly longer than the distance between the outer side surfaces of the front end portion sides of the side plates 32. The rotating shaft portion 88 is formed by a collar 90 which passes through both front end portion sides, a bolt 92 which is inserted into the collar 90, and a nut 94 which screws with the end portion of the bolt 92. The washers 86 are interposed between the front end portions of the push plates 70 and the front end portion sides of the side plates 32 of the pedal bracket 30.

Each of the above-described embodiments has the same operation and effects as the above-described embodiment of the hinge structure utilizing the receiving portions 80.

To explain the relation between the inventions of the above-described first embodiment and claim 5, the connecting means corresponds to the push plates 70 and the guide means corresponds to the elongated holes 42. Here, the connecting means connects the load receiving portion and the rotating shaft portion. In the above-described embodiments, the load receiving portion corresponds, in a narrow sense, to the dash panel 16, and in a broad sense, to the portion of the vehicle from the dash panel 16 to portions of the pedal bracket 30 (more specifically, the base plate 34 which is mounted to the dash panel 16 and which is displaced rearward without buckling at the time the dash panel 16 is displaced rearwardly, and the front end portions of the side plates 32 (the portions further toward the front than the holes 40) which, even if they buckle, only deform very slightly).

A second embodiment of the present invention will be described hereinafter with reference to FIG. 10.

Figure 10:
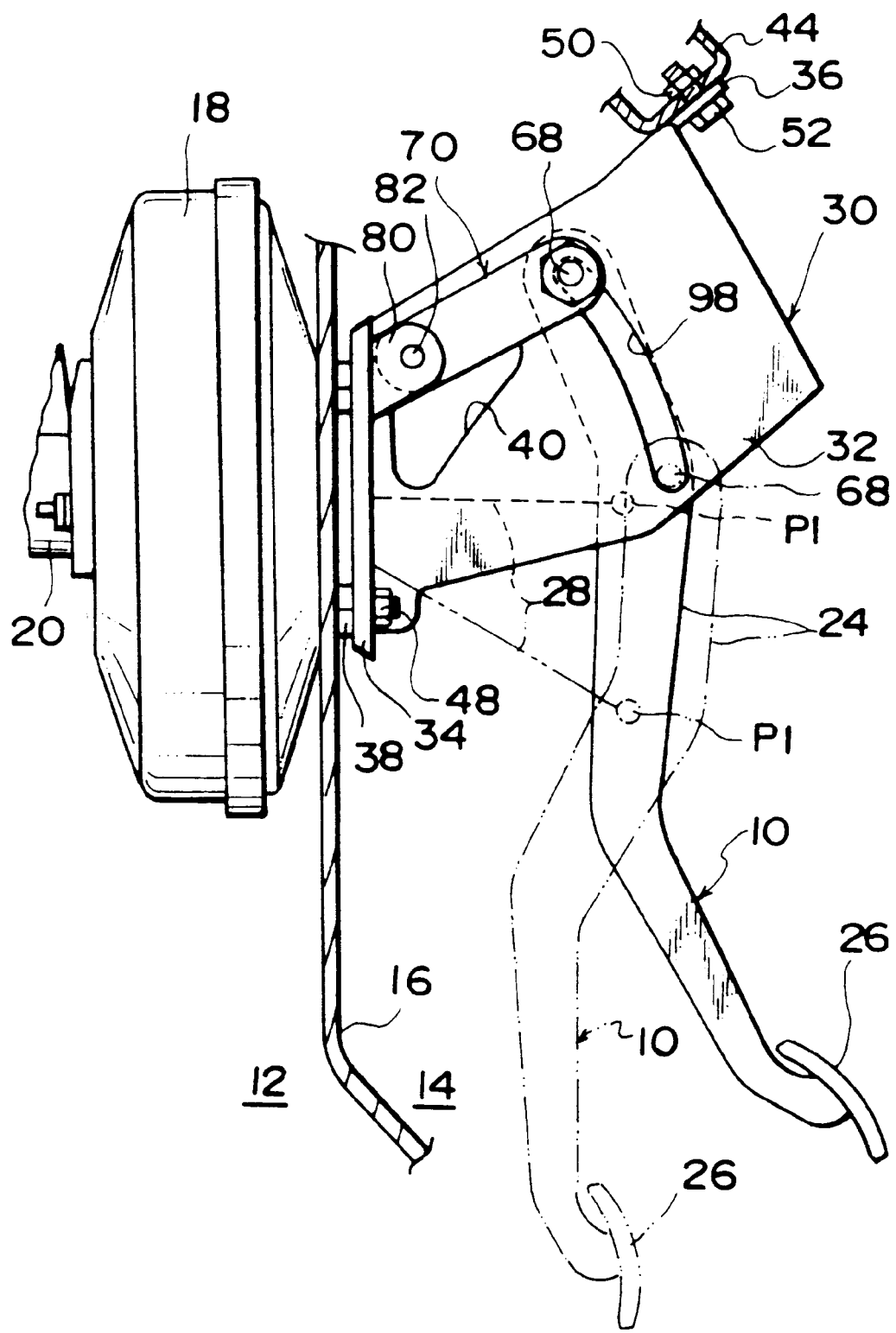
FIG. 10 is a side view illustrating a supporting structure of a pedal device for a vehicle relating to a second embodiment.

As illustrated in FIG. 10, in the second embodiment, the pair of side plates 32 of the pedal bracket 30 are formed so as to extend downward so as to be wide. In place of the previously-described elongated holes 42 whose longitudinal directions are the longitudinal direction of the vehicle, elongated holes 98, which extend in circular arc shapes substantially toward the rear of the vehicle and downwardly, are formed in the side plates 32 in the second embodiment. The rotating shaft portion 68 of the brake pedal 10 is positioned at the upper end portions of the elongated holes 98.

In accordance with the above-described structure, when the pedal bracket 30 buckles in the longitudinal direction due to the rearward displacement of the dash panel 16, the rotating shaft portion 68 (more correctly, the collar 60) of the pedal bracket 30 is, by the push plates 70, pressed to contact the inner peripheral surfaces of the rear sides of the elongated holes 98. Because the elongated holes 98 are formed in circular arc shapes extending substantially toward the rear of the vehicle and downwardly as described above, the locus of movement of the rotating shaft portion 68 is also a circular arc shaped locus oriented substantially toward the rear of the vehicle and downwardly. The rotating shaft portion 68 moves substantially toward the rear of the vehicle and downwardly along the elongated grooves 98 as illustrated by the two-dot-chain line in the figure. Accordingly, control is effected such that the pedal pad 26 of the brake pedal 10 is displaced substantially toward the front of the vehicle, and the driver's knee can be kept away from the steering column.

Further, in the second embodiment, because the elongated holes 98 are formed as circular arc shapes which are directed substantially toward the rear of the vehicle and downwardly, as compared with the case in which the elongated grooves 42 extending in the longitudinal direction are used, the pedal pad 26 of the brake pedal 10 can be actively displaced toward the front of the vehicle.

A third embodiment of the present invention will be described hereinafter on the basis of FIG. 11.

Figure 11:
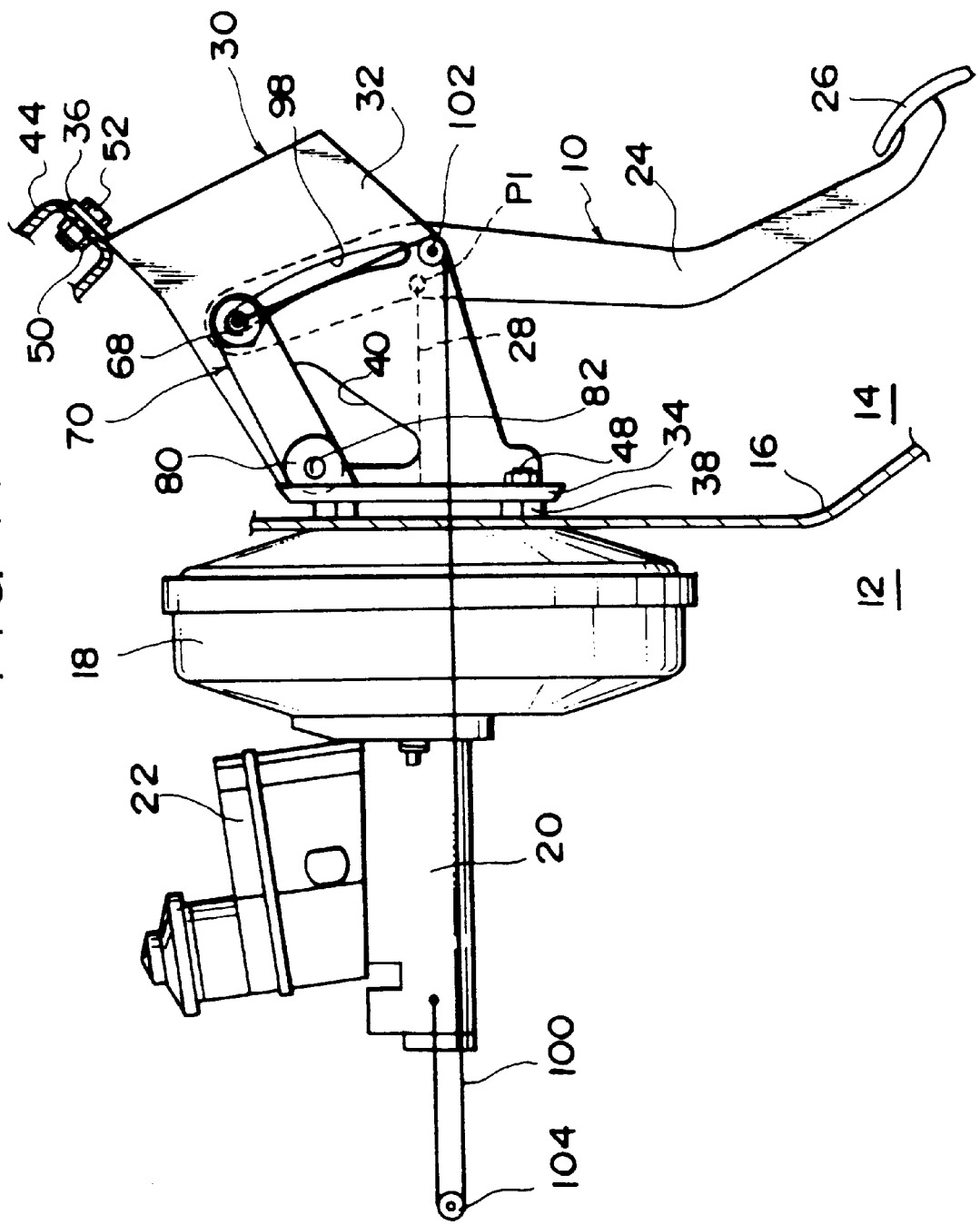
FIG. 11 is a side view illustrating a supporting structure of a pedal device for a vehicle relating to a third embodiment.

As shown in FIG. 11, in the third embodiment, the rotating shaft portion 68 of the brake pedal 10 and the master cylinder 20 are connected by a wire 100 (conceptually, a pulling means). More specifically, one end of the wire 100 is engaged with one end portion of the rotating shaft portion 68. As the structure of this engagement, a structure may be employed in which an annular hardware is attached to the one end of the wire 100, and the hardware is nipped between the washer surface of the washer faced bolt 62 and the rear end portion of one of the push plates 70. The intermediate portion of the wire 100 is entrained about an inner pulley 102 (conceptually, a pulling direction changing means or an interrupting means) which is shaft-supported beneath the elongated hole 98 at one of the side plates 32 of the pedal bracket 30. Thereafter, the intermediate portion of the wire 100 is pulled toward the front of the vehicle and is entrained about an outer pulley 104 (conceptually, a pulling direction changing means or an interrupting means) which is fixedly shaft-supported at the vehicle body. The wire 100 is then doubled back and engaged to a vicinity of the front end portion of the master cylinder 20.

It is preferable that the outer pulley 104 is disposed at a region which is further toward the front of the vehicle than the master cylinder 20 within the engine room 12 and at which there is little deformation when an external force of a predetermined value or greater is applied from the front of the vehicle (e.g., at the suspension tower, the front side member, or the like). Further, in consideration of an external force of a predetermined value or greater which is applied from the front of the driver's seat, the outer pulley 104 may be provided on each of the left and right suspension towers or the like, and two wires 100 may be used such that the wires 100 are entrained around the outer pulleys 104 respectively.

In accordance with the above-described structure, when the pedal bracket 30 buckles in the longitudinal direction, the push plates 70 are pushed, and the rotating shaft portion 68 is moved along the elongated holes 98 substantially toward the rear of the vehicle and downwardly. Accordingly, in the present embodiment as well, control is effected such that the pedal pad 26 of the brake pedal 10 is displaced substantially toward the front of the vehicle, and the driver's knee can be kept away from the steering column.

When the master cylinder 20 is displaced rearwardly as the dash panel 16 is displaced rearwardly, the other end of the wire 100 is pulled toward the rear. Therefore, tensile force toward the inner pulley 102 is applied to the rotating shaft portion 68 to which one end of the wire 100 is engaged. This tensile force is an assisting force at the time when the rotating shaft portion 68 is moved along the elongated holes 98. More specifically, the rotating shaft portion 68 is moved substantially toward the rear of the vehicle and downwardly, with the pushing force from the push plates 70 essentially being the motive force. In the third embodiment, when the rotating shaft portion 68 is moved, the tensile force due to the wire 100 is applied to the rotating shaft portion 68. Therefore, the force for moving the rotating shaft portion 68 substantially toward the rear of the vehicle and downwardly can be augmented. Accordingly, the rotating shaft portion 68 can be moved reliably substantially toward the rear of the vehicle and downwardly.

In the third embodiment, although the other end of the wire 100 is engaged with the master cylinder 20, the present invention is not limited to the same, and the other end of the wire 100 may be engaged with the brake booster 18 or the dash panel 16.

Further, the one end of the wire 100 may be directly engaged with the rotating shaft portion 68 without using the push plate 70. In this case, the tensile force due to the wire 100 becomes motive force at the time the rotating shaft portion 68 is moved. Here, the present embodiment is not an embodiment of the twenty-fourth aspect of the invention, but rather, is an embodiment of the first aspect of the present invention.

A fourth embodiment of the present invention is described hereinafter with reference to FIGS. 12 and 13.

Figure 12:
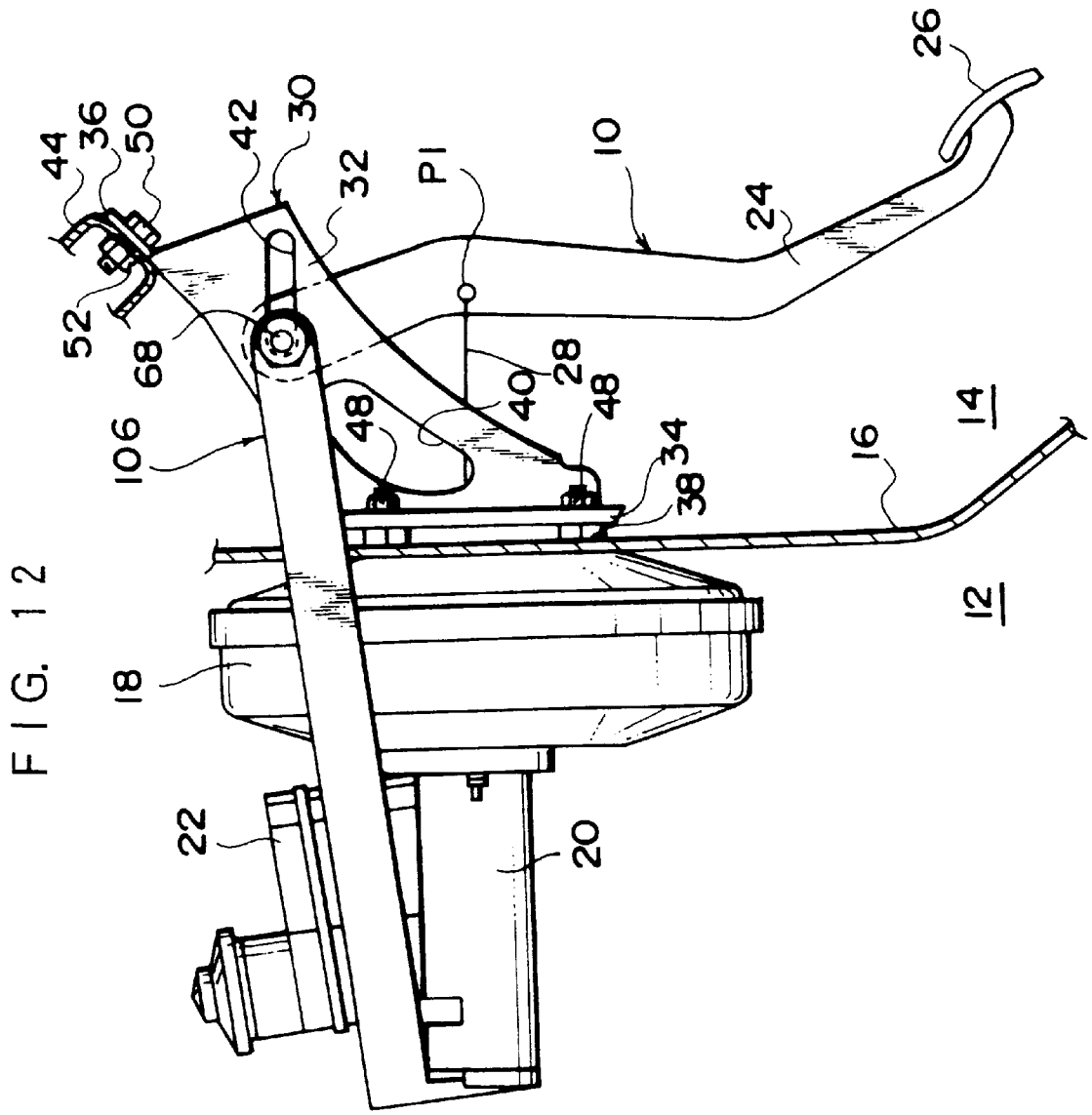
FIG. 12 is a side view illustrating a supporting structure of a pedal device for a vehicle relating to a fourth embodiment.
Figure 13:
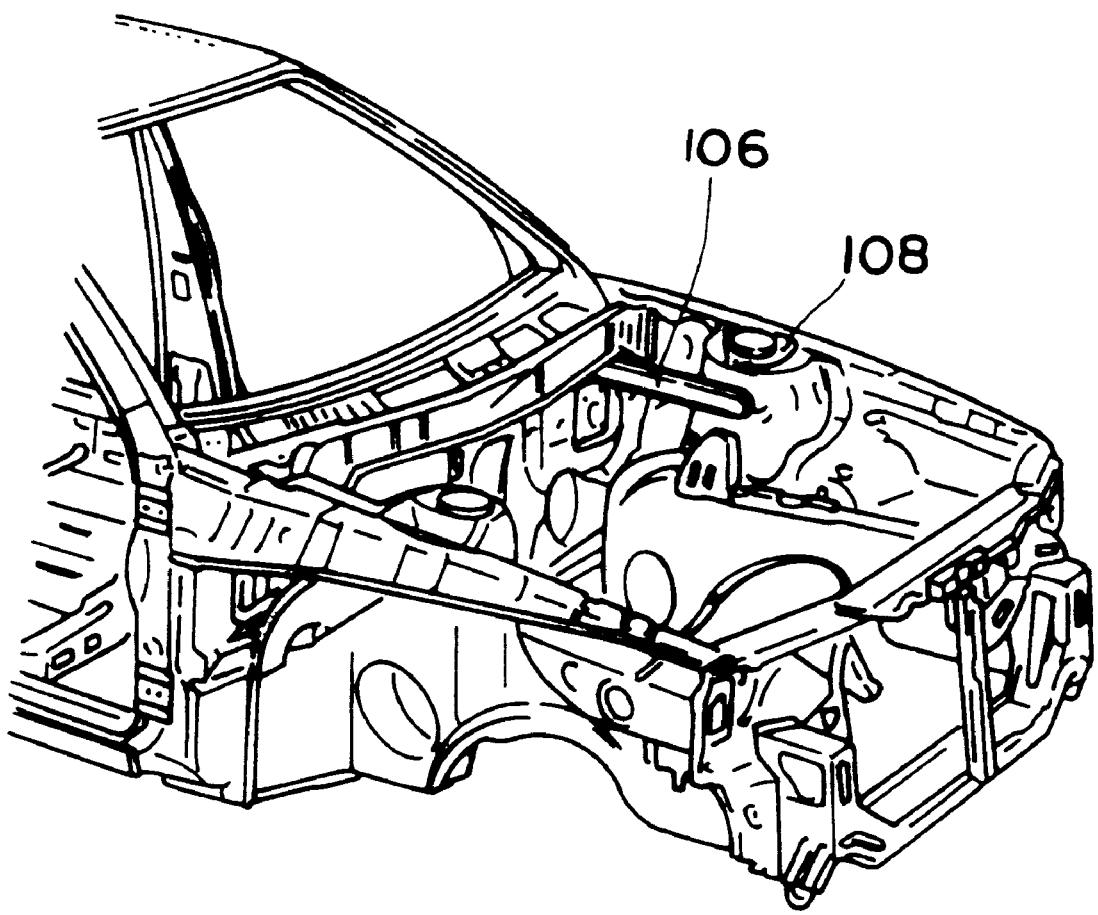
FIG. 13 is a perspective view illustrating an embodiment in which a fixing position of a front end portion of a push bar illustrated in FIG. 12 is at a suspension tower.

As illustrated in FIG. 12, in place of the push plates 70, a push bar 106, which is longer in the longitudinal direction of the vehicle than the push plates 70, is used in the fourth embodiment. The rear end portion of the push bar 106 is connected to the rotating shaft portion 68 of the brake pedal 10. The intermediate portion of the push bar 106 passes through the dash panel 16 and extends toward the engine room 12. The front end portion of the push bar 106 is fixed to the front end portion of the master cylinder 20. The rigidity of the push bar 106 in the longitudinal direction is set to be higher than the rigidity of the pedal bracket 30 in the longitudinal direction.

In accordance with the above structure, when an external force of a predetermined value or greater is applied from the front of the vehicle, the following operation is carried out. Here, an example will be described in which the rearward displacement velocity of the master cylinder 20 is larger than the rearward displacement velocity of the connecting point (P1) of the brake pedal 10 and the push rod 28. A case corresponding to this example is a case in which, for example, while the driver is stepping down on the brake pedal 10, the load, at the time an external force of a predetermined value or greater is applied from the front of the vehicle, is applied directly to the master cylinder 20 before being applied to the dash panel 16. In this case, the amount of rearward displacement of the master cylinder 20 is greater than the amount of rearward displacement of the dash panel 16.

Here, when the load applied from the front of the vehicle is received and the master cylinder 20 is displaced rearwardly, as the master cylinder 20 is displaced rearwardly, the dash panel 16 is also displaced rearwardly, and the side plates 32 of the pedal bracket 30 buckle in the longitudinal direction. As a result, the rotating shaft portion 68 which is shaft-supported at the rear end portion of the push bar 106 moves substantially toward the rear of the vehicle along the elongated holes 42 of the pedal bracket 30. As a result, torque substantially toward the front of the vehicle is applied to the pedal pad 26 of the brake pedal 10 around the connecting point (P1). Therefore, control is effected such that the pedal pad 26 of the brake pedal 10 is displaced substantially toward the front of the vehicle, and the driver's knee can be kept away from the steering column.

Further, the load in this case is applied directly to the master cylinder 20 before being applied to the dash panel 16, and the amount of rearward displacement of the master cylinder 20 is greater than the amount of rearward displacement of the dash panel 16. Therefore, if a structure such as that of the fourth embodiment is employed, when an external force of a predetermined value or greater is applied from the front of the vehicle, the external force can be transmitted to the rotating shaft portion 68 of the brake pedal 10 in a short time, and the amount of rearward displacement of the rotating shaft portion 68 substantially toward the rear of the vehicle can be increased. Accordingly, the movement of the rotating shaft portion 68 substantially toward the rear of the vehicle can be made quick and reliable.

In the fourth embodiment, the front end portion of the push bar 106 is fixed to the front end portion of the master cylinder 20. However, the present invention is not limited to the same. As illustrated in FIG. 13, the front end portion of the push bar 106 may be fixed to a suspension tower 108 which is a structural member of the vehicle which is disposed further toward the front of the vehicle than the dash panel 16. Alternatively, the front end portion of the push bar 106 may be fixed to a member of the vehicle body having a large amount of rearward displacement at the time an external force of a predetermined value or greater is applied from the front of the vehicle, such as the engine mount, the battery, the cross member, the front bumper or the like.

A fifth embodiment of the present invention will be described hereinafter on the basis of FIGS. 14 through 16.

Figure 14:
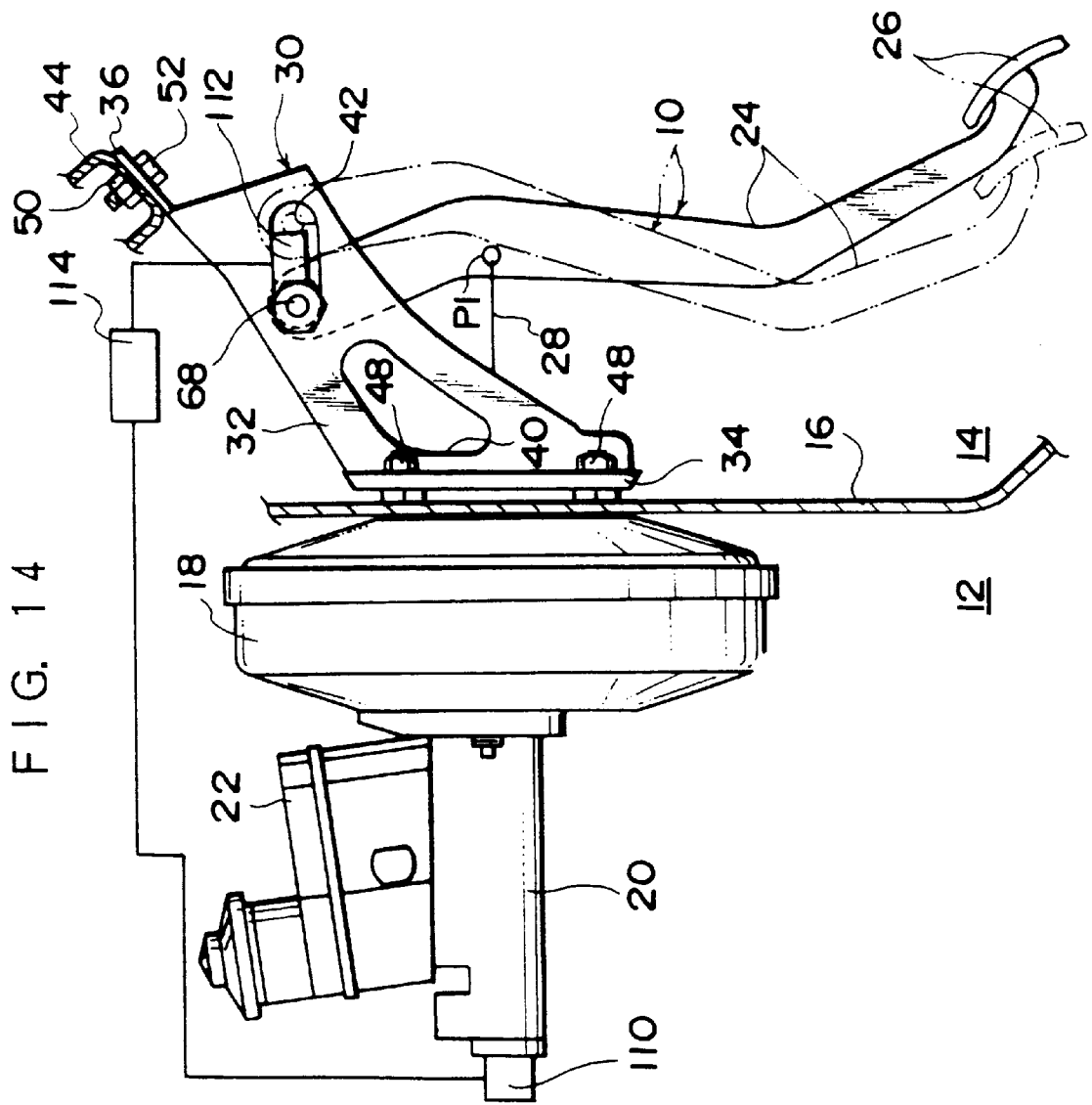
FIG. 14 is a side view illustrating a supporting structure of a pedal device for a vehicle relating to a fifth embodiment.

As illustrated in FIG. 14, in the fifth embodiment, a state in which an external force of a predetermined value or greater is applied from the front of the vehicle is detected by an electrical structure and the rotating shaft portion 68 is moved rearward by the electrical structure.

More specifically, a G sensor 110, which is an acceleration sensor for detecting the above-described state, is provided at the front end portion of the master cylinder 20. A load detecting sensor, which directly detects the load at the time that an external force of a predetermined value or greater is applied from the front of the vehicle, or a stroke detecting sensor, which detects the amount of rearward displacement of a member at the time that an external force of a predetermined value or greater is applied from the front of the vehicle, or the like may be used in place of the G sensor 110. An actuator 112 is disposed at the rotating shaft portion 68. The actuator 112 includes a drive source such as a motor or the like, and a driving means which moves the rotating shaft portion 68 by a predetermined amount along the elongated holes 42 by a mechanism such as a rack and pinion due to driving force from the drive source. The G sensor 110 and the actuator 112 are connected to a control device 114. The control device 114 controls the driving of the actuator 112 on the basis of a detection signal outputted from the G sensor 110.

Figure 15:
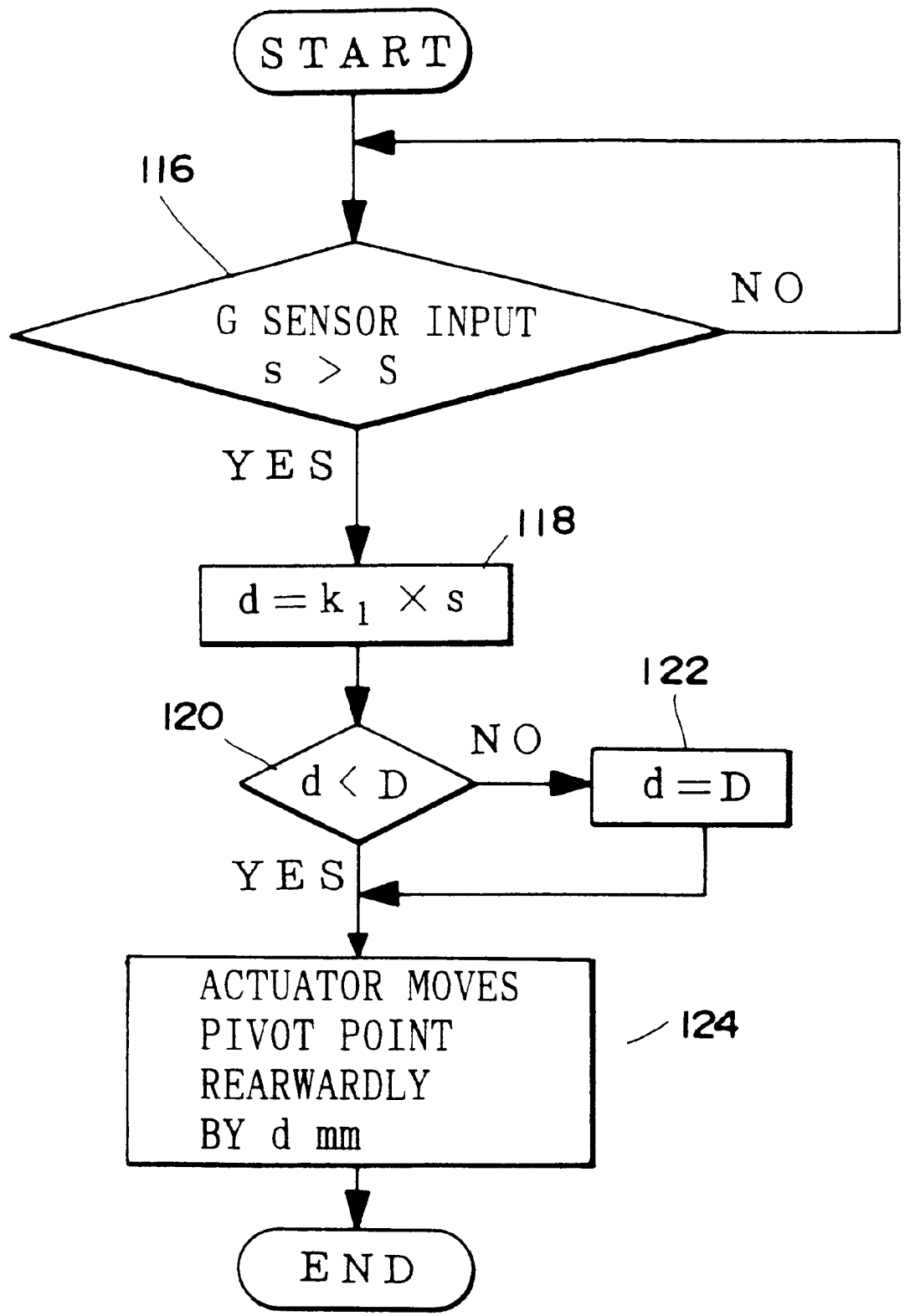
FIG. 15 is a flowchart illustrating control contents carried out by the system illustrated in FIG. 14.
Figure 16:
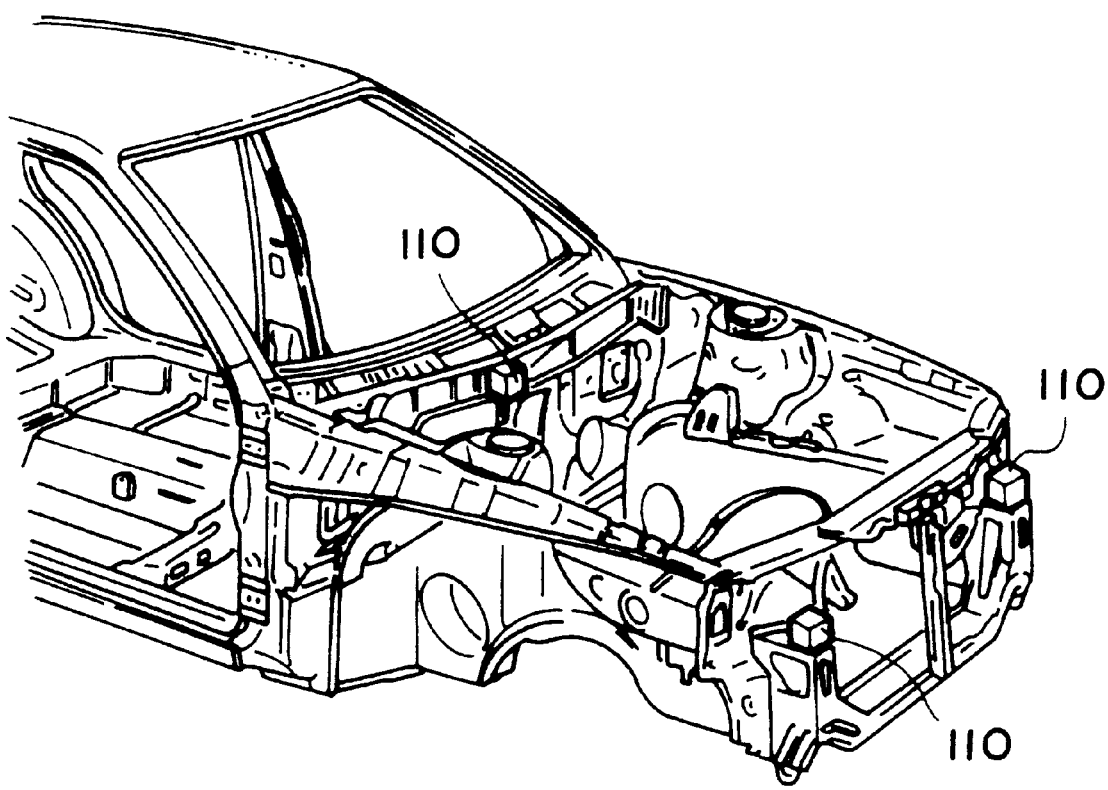
FIG. 16 is a perspective view of a vehicle body front portion illustrating an embodiment in which a region at which a G sensor illustrated in FIG. 14 is disposed has been changed.

In accordance with the above-described structure, as illustrated in FIG. 15, in step 116, a determination is made as to whether the value s of the detected G is greater than the value S of a reference G. More specifically, after the detection signal is fetched from the G sensor 110, the value s of the detected G is computed on the basis of this detection signal. Then, a determination is made as to whether the value s of the detected G, which is the result of the computation, is greater than the value S of the preset reference G. If the answer to the determination in step 116 is affirmative, in step 118, the amount of movement d of the rotating shaft portion 68 is computed. Here, the amount of movement d of the rotating shaft portion 68 is computed by the formula $d=k_1 \times s$, wherein $k_1$ is a correction coefficient (a constant). If the determination in step 116 is negative, step 116 is repeated.

Next, in step 120, a determination is made as to whether the amount of movement d of the rotating shaft portion 68 is shorter than the length D of the elongated hole 42. If the determination in step 120 is negative, the routine proceeds to step 122 where the amount of movement d of the rotating shaft portion 68 is set to the length D of the elongated hole 42. Namely, when it is determined from the results of calculation that the amount of movement d is greater than the length D of the elongated hole 42, the actual amount of movement of the rotating shaft portion 68 is limited to the length of the length D of the elongated hole 42. On the other hand, if the determination in step 120 is affirmative, the amount of movement d of the rotating shaft portion 68 is set to the value obtained by computation.

In step 124, a driving signal is outputted to the actuator 112, and the rotating shaft portion 68 (the pivot point) is moved rearward by the set amount of movement d (mm), and the routine ends.

Accordingly, in the fifth embodiment as well, control is effected such that the pedal pad 26 of the brake pedal 10 is displaced substantially toward the front of the vehicle, and the driver's knee can be kept away from the steering column.

In the fifth embodiment, the single G sensor 110 is disposed at the front end portion of the master cylinder 20. However, the present invention is not limited to the same. As illustrated in FIG. 16, a plurality of G sensors 110 may be provided within the engine room 12 or at the front end portion of the vehicle or the like. In this way, it can be detected in what form was the external force of a predetermined value or greater applied from the front of the vehicle, and differences in the deformation of the vehicle body based on the form of the application of the external force can be detected in detail. The amount of movement of the rotating shaft portion 68 (the pivot point) can therefore be set on the basis of a comprehensive determination. Moreover, it can be detected in what form was the external force of a predetermined value or greater applied from the front of the vehicle, and in accordance with the differences in the deformation of the vehicle body based on the form of the application of the external force, the moving velocity of the rotating shaft portion 68 can be controlled in addition to the amount of movement thereof by changing the program of the control device 114.

A sixth embodiment of the present invention is described hereinafter with reference to FIGS. 17 through 22.

Figure 17:
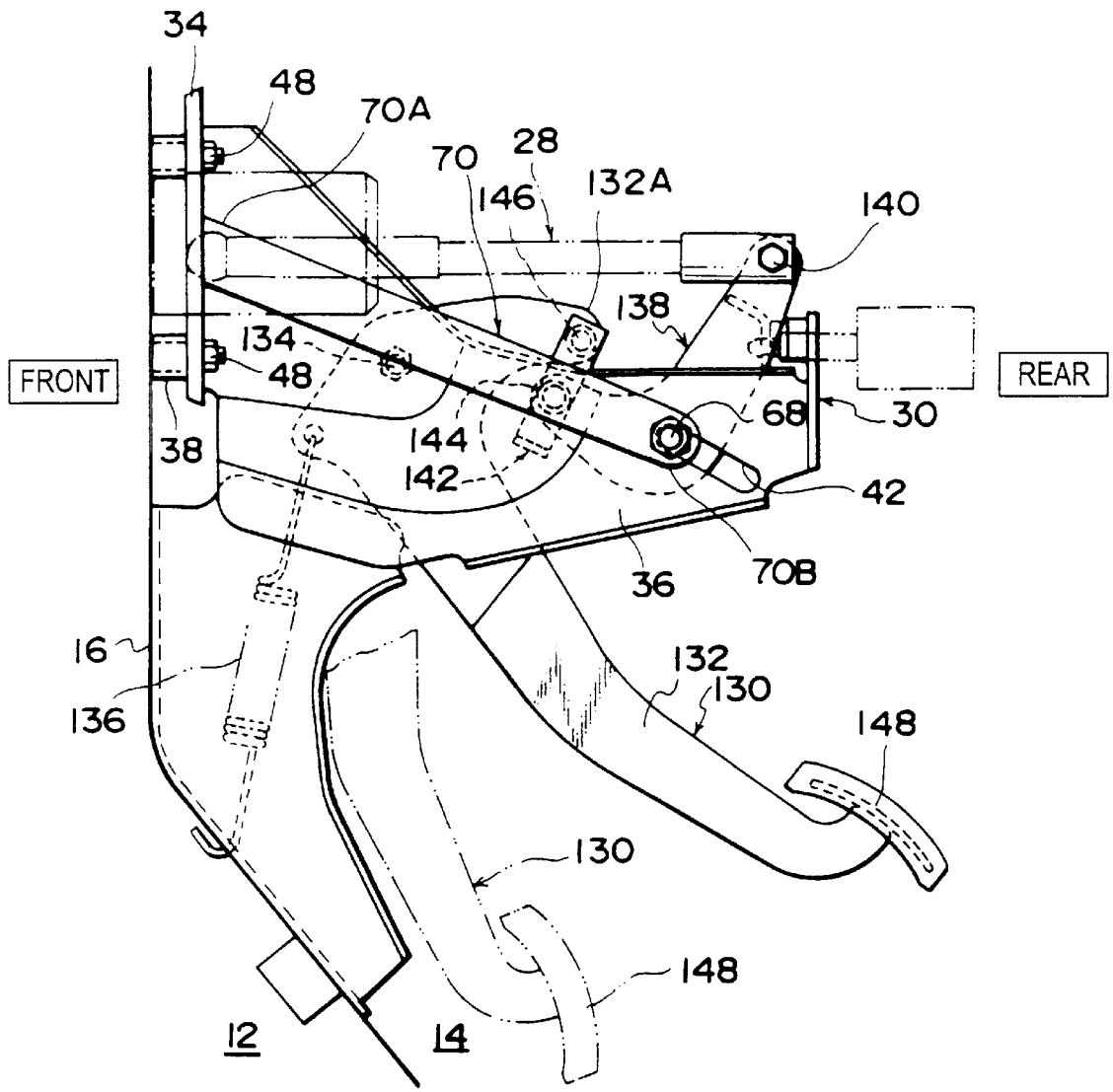
FIG. 17 is a side view illustrating a supporting structure of a pedal device for a vehicle relating to a sixth embodiment.

As illustrated in FIG. 17, a brake pedal 130 used in the sixth embodiment is a push rod non-connected type. In the brake pedal 130, a shaft 134 is supported near an upper end of the intermediate portion of a pedal supporting portion 132 so as to be swingable. The upper end portion of the pedal supporting portion 132 of the brake pedal 130 curves and projects toward the rear of the vehicle. (Hereinafter, this region will be referred to as a "projecting end portion 132A".) A small hole is formed near the intermediate portion front end of the pedal supporting portion 132. One end of a return spring 136 is engaged with this small hole. The other end of the return spring 136 is engaged with the dash panel 16. In this way, the brake pedal 130 is always urged to rotate around the shaft 134 in the counterclockwise direction in the figure (i.e., in the direction of the position illustrated by the solid line in the figure).

The elongated holes 42, which extend linearly and rearward at a downward incline, are formed in a vicinity of the rear end portion of the pedal bracket 30. The rotating shaft portion 68, which is disposed at the intermediate portion of a substantially V-shaped swinging link 138 and which is the center of rotation of the swinging link 138, is disposed at the front end portions of the elongated holes 42. The rear end portions of the push plates 70 are connected to the rotating shaft portion 68. The front end portions of the push plates 70 are fixed to the dash panel 16 via the base plate 34.

The distal end portion of the push rod 28 which projects from the brake booster 18 is hinge-joined by a hinge pin 140 to one end portion of the swinging link 138. Lower end portions of linear connecting links 142 are hinge-joined to the other end portion of the swinging link 138 by a hinge pin 144. The projecting end portion 132A of the pedal supporting portion 132 of the brake pedal 130 is hinge-joined to the upper end portions of the connecting links 142 by a hinge pin 146.

In accordance with the above structure, at the time of normal braking operation, when stepping force is applied to a pedal pad 148 and the brake pedal 130 swings substantially toward the front of the vehicle around the shaft 134, the swinging link 138 swings counterclockwise around the rotating shaft portion 68 via the connecting links 142. Therefore, the push rod 28 is pushed toward the front of the vehicle by the one end portion of the swinging link 138. Use of a structure which pushes the push rod 28 by using a link mechanism such as the connecting links 142 and the swinging link 138 improves the operational feeling of the brake pedal 130 mainly by setting the pedal ratio to a desired value.

In the above-described structure, when an external force of a predetermined value or greater is applied from the front of the vehicle, the rear end portions of the push plates 70 are displaced rearward due to the rearward displacement of the dash panel 16. As a result, the rotating shaft portion 68 of the swinging link 138, which rotating shaft portion 68 is shaft-supported at the rear end portions of the push plates 70, is moved rearward at a downward incline along the elongated holes 42. Therefore, the other end portion of the swinging link 138 is pulled in the same direction, and accordingly, the hinge pin 144 of the connecting links 142 is also pulled in the same direction. The connecting links 142 rotate so as to be positioned on an imaginary extension line of the elongated holes 42. Due to the torque at this time, the hinge pin 146 which joins the connecting links 142 and the projecting end portion 132A of the brake pedal 130 is pulled downwardly. As a result, the brake pedal 130 swings clockwise around the shaft 134 (in the direction of the position illustrated by the two-dot-chain line).

Accordingly, in the sixth embodiment as well, control is effected such that the pedal pad 148 of the brake pedal 130 is displaced substantially toward the front of the vehicle, and the driver's knee can be kept away from the steering column.

In particular, in the sixth embodiment, a rotation moment in the clockwise direction around the shaft 134 can be applied to the brake pedal 130 by using the swinging link 138 and the connecting links 142. Therefore, the pedal pad 148 can be actively displaced substantially toward the front of the vehicle.

Figure 18:
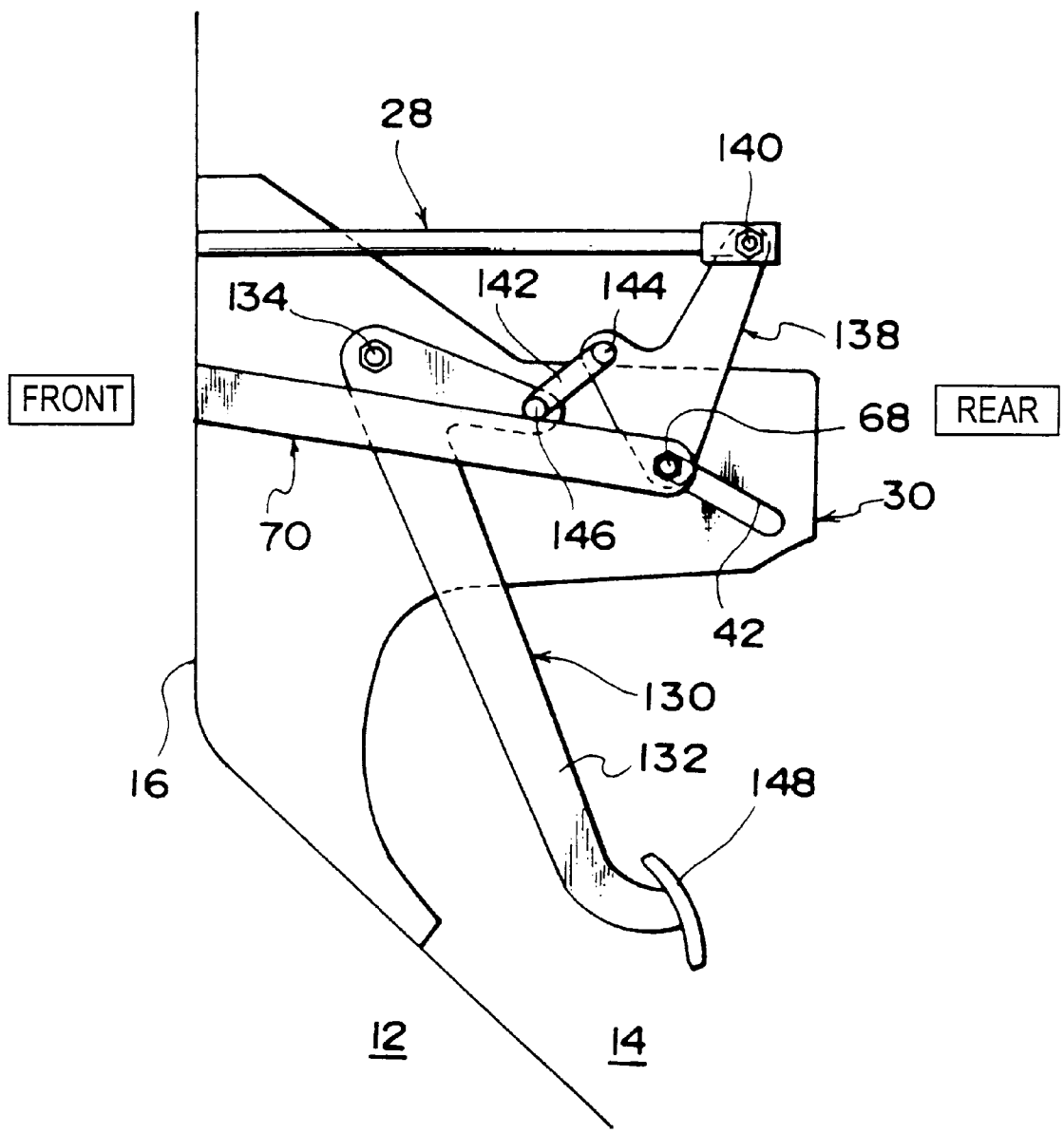
FIG. 18 is a schematic side view illustrating an embodiment in which the configurations, the arrangement and the like of links illustrated in FIG. 17 have been changed.
Figure 19:
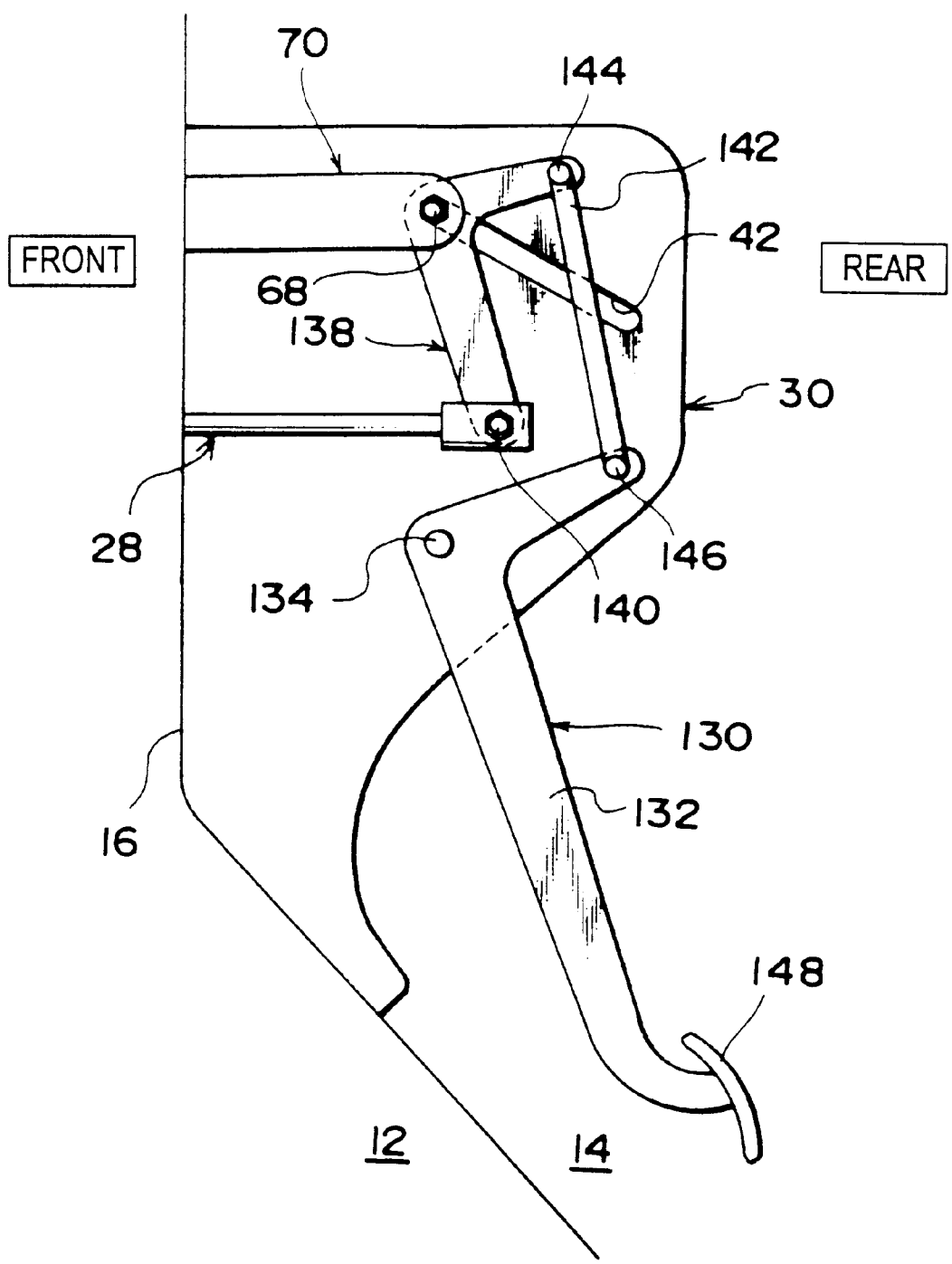
FIG. 19 is a schematic side view illustrating an embodiment in which the configurations, the arrangement and the like of the links illustrated in FIG. 17 have been changed.
Figure 20:
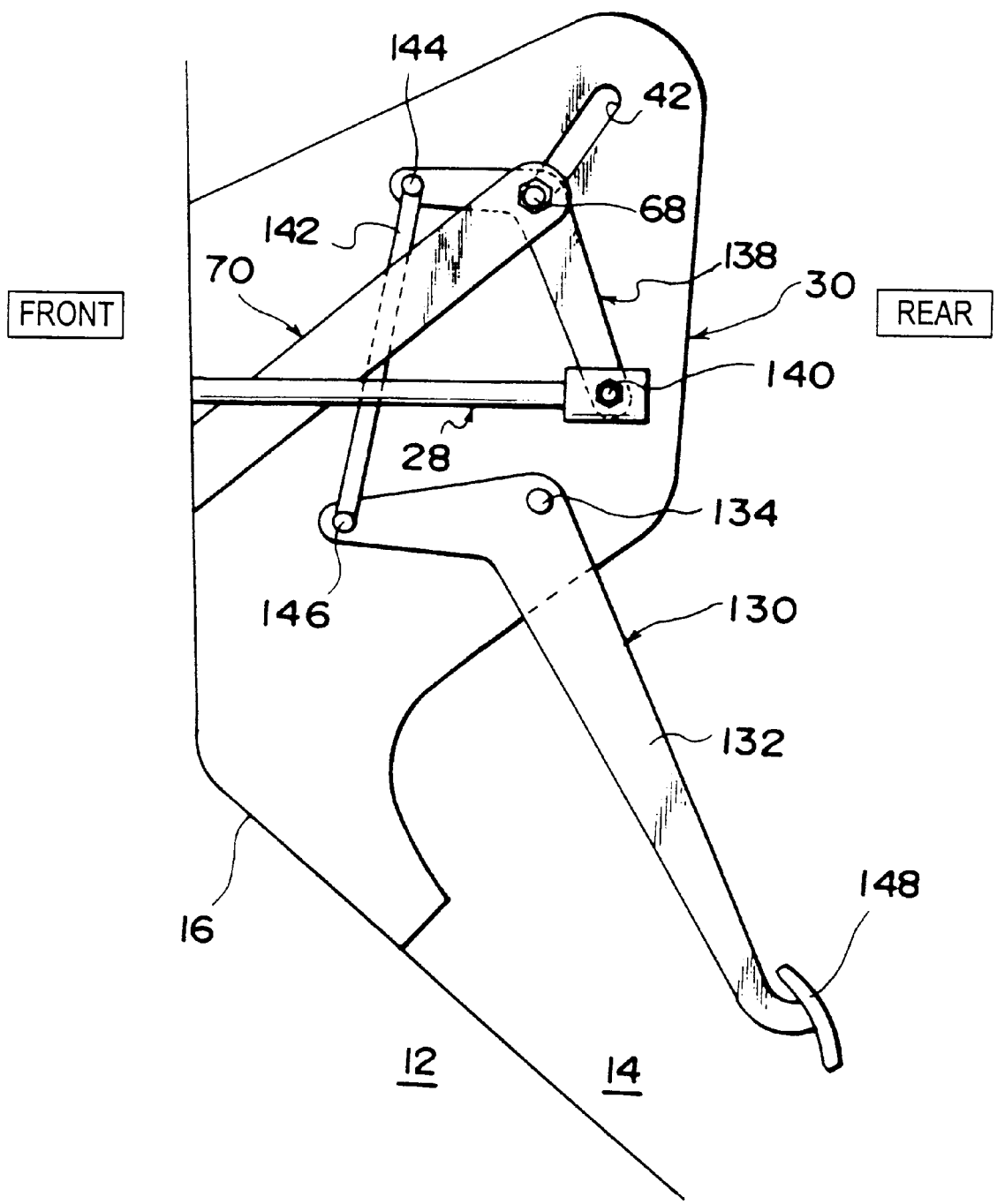
FIG. 20 is a schematic side view illustrating an embodiment in which the configurations, the arrangement and the like of the links illustrated in FIG. 17 have been changed.

The configurations and the arrangement of the brake pedal 130, the connecting links 142 and the swinging link 138 can be changed arbitrarily by using different combinations of a plurality of links. Accordingly, the degrees of freedom in the design can be increased. The embodiments illustrated in FIGS. 18 through 20 provide support for this effect. Note that FIGS. 18 through 20 have been drawn summarily so that attention can be focused on the possibility of changes in the configurations and the arrangement of the brake pedal 130, the connecting links 142 and the swinging link 138. Further, because the operation is the same as that of the present embodiment, description thereof will be omitted.

Figure 21:
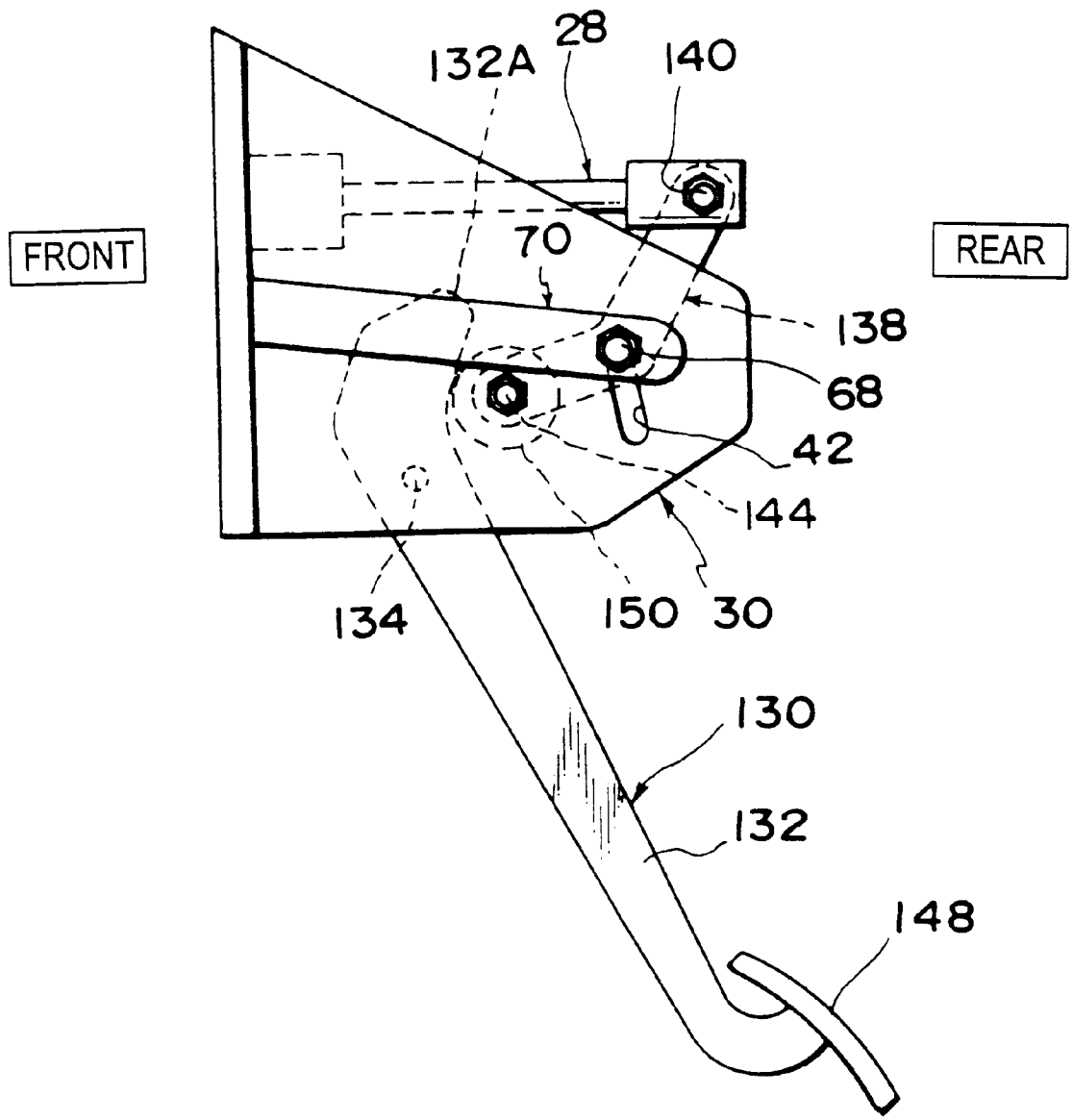
FIG. 21 is a schematic side view illustrating an embodiment in which a rotating roller is used in place of a connecting link illustrated in FIG. 17.

In the embodiment illustrated in FIG. 21, in place of the above-described connecting links 142, a rotating roller 150 is shaft-supported by a hinge pin 144 at the other end portion of the swinging link 138. The outer peripheral surface of the rotating roller 150 abuts the rear surface of the projecting end portion 132A of the brake pedal 130. When the brake pedal 130 is swung, the swinging link 138 is rotated counterclockwise in the figure around the rotating shaft portion 68 while the rotating roller 150 rotates.

In accordance with the above structure, when an external force of a predetermined value or greater is applied from the front of the vehicle, the rotating shaft portion 68 which shaft-supports the swinging link 138 is moved rearward and at a downward incline along the elongated holes 42 by the push plates 70. Therefore, the rotating roller 150 is displaced in the same direction. Accordingly, the brake pedal 130 swings substantially toward the front of the vehicle around the shaft 134 while the surface of the pedal supporting portion 132 at the rear side of the vehicle is pushed by the rotating roller 150. As a result, the pedal pad 148 can be actively displaced substantially toward the front of the vehicle.

Figure 22:
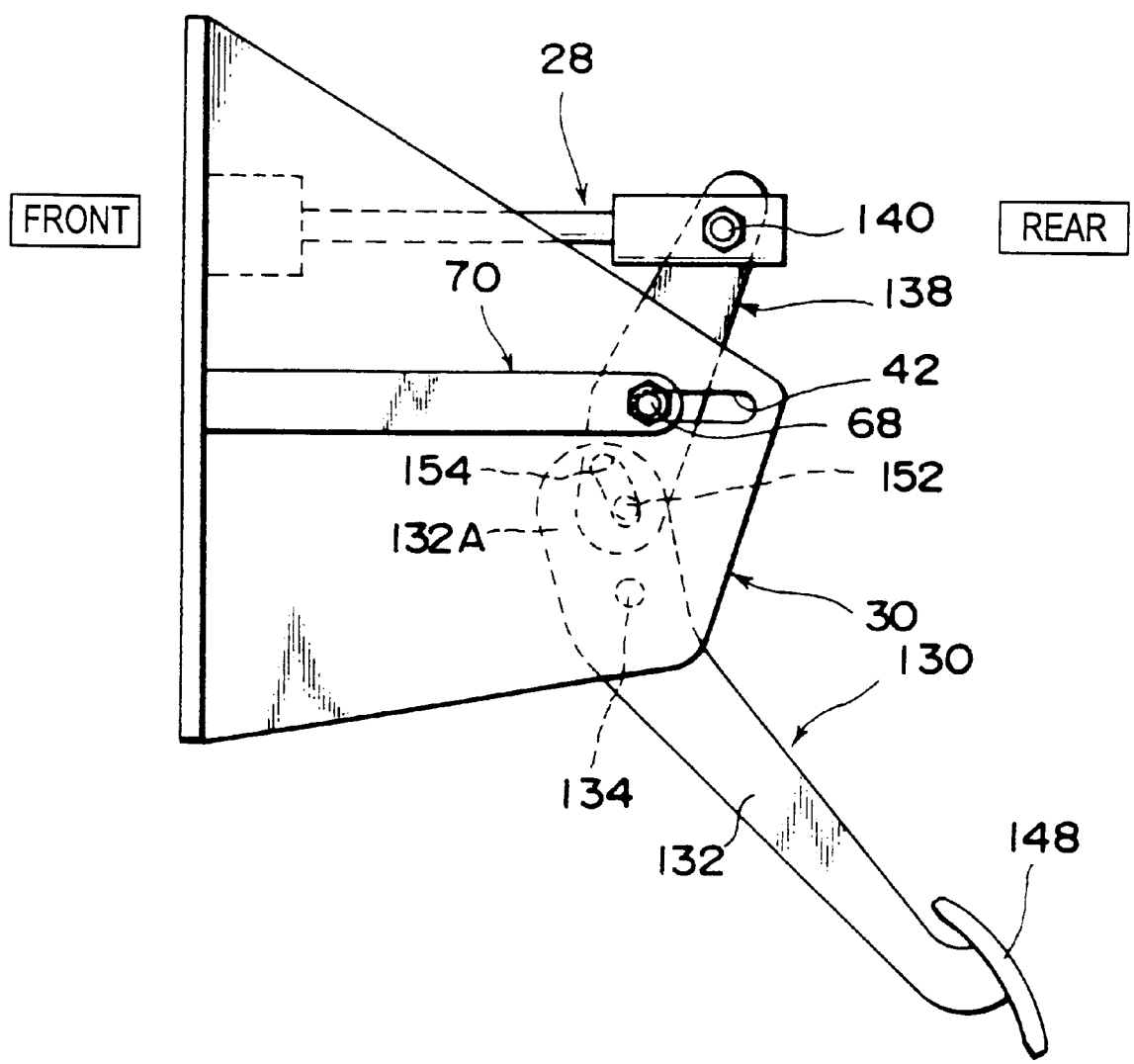
FIG. 22 is a schematic side view illustrating an embodiment in which an engagement pin and an engagement hole are used in place of the connecting link illustrated in FIG. 17.

In the embodiment illustrated in FIG. 22, the swinging link 138 is formed so as to be linear. An engagement pin 152 is provided upright at the other end portion of the swinging link 138. A circular arc shaped engagement hole 154 is formed in the side surface of the projecting end portion 132A of the brake pedal 130 so as to correspond to the engagement pin 152. In place of the engagement hole 154, a groove-like engagement recess may be used. The swinging link 138 and the brake pedal 130 are connected by the engagement pin 152 engaging the lower end portion of the engagement hole 154.

In accordance with the above structure, when an external force of a predetermined value or greater is applied from the front of the vehicle, the rotating shaft portion 68 which shaft-supports the swinging link 138 is moved rearward along the elongated holes 42 by the push plates 70. Therefore, the engagement pin 152 also starts to move rearward in the same direction by the same amount. Accordingly, the engagement hole 154 is guided by the engagement pin 152, and the brake pedal 130 swings in the clockwise direction in the figure around the shaft 134. As a result, when an external force of a predetermined value or greater is applied from the front of the vehicle, the pedal pad 148 can be actively displaced toward the front of the vehicle.

The assisting means using the wire 100, the inner pulley 102 and the outer pulley 104 relating to the previously-described third embodiment may be added to the sixth embodiment.

A seventh embodiment of the present invention will be described hereinafter on the basis of FIGS. 23 through 29.

Figure 23:
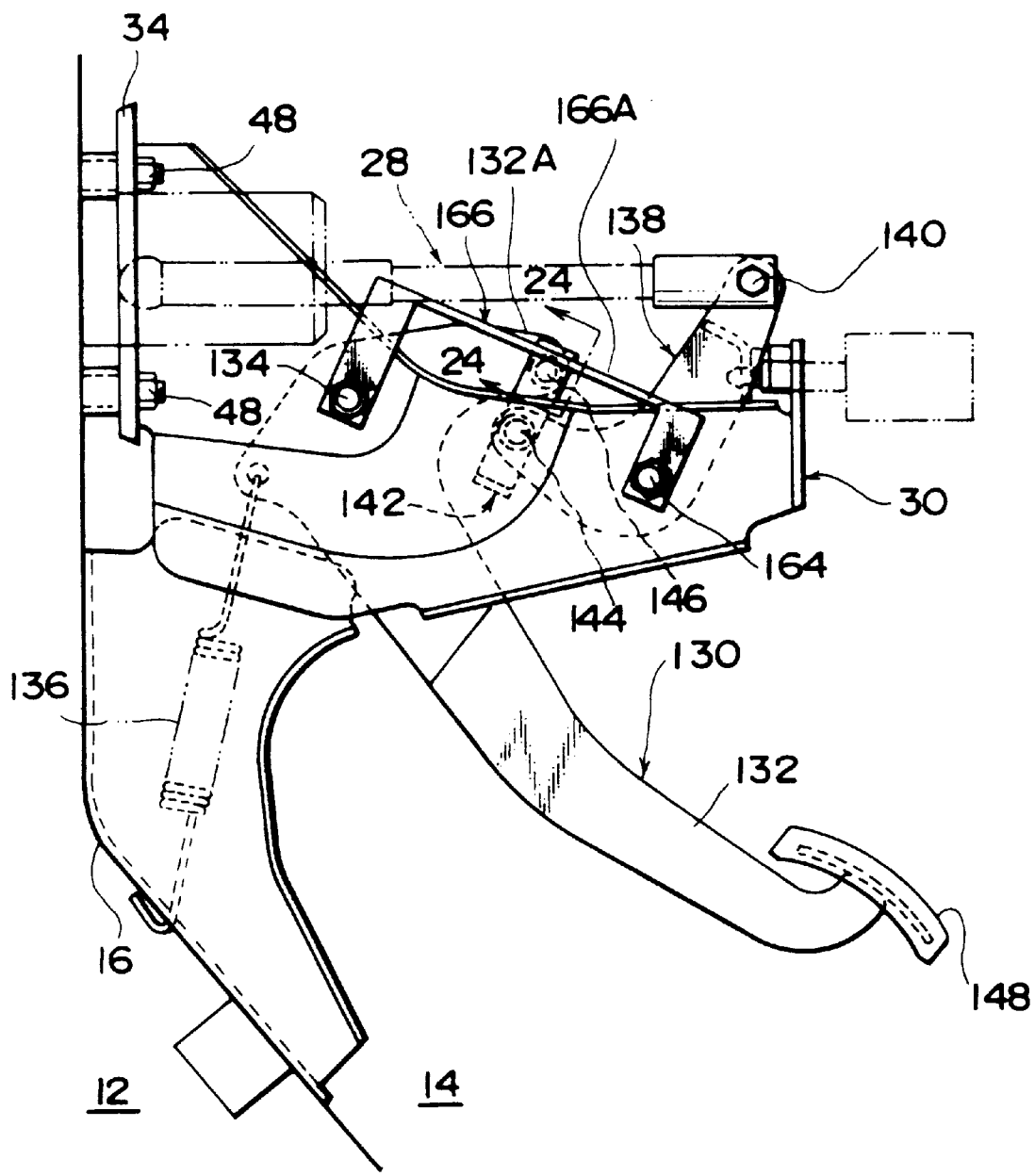
FIG. 23 is a side view illustrating a supporting structure of a pedal device for a vehicle relating to a seventh embodiment.
Figure 24:
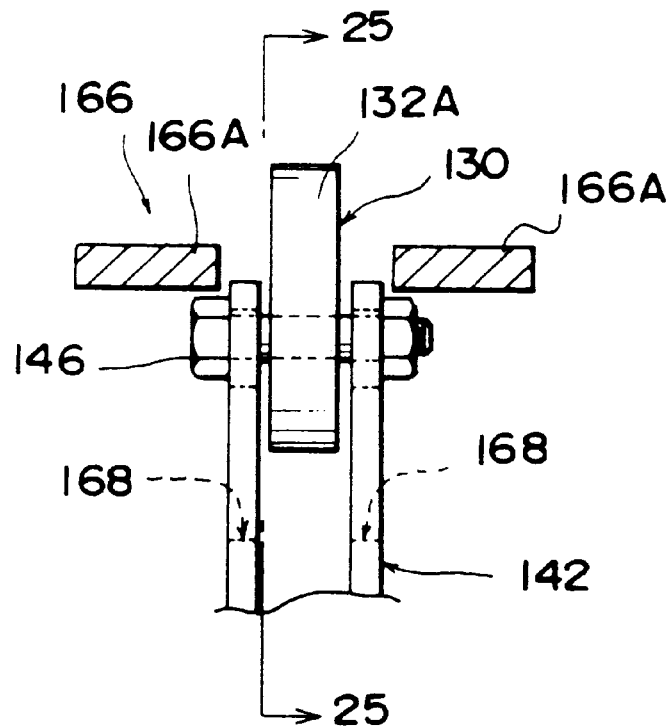
FIG. 24 is a cross-sectional view taken along line 24—24 of FIG. 23.
Figure 25:
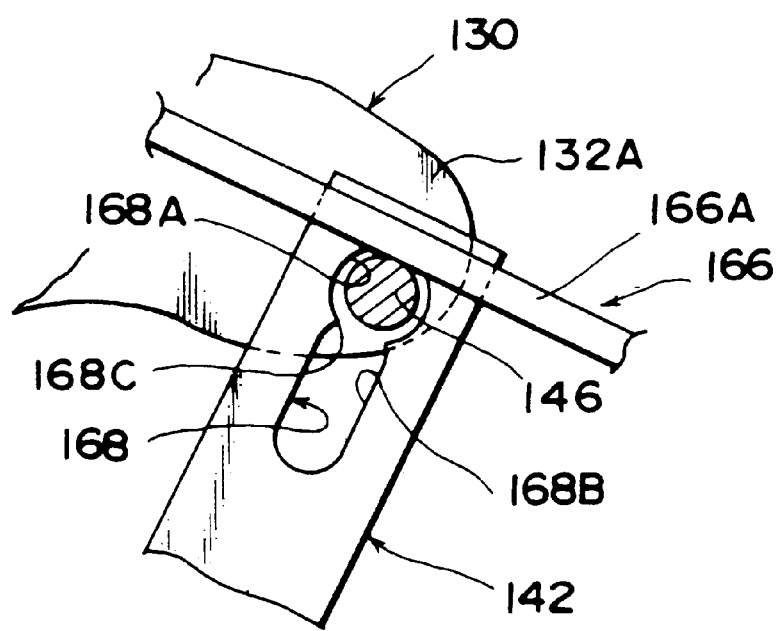
FIG. 25 is a cross-sectional view taken along line 25—25 of FIG. 24.

As shown in FIGS. 23 through 25, the same type of link structure as that of the embodiment illustrated in FIG. 17 is also used in the seventh embodiment. More specifically, the one end portion of the swinging link 138 and the distal end portion of the push rod 28 are connected by the hinge pin 140. The other end portion of the swinging link 138 and the projecting end portion 132 of the brake pedal 130 are connected by the hinge pins 144, 146 via the connecting links 142 so as to be movable relative to one another. Accordingly, the projecting end portion 132A of the brake pedal 130 and the other end portion of the swinging link 138 are indirectly connected via the connecting links 142 so as to be movable relative to one another.

However, in the seventh embodiment, a shaft 164 formed by a nut and a bolt is used as the center of rotation of the swinging link 138, and the elongated holes 42 provided in the above-described embodiments are not formed.

The shaft 164 of the swinging link 138 and the shaft 134 of the brake pedal 130 are connected by stopper plates 166 which are substantially U-shaped when viewed from the side. The stopper plates 166 are provided as a pair, with one on either side of the pedal supporting portion 132 of the brake pedal 130 (see FIG. 24). An energy absorbing hole 168 (see FIGS. 25 and 26) is formed at the upper end portion of each connecting link 142. The energy absorbing hole 168 is formed by a large diameter hole 168A, a slide hole 168B, and a narrow portion 168C which is provided at a region connecting the large diameter hole 168A and the slide hole 168B. The internal diameter dimension of the large diameter hole 168A is larger than the shaft portion of the hinge pin 146 which connects the upper end portion of the connecting link 142 and the projecting end portion 132A of the brake pedal 130. The transverse direction dimension of the slide hole 168B is substantially the same as the width of the shaft portion of the hinge pin 146. Further, the transverse direction dimension of the narrow portion 168C is set to be more narrow than the shaft portion of the hinge pin 146, so that the narrow portion 168C will plastically deform (break) due to a load of a predetermined value or greater being applied to the shaft portion of the hinge pin 146. Stopper portions 166A of the stopper plates 166 are disposed directly above the hinge pin 146 which is passed through the large diameter holes 168A, so that the stopper portions 166A are in a vicinity of or contact the hinge pin 146.

In accordance with the above structure, when an external force of a predetermined value or greater is applied from the front of the vehicle, as the master cylinder 20 is displaced rearward, the push rod 28 is displaced rearward. As the push rod 28 is displaced rearward, the swinging link 138 rotates clockwise around the shaft 164. As a result, the projecting end portion 132A of the brake pedal 130 is pushed upward via the connecting links 142. Torque in the counterclockwise direction around the shaft 134 is thereby applied to the brake pedal 130. Because the shaft portion of the hinge pin 146 abuts the stopper portions 166A of the stopper plates 166, the shaft portion receives reaction force from the stopper portions 166A, and the narrow portions 168C of the energy absorbing holes 168 are plastically deformed. At this time, energy is absorbed. As a result, the shaft portion of the hinge pin 140 moves relatively within the slide holes 168B of the energy absorbing holes 168, and the pedal pad 148 of the brake pedal 130 is maintained at its original position. Accordingly, in the seventh embodiment as well, the pedal pad 148 of the brake pedal 130 is not displaced substantially toward the rear of the vehicle, and in that sense, the displacement of the pedal pad 148 can be controlled.

Figure 26A:
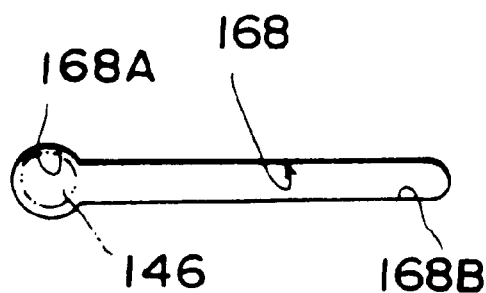
FIG. 26A is a schematic structural view illustrating another form of an energy absorbing structure illustrated in FIG. 25.
Figure 26B:
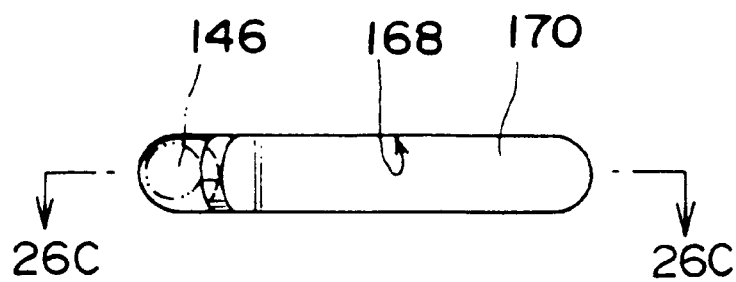
FIG. 26B is a schematic structural view illustrating another form of the energy absorbing structure illustrated in FIG. 25.
Figure 26C:
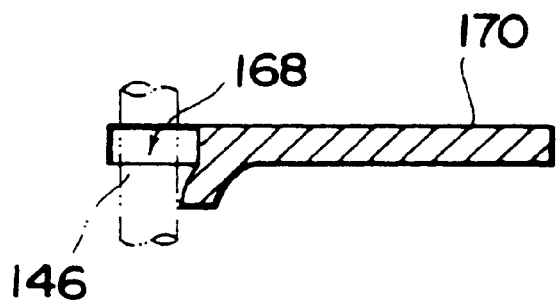
FIG. 26C is a schematic structural view illustrating another form of the energy absorbing structure illustrated in FIG. 25.
Figure 26D:
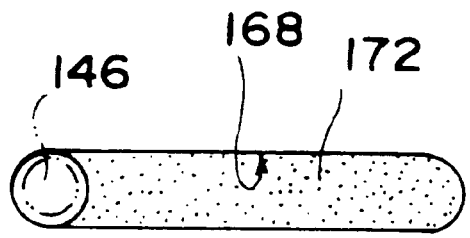
FIG. 26D is a schematic structural view illustrating another form of the energy absorbing structure illustrated in FIG. 25.

In the seventh embodiment, the energy absorbing structure (means) formed by the stopper plates 166 and the energy absorbing holes 168 is used. However, the present invention is not limited to the same, and any of a variety of energy absorbing structures (means) may be employed, as shown in FIGS. 26A through 26D for example. The structures illustrated in FIGS. 26A through 26D will be briefly described hereinafter. In the structure illustrated in FIG. 26A, the energy absorbing hole 168 is formed by the large diameter hole 168A, whose diameter dimension allows the shaft portion of the hinge pin 146 to pass therethrough, and by the slide hole 168B, which is formed to be slightly more narrow than the shaft diameter of the shaft portion of the hinge pin 146. When a load of a predetermined value or greater is applied to the shaft portion of the hinge pin 146, the slide holes 168B are split, and the shaft portion of the hinge pin 146 moves therein. In the structure illustrated in FIGS. 26B and 26C, the energy absorbing hole 168 is formed by a slide hole of a uniform width through which the shaft portion of the hinge pin 146 can pass. A shear pin 170 of a predetermined configuration is inserted in the energy absorbing holes 168. When a load of a predetermined value or greater is applied to the shaft portion of the hinge pin 146, the shear pin 170 is sheared and comes out from the energy absorbing holes 168, and movement of the shaft portion of the hinge pin 146 is permitted. In the structure illustrated in FIG. 26D, the energy absorbing hole 168 having the same structure as that illustrated in FIG. 26B is formed. However, an elastic body 172 formed of rubber or the like is fit in the energy absorbing hole 168 of FIG. 26D. When a load of a predetermined value or greater is applied to the shaft portion of the hinge pin 146, the shaft portion moves due to the elastic bodies 172 being compressed.

Figure 27:
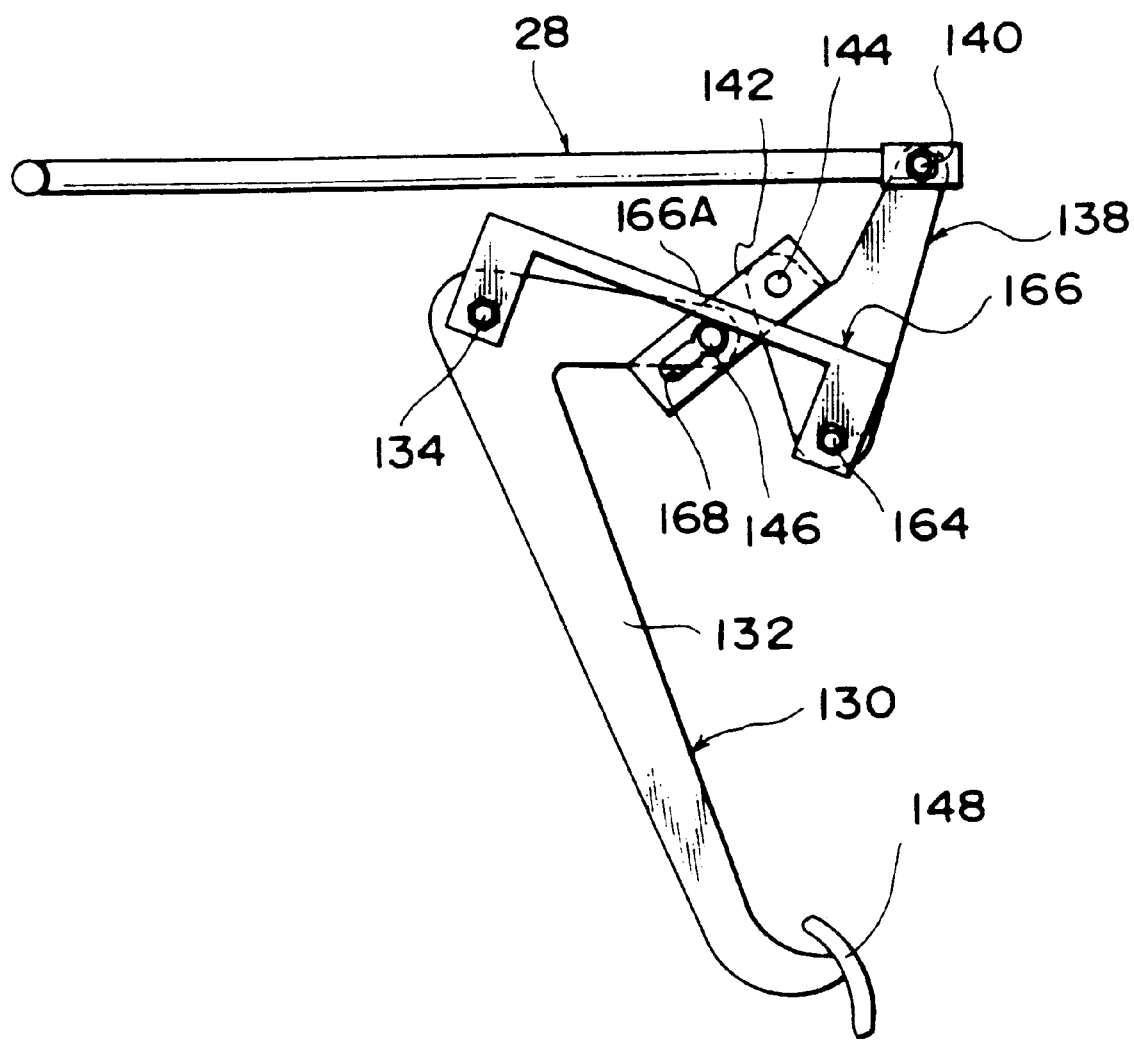
FIG. 27 is a schematic side view illustrating an embodiment in which the configurations, the arrangement and the like of links illustrated in FIG. 23 have been changed.
Figure 28:
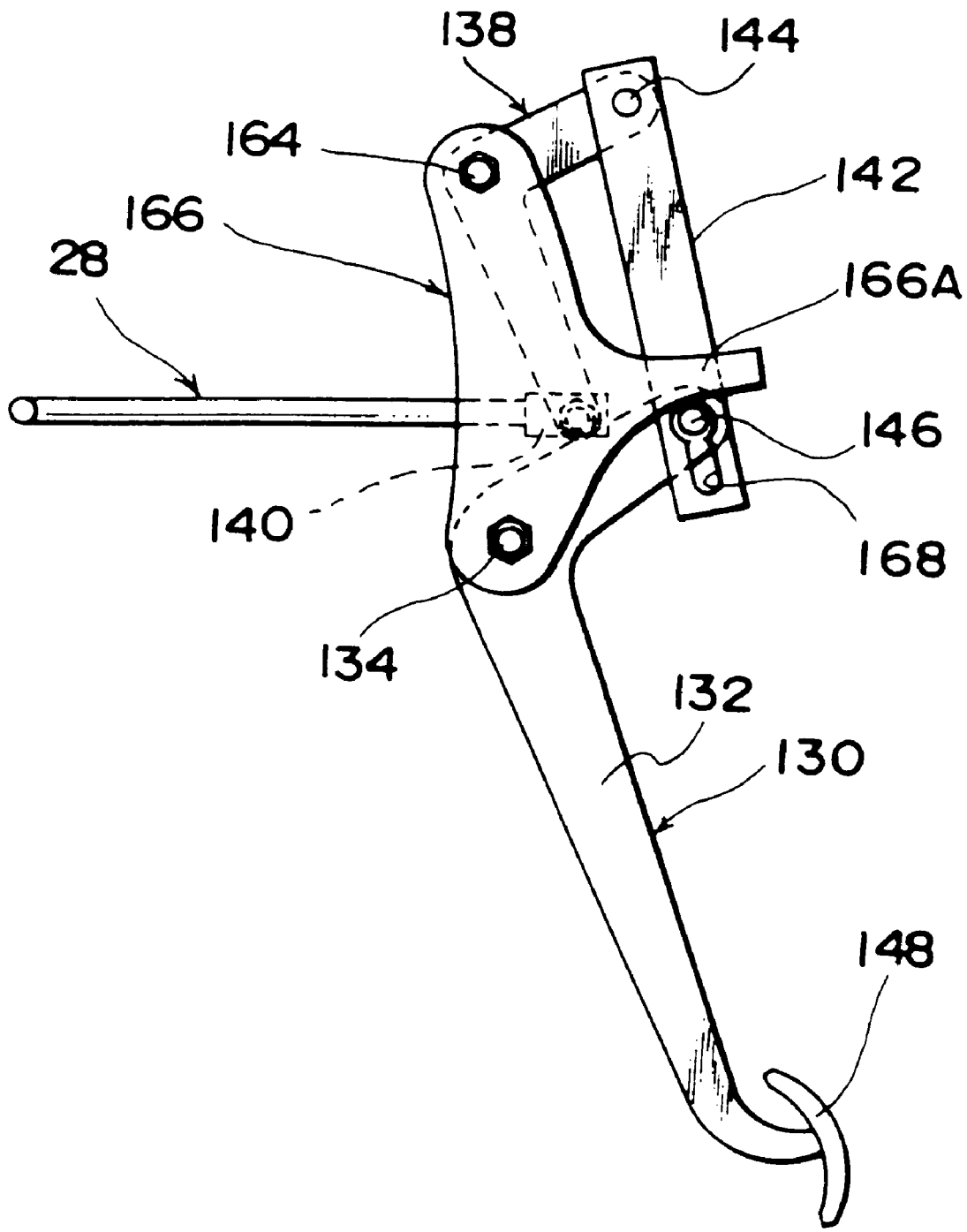
FIG. 28 is a schematic side view illustrating an embodiment in which the configurations, the arrangement and the like of the links illustrated in FIG. 23 have been changed.
Figure 29:
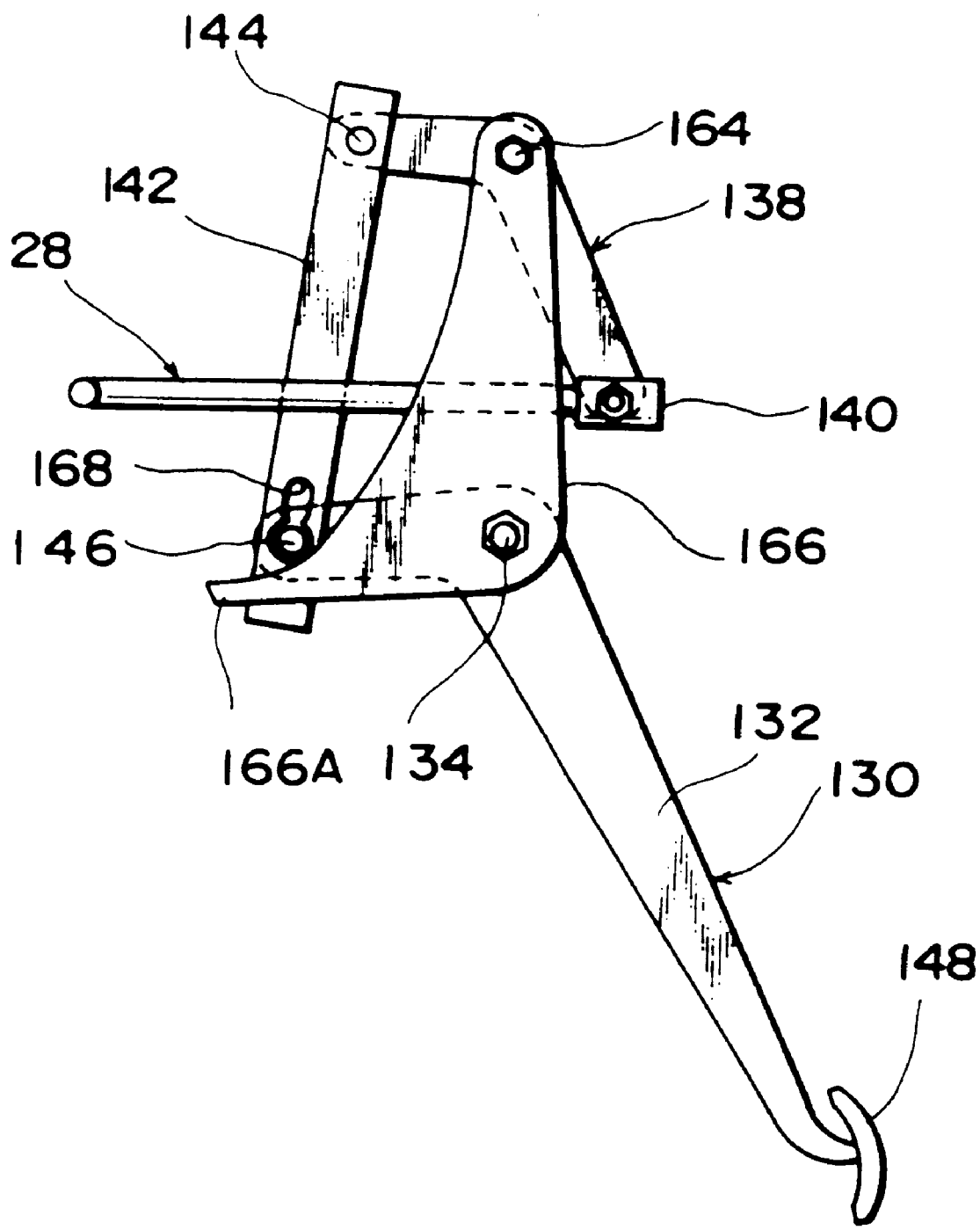
FIG. 29 is a schematic side view illustrating an embodiment in which the configurations, the arrangement and the like of the links illustrated in FIG. 23 have been changed.

In the present embodiment, as in the above-described embodiments, the configurations and the arrangement of the brake pedal 130, the connecting links 142, the swinging link 138 and the stopper plates 166 can be changed arbitrarily by using different combinations of a plurality of links. Accordingly, the degrees of freedom in the design can be increased. The embodiments illustrated in FIGS. 27 through 29 provide support for this effect. Note that FIGS. 27 through 29 have been drawn summarily so that attention can be focused on the possibility of changes in the configurations and the arrangement of the brake pedal 130, the connecting links 142, the swinging link 138 and the stopper plates 166. Further, because the operation is the same as that of the present embodiment, description thereof will be omitted.

In the seventh embodiment, a structure is employed in which the other end portion of the swinging link 138 and the projecting end portion 132A of the brake pedal 130 are indirectly connected via the connecting links 142 so as to be rotatable relative to one another. However, if the advantage of being able to change the pedal ratio arbitrarily is not needed, the other end portion of the swinging link 138 and the projecting end portion 132A of the brake pedal 130 can be connected together directly by the hinge pin 144. In this case, because a structure which does not use the connecting links 142 is provided, the configuration of the projecting end portion 132A of the brake pedal 130 may be changed, and the energy absorbing hole 168 may be formed directly in the projecting end portion 132A. Further, there is no need to provide the stopper plates 166 separately and independently. For example, the configuration of the pedal bracket 30 may be changed, and a structure in which flange portions corresponding to the stopper plates 166 are formed integrally with the pedal bracket 30 or are attached to the pedal bracket 30 subsequent to the formation of the pedal bracket 30 may be used.

Hereinafter, an eighth embodiment of the present invention is described with reference to FIGS. 30 through 35.

In the eighth embodiment, a structure for preventing interference between the push plates 70 and the side plates 32 of the pedal bracket 30 at the time the pedal bracket 30 buckles is added so as to improve the side plates 32.

Figure 30:
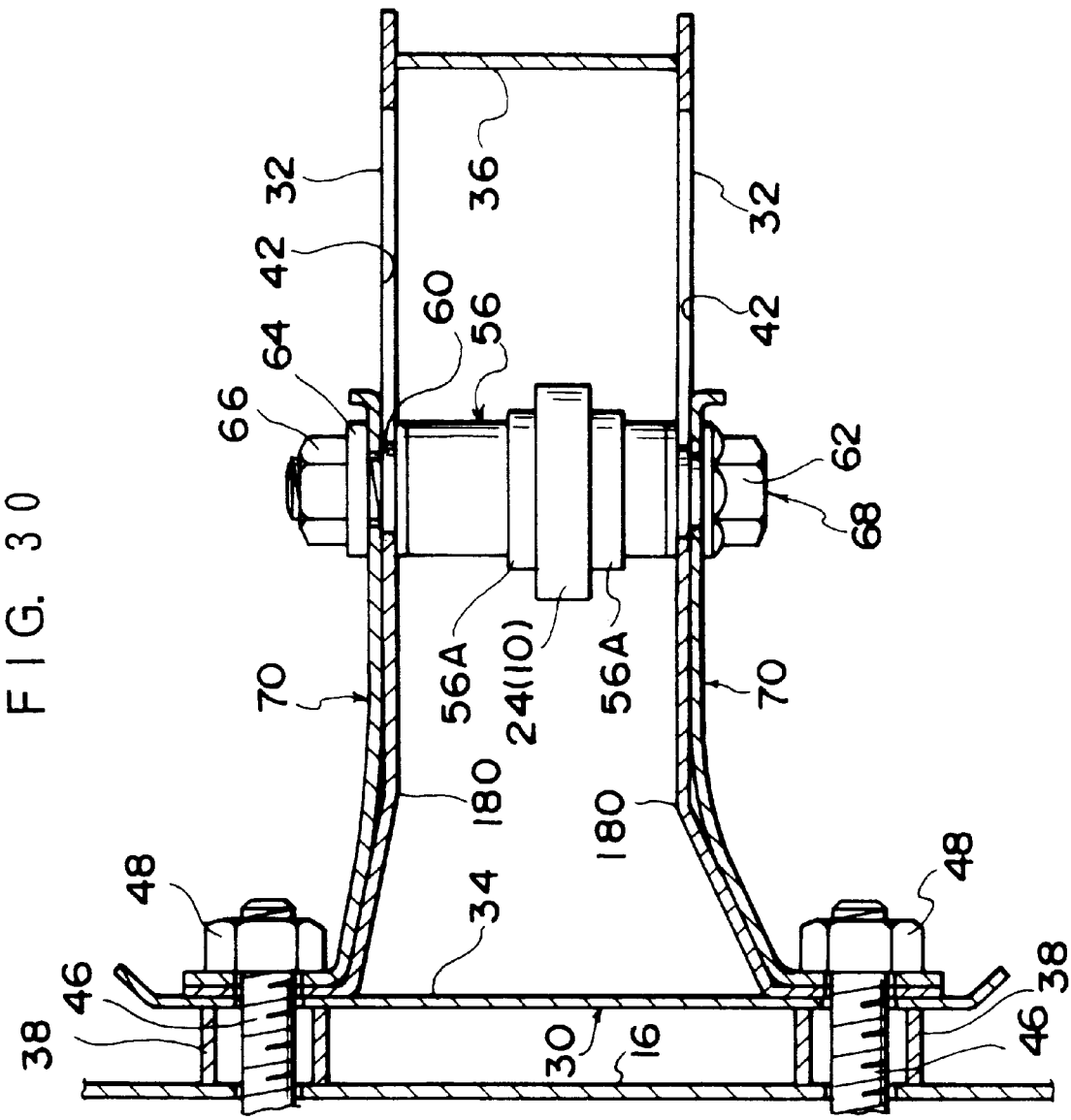
FIG. 30 is a horizontal sectional view focusing on a pedal bracket and illustrating a supporting structure of a pedal device for a vehicle relating to an eighth embodiment.
Figure 31:
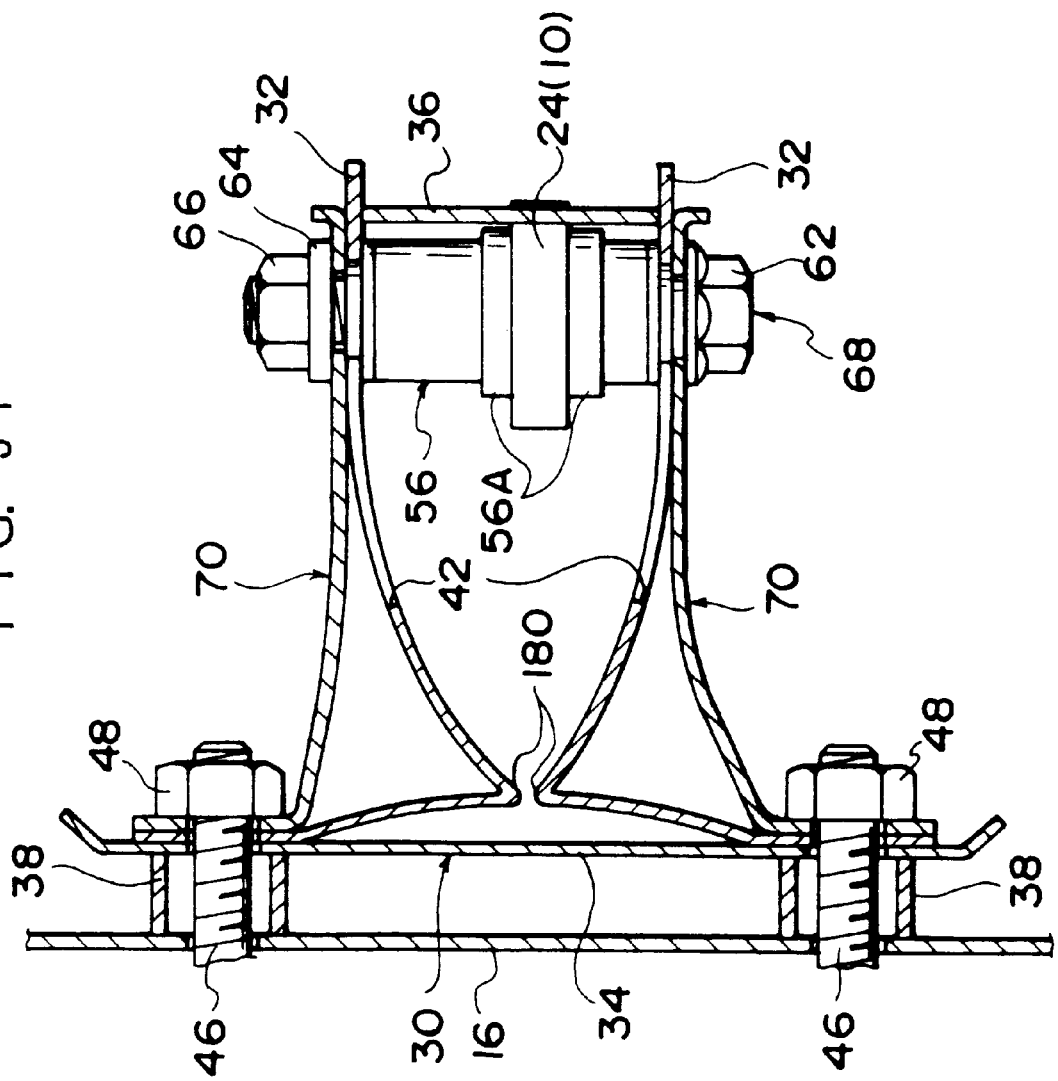
FIG. 31 is a horizontal sectional view corresponding to FIG. 30 and illustrating a state after an external force of a predetermined value or greater has been applied from a front of the vehicle in the structure illustrated in FIG. 30.

More specifically, in the embodiment illustrated in FIGS. 30 and 31, the push plates 70 are disposed at the outer sides of the pair of side plates 32 of the pedal bracket 30, and further, inwardly projecting portions 180 which project toward the center of the base plate 34 are formed at predetermined positions of the front end sides of the side plates 32. The inwardly projecting portions 180 are formed so as to oppose each other without being offset toward the front or the back.

In accordance with the above structure, when the dash panel 16 is displaced rearward at the time that an external force of a predetermined value or greater is applied from the front of the vehicle, in accordance with the rearward displacement of the dash panel 16, the pair of side plates 32 of the pedal bracket 30 buckles in the longitudinal direction. Here, in the eighth embodiment, because the inwardly projecting portions 180 which project toward the center of the base plate 34 are provided at predetermined positions of the front end sides of the side plates 32, the side plates 32 deform toward the center of the base plate 34 with the inwardly projecting portions 180 as starting points as illustrated in FIG. 31. Therefore, when the pedal bracket 30 buckles in the longitudinal direction, the side plates 32 and the push plates 70 do not interfere with each other. Accordingly, the push plates 70, other than the rear end portions thereof, do not receive sliding resistance from the side plates 32, and the rotating shaft portion 68 can move substantially toward the rear of the vehicle reliably and smoothly along the elongated holes 42. As a result, in the eighth embodiment as well, control can be effected such that the pedal pad 26 of the brake pedal 10 is displaced substantially toward the front of the vehicle, and the driver's knee can be kept away from the steering column.

In accordance with the eighth aspect, because the pair of side plates 32 deform toward the inner sides thereof, the push plates 70 can be designed planar in the longitudinal direction. As a result, the rigidity of the push plates 70 can be increased most efficiently. Accordingly, the entire system can be made light-weight and compact, which contributes to a lowering of costs.

Figure 32:
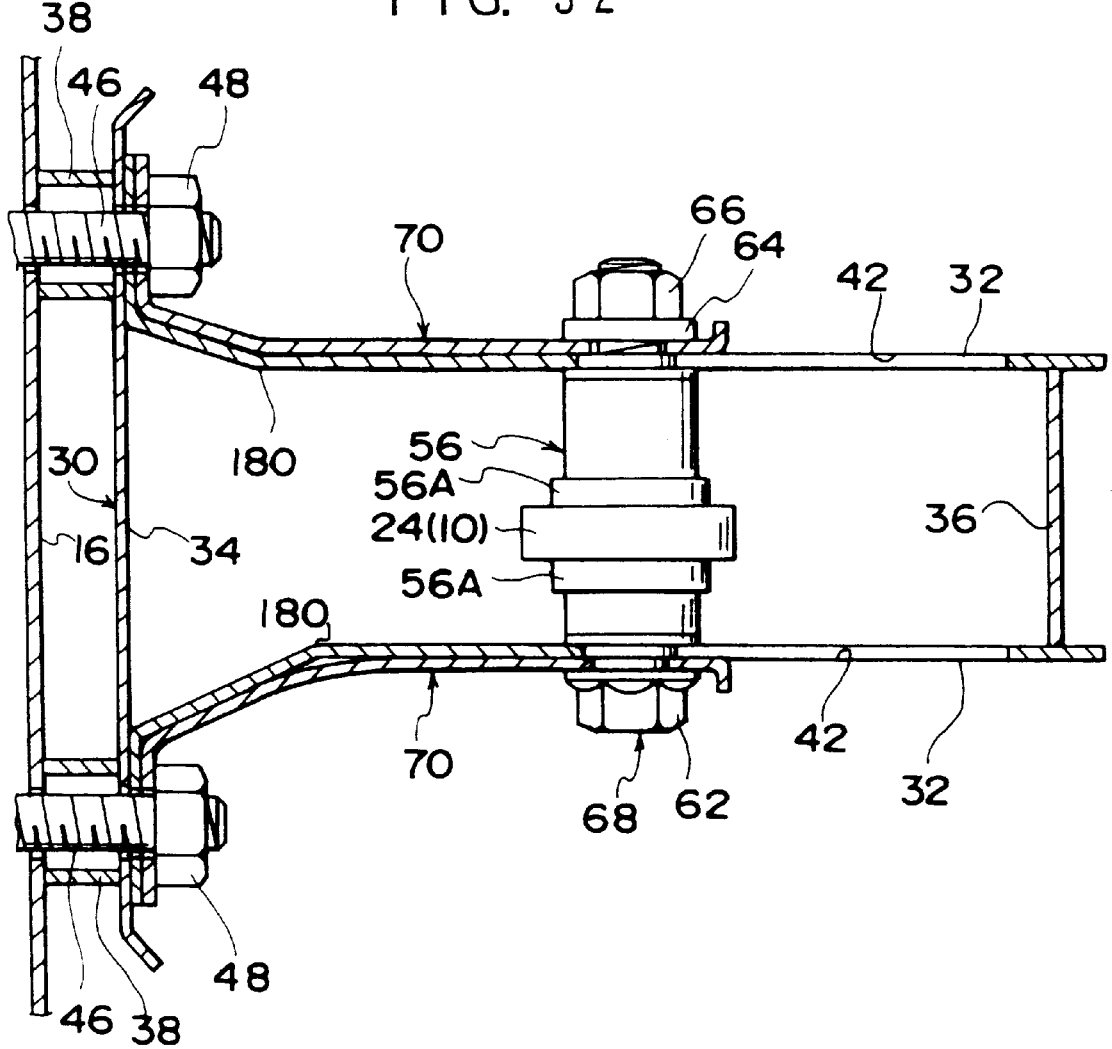
FIG. 32 is a horizontal sectional view corresponding to FIG. 30 and illustrating an embodiment in which opposing inwardly projecting portions illustrated in FIG. 30 are offset relative to one another in a longitudinal direction.
Figure 33:
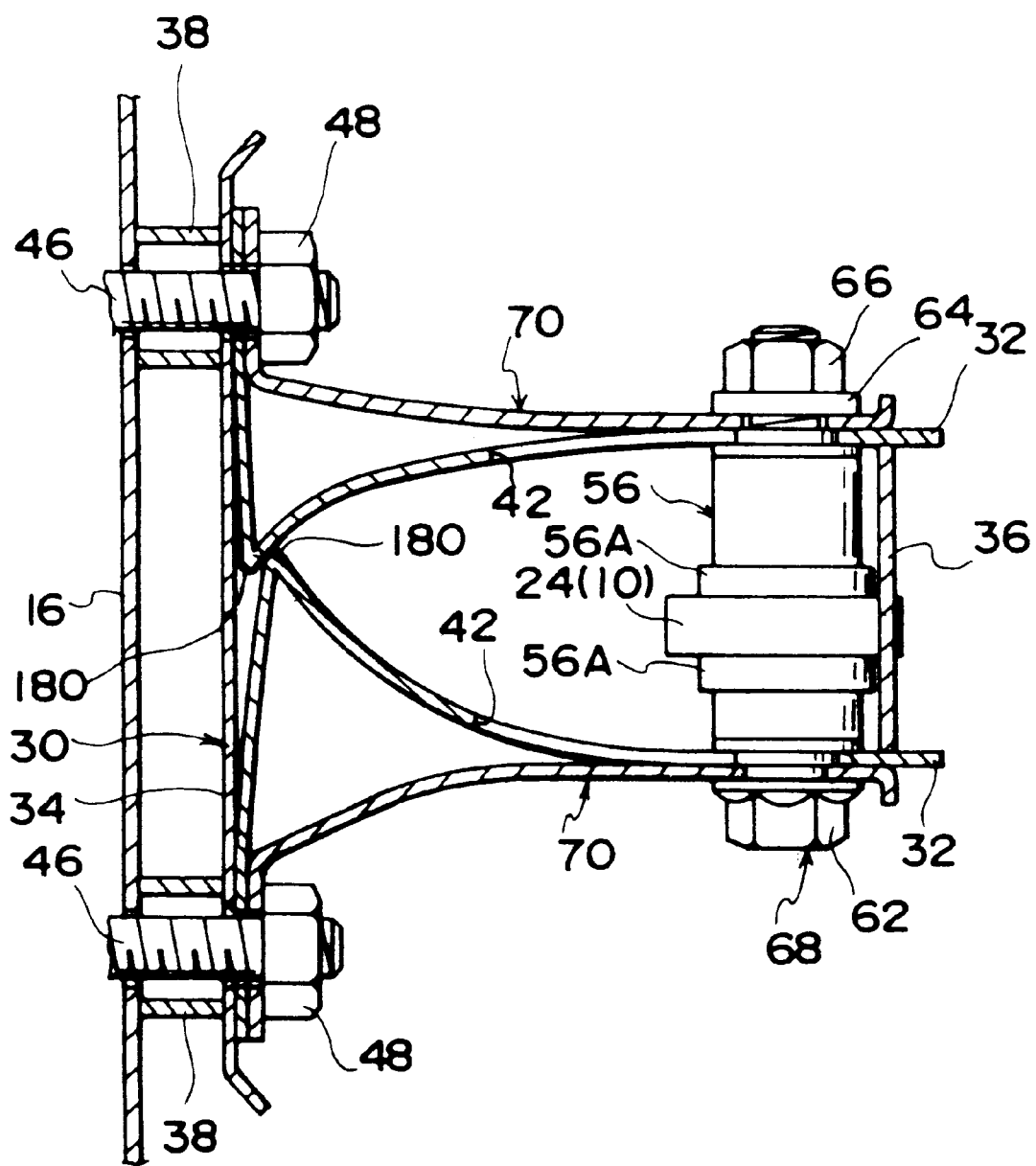
FIG. 33 is a horizontal sectional view corresponding to FIG. 32 and illustrating a state after an external force of a predetermined value or greater has been applied from a front of the vehicle in the structure illustrated in FIG. 32.

In the embodiment illustrated in FIGS. 32 and 33, the forming of the inwardly projecting portions 180, which project toward the center of the base plate 34, at predetermined positions of the front end sides of the side plates 32 of the pedal bracket 30 is the same as in the previously-described structure. However, in the present embodiment, the position at which the inwardly projecting portion 180 of one of the side plates 32 is formed is set to be offset in the longitudinal direction (i.e., staggered) from the position at which the opposing inwardly projecting portion 180 of the other side plate 32 is formed.

In accordance with the above structure, when the pair of side plates 32 of the pedal bracket 30 buckles in the longitudinal direction as described previously, because the inwardly projecting portions 180 which oppose each other are disposed so as to be offset in the longitudinal direction in the present embodiment, as illustrated in FIG. 33, when the side plates 32 respectively deform toward the center of the base plate 34 with the inwardly projecting portions 180 as the starting points, the opposing inwardly projecting portions 180 can be prevented from interfering with each other. Accordingly, the rotating shaft portion 68 can be moved substantially toward the rear of the vehicle smoothly and reliably along the elongated holes 42.

In the present embodiment, the opposing inwardly projecting portions 180 are disposed so as to be offset substantially in the longitudinal direction of the vehicle. However, the inwardly projecting portions 180 may be offset substantially in the vertical direction of the vehicle or the like. As long as the inwardly projecting portions 180 are offset to positions at which they are prevented from interfering from one another, the object of the present embodiment can be achieved.

Figure 34:
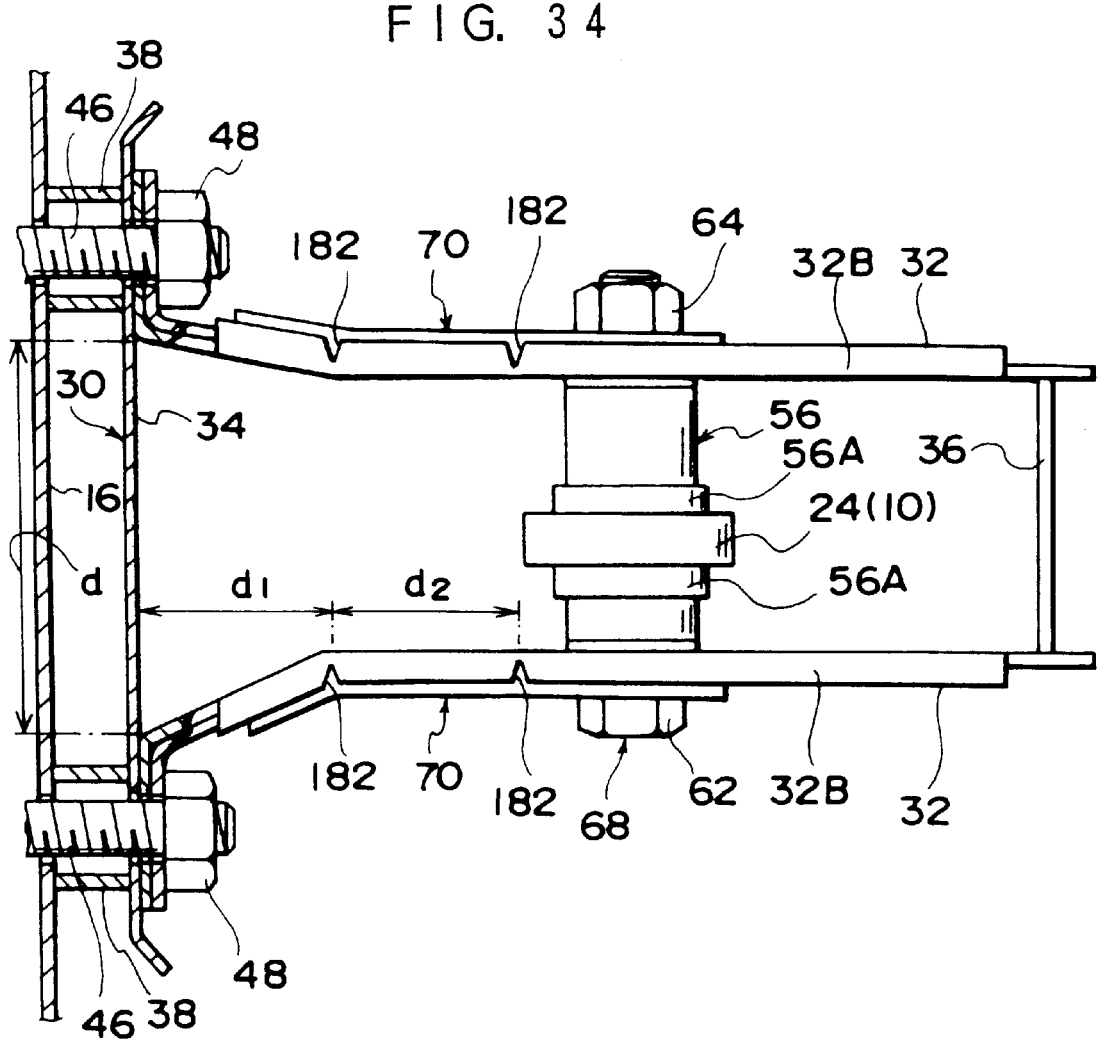
FIG. 34 is a horizontal sectional view corresponding to FIG. 30 and illustrating an embodiment in which notch portions are provided in flange portions of side plates of a pedal bracket.

In the embodiment illustrated in FIG. 34, a plurality of wedge-shaped notch portions 182 are formed, from the outer side and at predetermined intervals, in flange portions 32B of each side plate 32 of the pedal bracket 30, which flange portions 32B are formed by the upper and lower end portions of the side plate 32 being bent. (In FIG. 34, the pedal bracket 30 is shown in plan view, and therefore, only the flange portions 32B at the upper edges are illustrated.)

In accordance with the above-described structure, when the pair of side plates 32 of the pedal bracket 30 buckles in the longitudinal direction as described previously, stress concentrates at the notch portions 182 formed in the flange portions 32B of the pair of side plates 32. As a result, the pair of side plates 32 deform toward the center of the base plate 34 with the notch portions 182 as the starting points. Accordingly, when the pedal bracket 30 buckles in the longitudinal direction, the side plates 32 and the push plates 70 do not interfere with each other. The push plates 70, other than the rear end portions thereof, do not receive sliding resistance from the side plates 32, and the rotating shaft portion 68 can be moved substantially toward the rear of the vehicle reliably and smoothly along the elongated holes 42.

In order for the side plates 32 to not interfere with each other after deformation, the set intervals $d_1$, $d_2$ between the notch portions 182 are preferably set to ½ or less of the interval d between the pair of side plates 32.

Further, the number of the notch portions 182 and the regions at which the notch portions 182 are disposed may be selected appropriately in accordance with the configuration, the number of necessary bending points, and the like of the pedal bracket 30.

Figure 35:
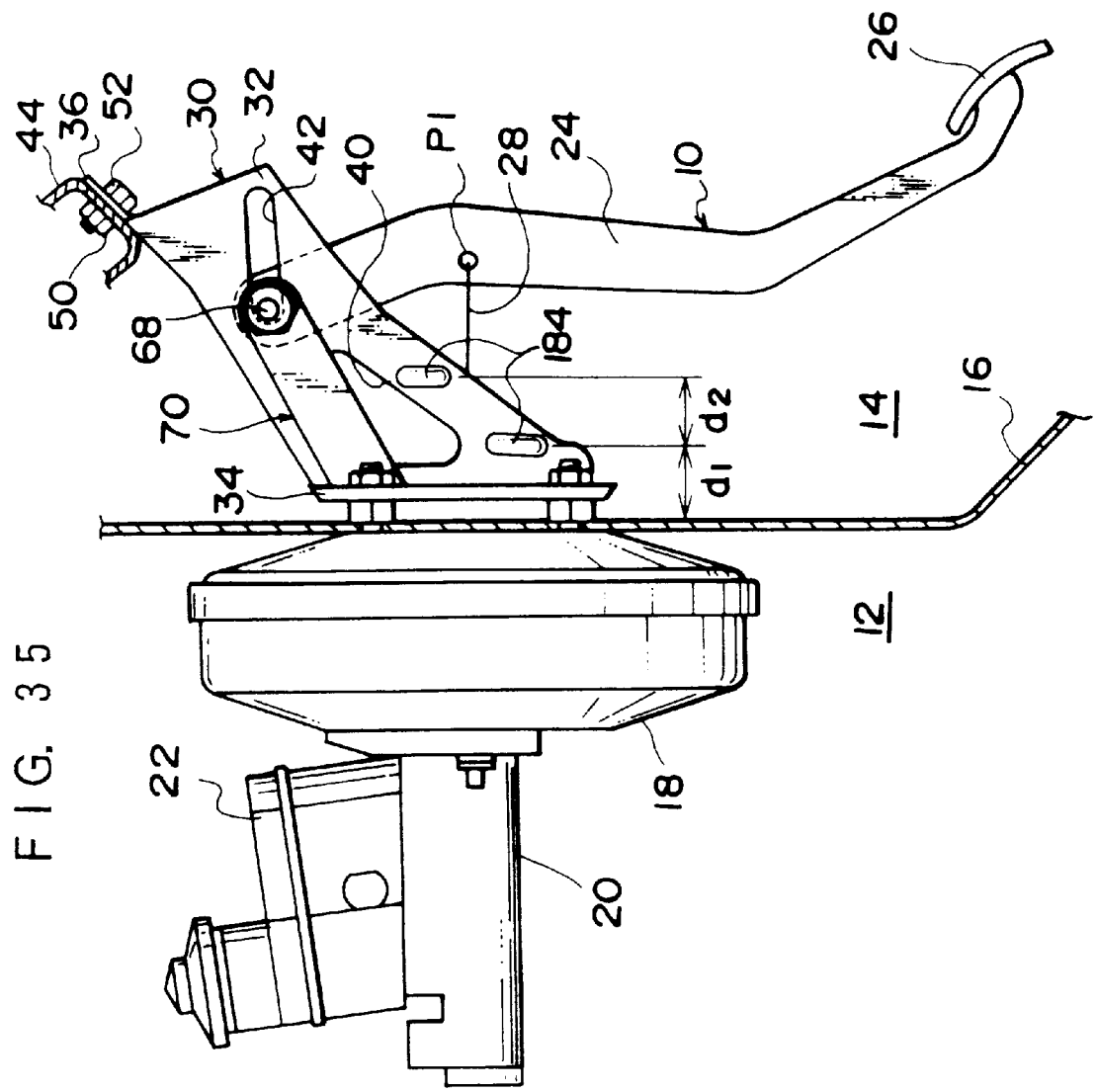
FIG. 35 is a side view corresponding to FIG. 1 and illustrating an embodiment in which beads are provided in place of the structure illustrated in FIG. 34 in which the notch portions are provided.

In the embodiment illustrated in FIG. 35, a plurality of beads 184 are formed at predetermined intervals along the longitudinal direction at predetermined positions of the pair of side plates 32 of the pedal bracket 30. Each bead 184 is set to a predetermined width, and the beads 184 are formed such that the longitudinal direction thereof is the vertical direction.

In accordance with the above structure, in addition to the previously-described effects, both control of the bending position and the bending direction of the side plates 32 and a guarantee of the rigidity of the side plates 32 can be achieved. More specifically, although control of the bending points of the side plates 32 may be achieved by the structure of forming the notch portions 182 or the like, when the notch portions 182 are formed in the flange portions 32B, there is the possibility that the rigidity of the flange portions 32B and consequently, the rigidity of the side plates 32 in the longitudinal direction will deteriorate unnecessarily. However, in accordance with the present embodiment, the beads 184 are formed in place of the notch portions 182. Therefore, the bending position and the bending direction of the side plates 32 can be controlled without the rigidity of the side plates 32 in the longitudinal direction deteriorating.

In order for the side plates 32 to not interfere with each other after deformation, the set intervals $d_1$, $d_2$ between the beads 184 are preferably set to ½ or less of the interval d between the pair of side plates 32 (refer to FIG. 34).

Further, the number of the beads 184 and the regions at which the beads 184 are disposed may be selected appropriately in accordance with the configuration, the number of necessary bending points, and the like of the pedal bracket 30.

A ninth embodiment of the present invention will be described hereinafter with reference to FIGS. 36 through 46.

In the ninth embodiment, a structure for preventing interference between the push plate and the side plates of the pedal bracket at the time the pedal bracket buckles is added as an improvement of the push plate.

Figure 36:
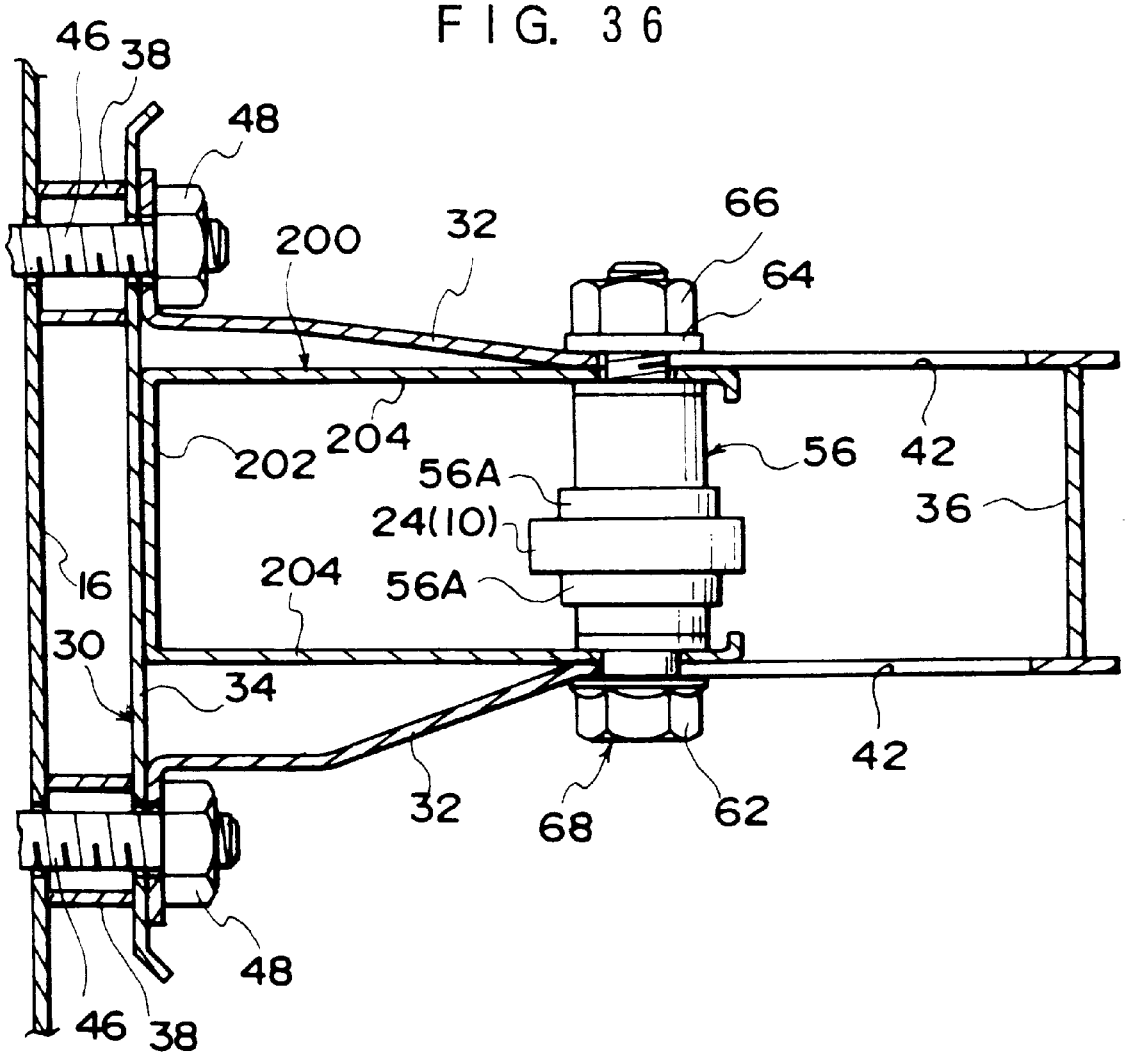
FIG. 36 is a horizontal sectional view focusing on a pedal bracket and illustrating a supporting structure of a pedal device for a vehicle relating to a ninth embodiment.

More specifically, in the embodiment illustrated in FIG. 36, in place of the above-described structure, i.e., in place of the structure in which the pair of push plates 70 are provided at the outer sides of the pair of side plates 32 of the pedal bracket 30, a push plate 200 is provided between the pair of side plates 32. The push plate 200 is formed from a base portion 202, which is fit to the base plate 34, and a pair of side portions 204 which extend in parallel toward the rotating shaft portion 68 from the side portions of the base portion 202. The base portion 202 and the side portions 204 are formed integrally such that the push plate 200 has a U-shaped configuration in plan view. The base portion 202 is fixed to the intermediate portion of the base plate 34 by welding or the like, and the rear end portions of the side portions 204 are connected to the rotating shaft portion 68. Note that a structure corresponding to the previously-described inwardly projecting portions 180 cannot be applied to the pair of side plates 32 of the pedal bracket 30 used here.

In accordance with the above structure, when the dash panel 16 is displaced rearward when an external force of a predetermined value or greater is applied from the front of the vehicle, as the dash panel 16 is displaced rearward, the pair of side plates 32 of the pedal bracket 30 buckle in the longitudinal direction. Here, because the side plates 32 usually buckle in the longitudinal direction such that the side plates 32 project outwardly, if the push plate 200 is disposed between the pair of side plates 32 as in the present ninth embodiment, the side portions 204 of the push plate 200 and the side plates 32 do not interfere with each other. Accordingly, the push plate 200, other than the rear end portions thereof, does not receive sliding resistance from the side plates 32, and the rotating shaft portion 68 can be moved reliably and smoothly substantially toward the rear of the vehicle along the elongated holes 42. As a result, in the ninth embodiment as well, control can be effected such that the pedal pad 26 of the brake pedal 10 is displaced substantially toward the front of the vehicle, and the driver's knee can be kept away from the steering column.

By employing a structure such as that of the ninth embodiment in which the push plate 200 is disposed between the pair of side plates 32, the push plate 200 can be formed in a substantially U-shaped configuration in plan view, and can be formed by a single part. As a result, the number of structural parts of the push plate can be reduced from two parts to one part. Further, the number of welding processes can be reduced from two processes to one process. Accordingly, the structure can be simplified, and costs can be reduced.

Figure 37:
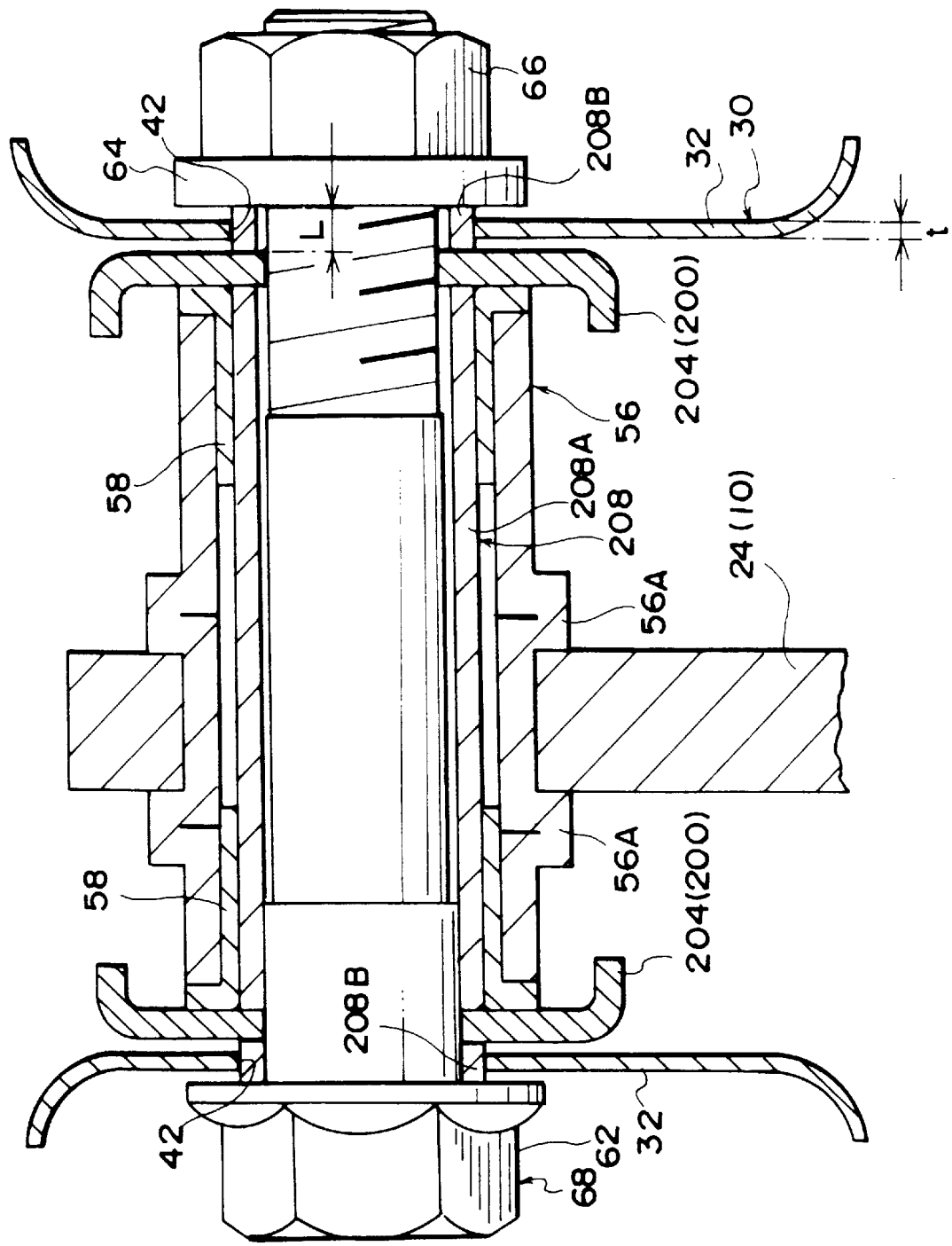
FIG. 37 is a sectional view corresponding to FIG. 2 and illustrating an embodiment in which an improvement has been added to a collar in the structure illustrated in FIG. 36.

In the embodiment illustrated in FIG. 37, in addition to the above-described structure (i.e., the structure in which the push plate 200 is disposed between the pair of side plates 32), a structure is added in which the fastening torque of the rotating shaft portion 68 is not transmitted to the peripheral portions of the elongated holes 42.

Hereinafter, the structure of the rotating shaft portion 68 of the present ninth embodiment will be described in contrast with the rotating shaft portion 68 of the first embodiment (see FIG. 2). The rotating shaft portion 68 of the ninth embodiment is the same as that of the first embodiment in that the main portions thereof are structured by the washer faced bolt 62 and the nut 66 which are fastened from the outer sides of the pair of side plates 32. In place of using the washer 64, a washer faced nut may be used.

Here, in the ninth embodiment, a collar 208, which covers the outer peripheral surface of the shaft portion of the washer faced bolt 62 and which is a component of the rotating shaft portion 68, is divided into three portions in the axial direction thereof. A collar intermediate portion 208A is set to an axial length which coincides with the distance between the inner side surfaces of the side portions 204 of the push plate 200, and is disposed between the side portions 204. Collar end portions 208B are set to axial lengths which are longer than inner peripheral thickness dimensions of portions forming the elongated holes 42. The collar end portions 208B are fit in the inner peripheries of the elongated holes 42 (i.e., between the outer side surface of the side portion 204 of the push plate 200 and the washer surface of the washer faced bolt 62, and between the outer side surface of the side portion 204 of the push plate 200 and the washer surface of the washer 64).

In accordance with the above structure, the axial lengths of the collar end portions 208B are set to be longer than the inner peripheral thickness dimensions of the elongated holes 42. Therefore, although the fastening torque of the washer faced bolt 62 and the nut 66 in the assembled state of the rotating shaft portion 68 is transmitted to the collar end portions 208B, the fastening torque is not transmitted between the outer side surface of the side plate 32 of the pedal bracket 30 and the washer surface of the washer faced bolt 62, nor between the outer side surface of the side plate 32 of the pedal bracket 30 and the washer surface of the washer 64, nor between the outer side surfaces of the side portions 204 of the push plate 200 and the inner side surfaces of the side plates 32. Namely, the fastening torque of the washer faced bolt 62 and the nut 66 is not transmitted to the side plates 32 of the pedal bracket 30. Therefore, when the rotating shaft portion 68 moves rearward as the dash panel 16 is displaced rearward when an external force of a predetermined value or greater is applied from the front of the vehicle, the push plates 200 do not receive sliding resistance from the side plates 32 at the intermediate portions of the push plates 200 nor at the rear end portions thereof, and the rotating shaft portion 68 can be moved even more reliably and smoothly along the elongated holes 42.

In the ninth embodiment, the present invention is applied to a structure in which the push plate 200 is disposed between the pair of side plates 32. However, the present invention is not limited to the same, and can also be applied to a structure in which the pair of side plates 70 is disposed at the outer sides of the pair of side plates 32 of the pedal bracket 30. For example, in the structure illustrated in FIG. 30, if the axial length of the collar 60 is made slightly longer than the axial length illustrated in the figure, the fastening torque of the washer faced bolt 62 and the nut 66 is not transmitted to the side plates 32, and the same effects are achieved.

Figure 38:
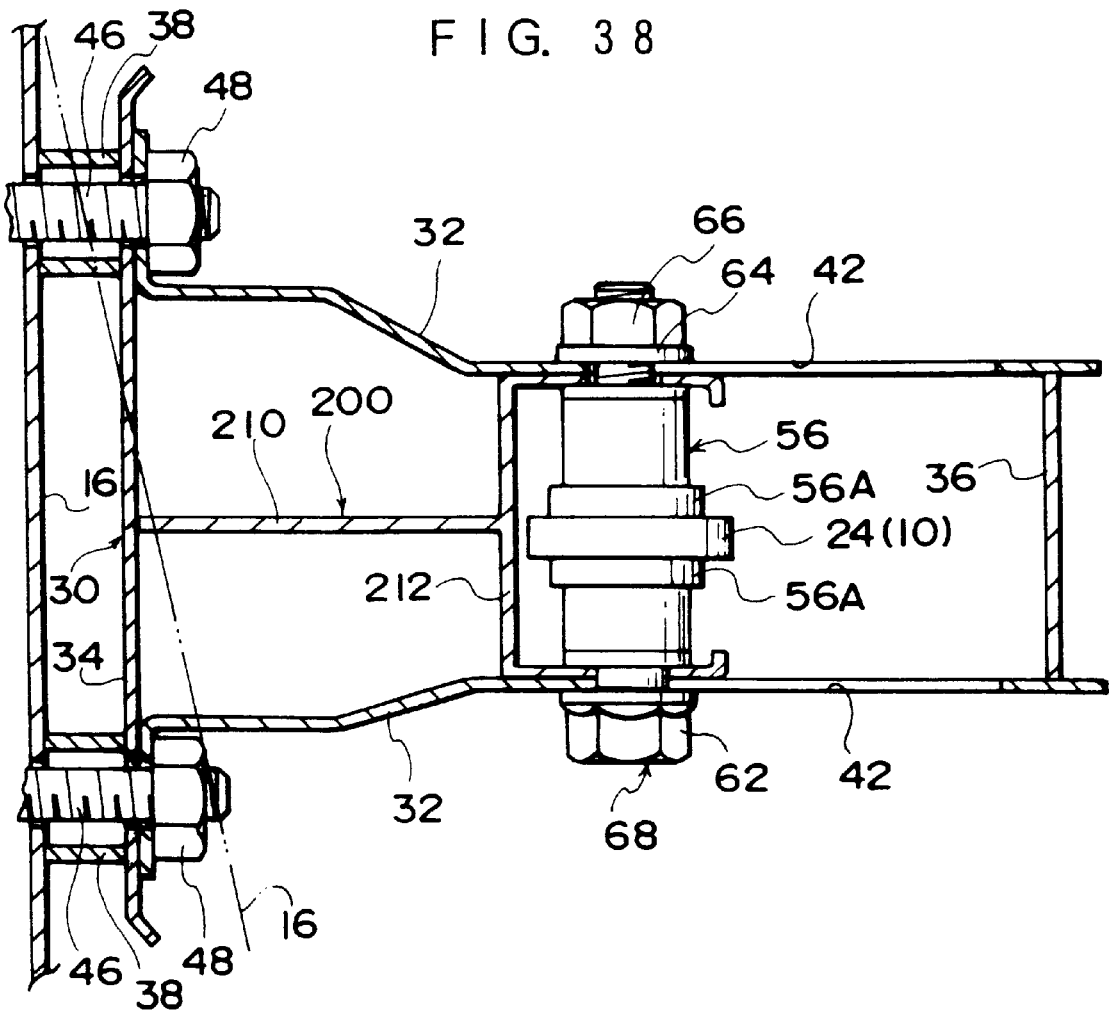
FIG. 38 is a horizontal sectional view corresponding to FIG. 36 and illustrating another embodiment of a push plate illustrated in FIG. 36.
Figure 39:
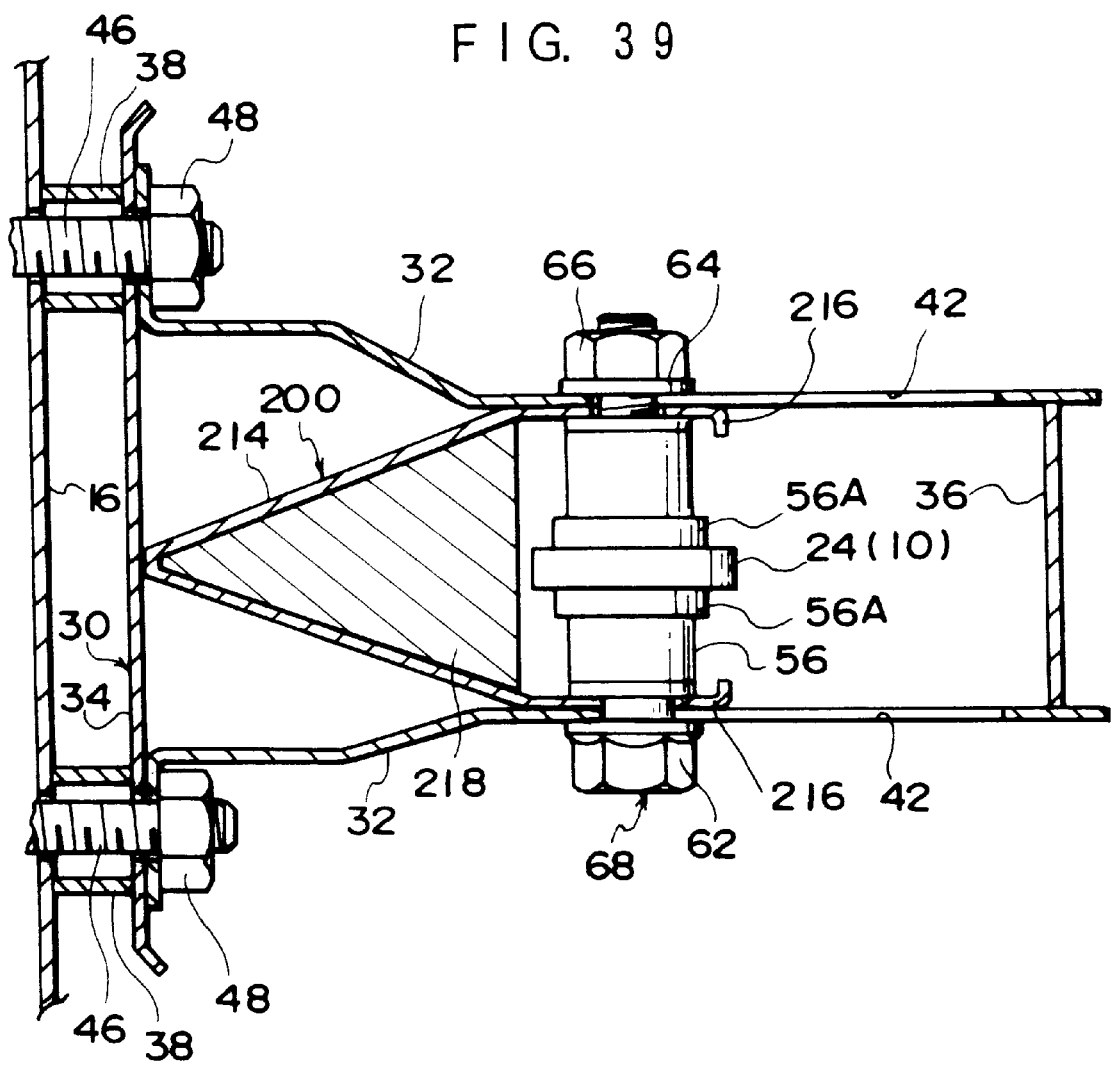
FIG. 39 is a horizontal sectional view corresponding to FIG. 36 and illustrating another embodiment of the push plate illustrated in FIG. 36.
Figure 40:
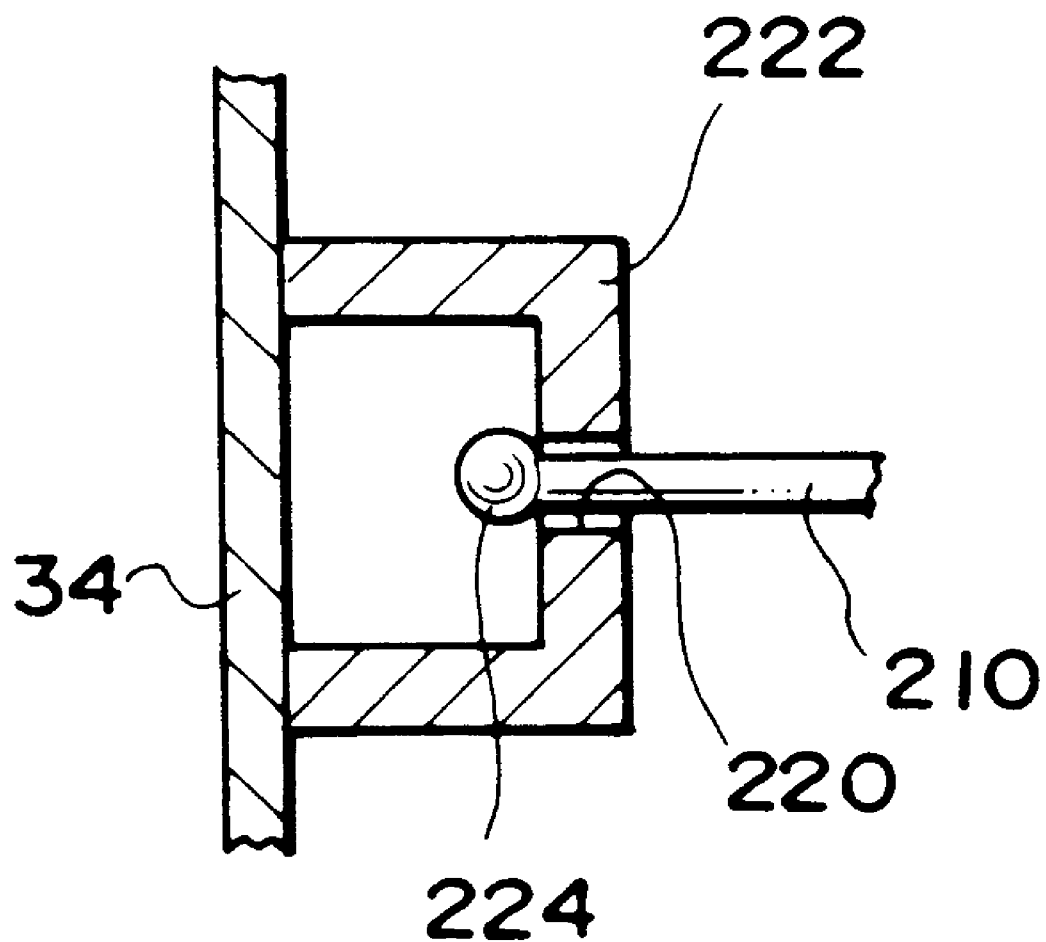
FIG. 40 is a sectional view of principal portions illustrating an embodiment in which a joining structure of the push plate illustrated in FIG. 38 is improved.

In the embodiments illustrated in FIGS. 38 through 40, based on the above-described structure (i.e., the structure in which the push plate 200 is disposed between the pair of side plates 32), a push plate structure is provided which achieves the expected effects even in a case in which the dash panel 16 is displaced toward the rear asymmetrically with respect to the left and the right.

More specifically, as illustrated in FIG. 38, the push plate 200 is formed by a base portion 210 and a holding portion 212. One end portion of the base portion 210 is fixed to a vehicle transverse direction intermediate portion of the base plate 34 by welding or the like, whereas the other end portion of the base portion 210 extends toward the rotating shaft portion 68. The holding portion 212 is substantially U-shaped, is fixed to the rear end portion of the base portion 210, and is connected to the rotating shaft portion 68. In this structure, the push plate 200 is joined to the base plate 34 at one place.

In accordance with the above structure, in a case in which an external force of a predetermined value or more is applied from the front of the vehicle and the dash panel 16 is displaced rearwardly and asymmetrically to the left and the right (i.e., a case in which the dash panel 16 is displaced rearward as illustrated by the two-dot-chain line in FIG. 38), if the push plate 200 having a U-shaped structure in plan view such as that illustrated in FIG. 36 is used for example, the loads inputted to the left and right side portions 204 via the dash panel 16 will differ (will be unbalanced). Therefore, there is the possibility that the amount of pushing the rotating shaft portion 68 substantially toward the rear of the vehicle will vary at the left and right side portions 204 such that wrenching force will be generated at the rotating shaft portion 68. However, in accordance with the present embodiment, the base portion 210 of the push plate 200 is joined at one place to the intermediate portion of the pair of side plates 32 at the base plate 34. Therefore, the load inputted to the holding portion 212 via the base portion 210 is uniform. Accordingly, even in a case in which the dash panel 16 is rearwardly displaced asymmetrically to the left and the right, the rotating shaft portion 68 can reliably be moved toward the rear along the elongated holes 42.

In the structure illustrated in FIG. 39, the push plate 200 is formed by a base portion 214 and a pair of holding portions 216. The base portion 214 is fixed to the intermediate portion of the base plate 34 by welding or the like, and bifurcates and extends toward the rotating shaft portion 68. The pair of holding portions 216 is provided by the rear end portions of the bifurcated base portion 214 being bent so as to extend parallel to one another along the side plates 32. The holding portions 216 are connected to the rotating shaft portion 68. Namely, in accordance with this structure as well, the push rod 200 is joined to the base plate 34 at one place.

Further, in the push plate 200, a wedge-shaped reinforcement 218, whose surface is along the horizontal direction, is fixed between the inner surfaces of the bifurcated base portion 214.

In accordance with the above structure, when external force of a predetermined value or greater is applied from the front of the vehicle and the dash panel 16 is displaced rearwardly and asymmetrically to the left and the right, the same operation and effects as those of the structure described previously are obtained. Further, in the present embodiment, the wedge-shaped reinforcement 218, whose surface is along the horizontal direction, is disposed between the inner surfaces of the base portion 214 of the push plate 200. Therefore, the transverse rigidity of the push plate 200 can be improved.

In the embodiments illustrated in FIGS. 38 and 39, the base portions 210, 214 of the push plates 200 are fixed to the base plate 34. However, the present invention is not limited to the same, and a Joined structure having degrees of freedom to a certain extent may be used. For example, as illustrated in FIG. 40, a frame 222, which is substantially U-shaped in plan view and which has a through hole 220 of a predetermined diameter dimension in the center of the peak portion thereof, is mounted to the base plate 34. The front end portion (spherical portion 224) of the base portion 210 of the push plate 200 passes through the through hole 220 so as to be disposed within the frame 222.

Figure 41:
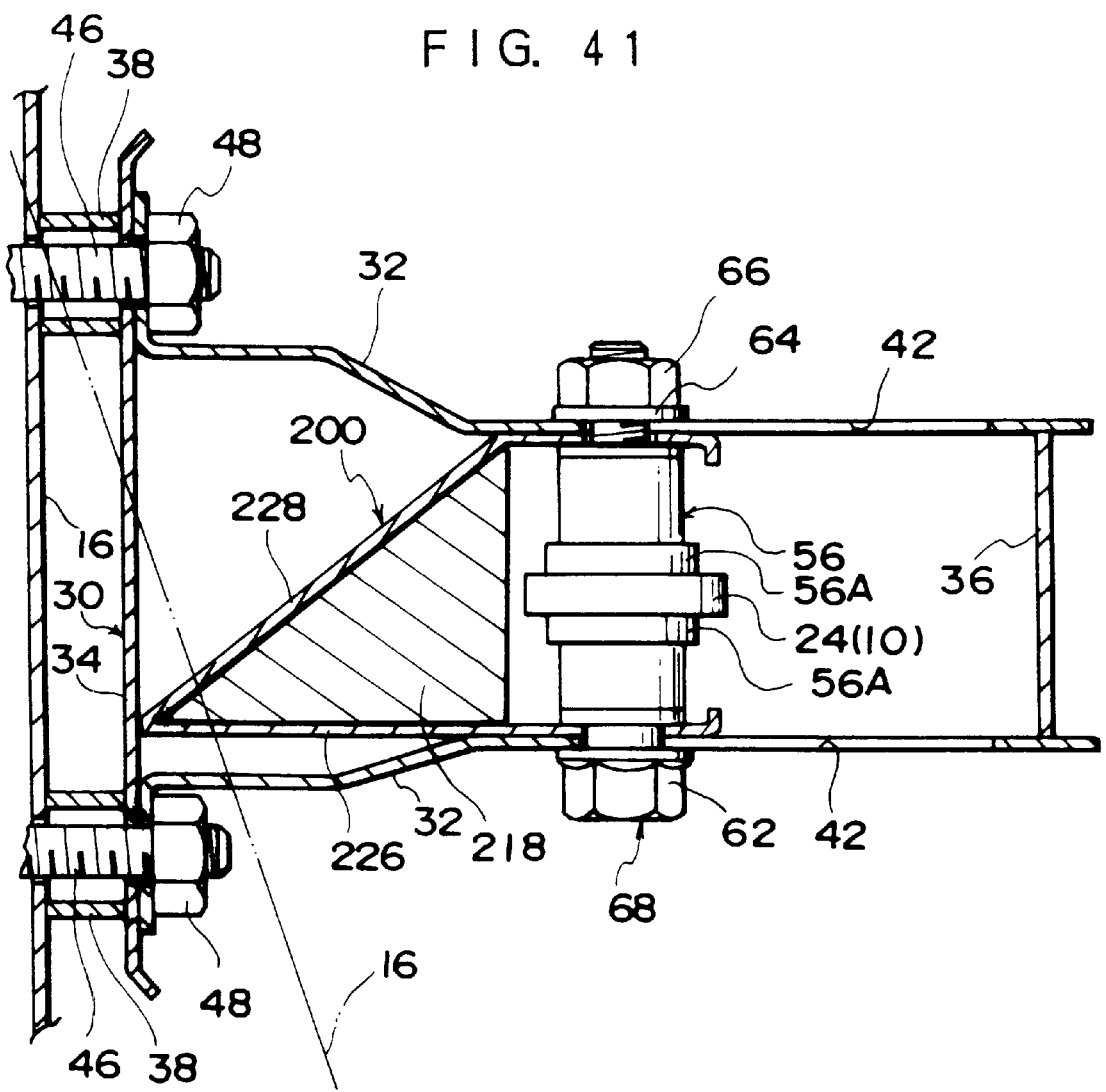
FIG. 41 is a horizontal sectional view corresponding to FIG. 36 and illustrating another embodiment of the push plate illustrated in FIG. 36.

In the embodiment illustrated in FIG. 41, based on the above-described structure (i.e., the structure in which the push plate 200 is disposed between the pair of side plates 32), a push plate structure is provided which exhibits effects particularly in a case in which the dash panel 16 is rearwardly displaced asymmetrically to the left and the right due to the application of an external force of a predetermined value or greater from the front of the driver's seat side.

Specifically, the push plate 200 is structured by a linear plate portion 226 and a bent plate portion 228. The linear plate portion 226 is fixed to a portion of the base plate 34 toward an outer side of the vehicle transverse direction intermediate portion thereof by welding or the like, and extends along the longitudinal direction of the side plate 32 disposed at the outer side (the lower side in the drawings since the vehicle here is a vehicle in which the steering wheel is placed at the left side of the vehicle). The bent plate portion 228 begins from the region at which the linear plate portion 226 is joined to the base plate 34, extends obliquely toward the side plate 32 disposed at the vehicle transverse direction inner side, and thereafter, is bent so as to extend along the longitudinal direction of the side plate 32 at the vehicle transverse direction inner side. The rear end portion of the linear plate portion 226 and the rear end portion of the bent plate portion 228 are connected to the rotating shaft portion 68. This structure is similar to the previously-described structures in that the push plate 200 is connected to the base plate 34 at one place. However, in the present structure, the region at which the push plate 200 is connected to the base plate 34 is set to be shifted (offset) toward the side plate 32 disposed at the outer side in the transverse direction of the vehicle.

In cases in which an external force of a predetermined value or greater is applied from the front of the driver's seat, the dash panel 16 is displaced rearwardly and asymmetrically to the left and the right as illustrated by the two-dot chain line in FIG. 41. Here, when the region at which the push plate 200 is joined to the dash panel 16 is the center of the left and right side plates 32, there are advantages in that the rotating shaft portion 68 can be pushed substantially toward the rear of the vehicle with a uniform pushing force and the generation of wrenching force can be suppressed. However, from the point of view of handling a case in which an external force of a predetermined value or greater is applied from the front of the driver's seat side, the structure in which the region at which the push plate 200 is joined to the dash panel 16 is offset toward the side plate 32 which is at the outer side of the vehicle more effectively moves the rotating shaft portion 68 substantially toward the rear of the vehicle.

From the viewpoints of ensuring rigidity and ease of sliding the push plate 200, it is preferable that the region at which the push plate 200 is joined to the base plate 34 is not further toward the outer side of the vehicle than the linear plate portion 226 of the push plate 200.

The structure illustrated in previously-described FIG. 40 may be applied to the structure of the push plate 200 of the present embodiment.

Figure 42:
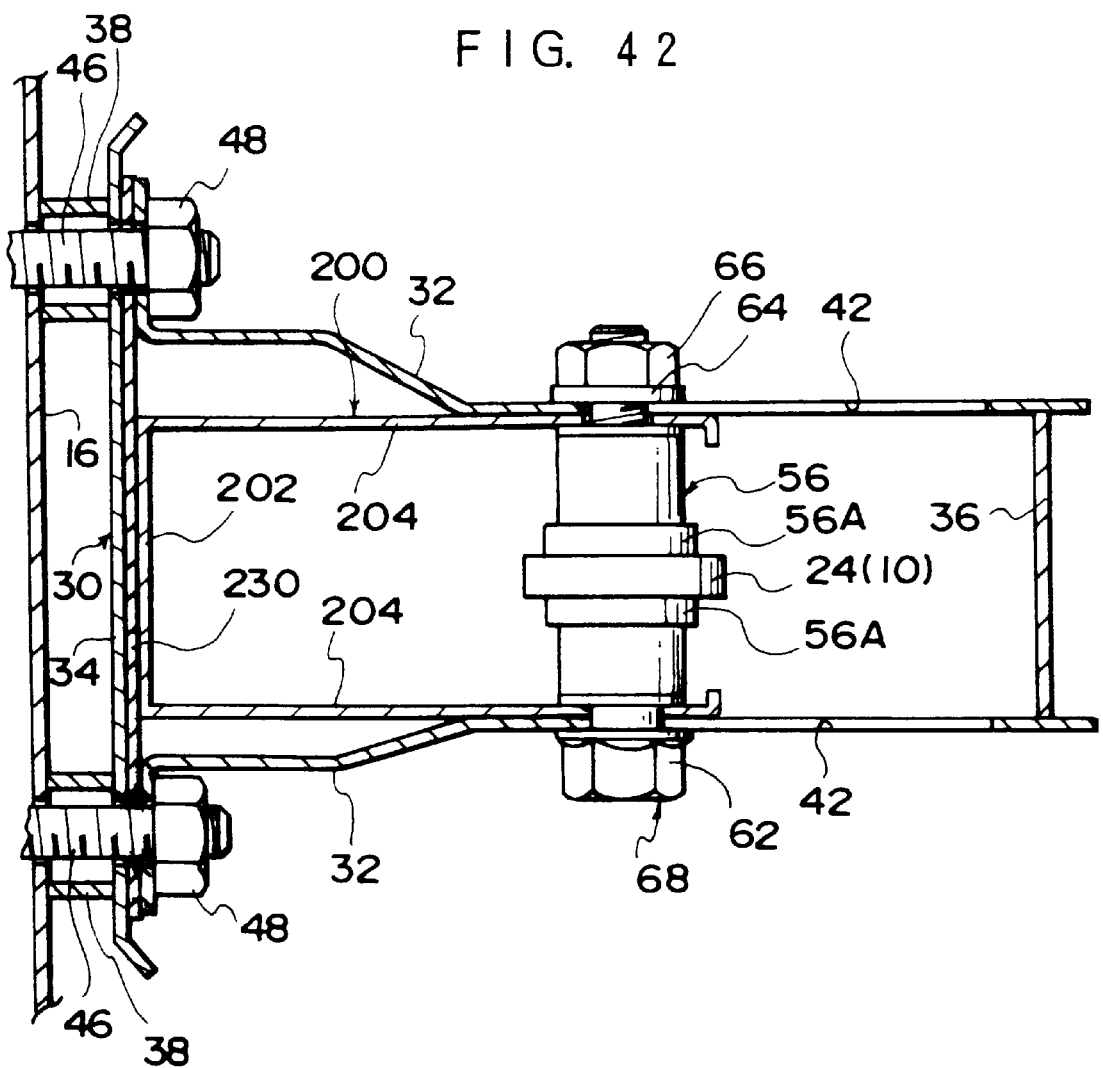
FIG. 42 is a horizontal sectional view corresponding to FIG. 36 and illustrating an embodiment in which a reinforcement is added to the push plate illustrated in FIG. 36.
Figure 43:
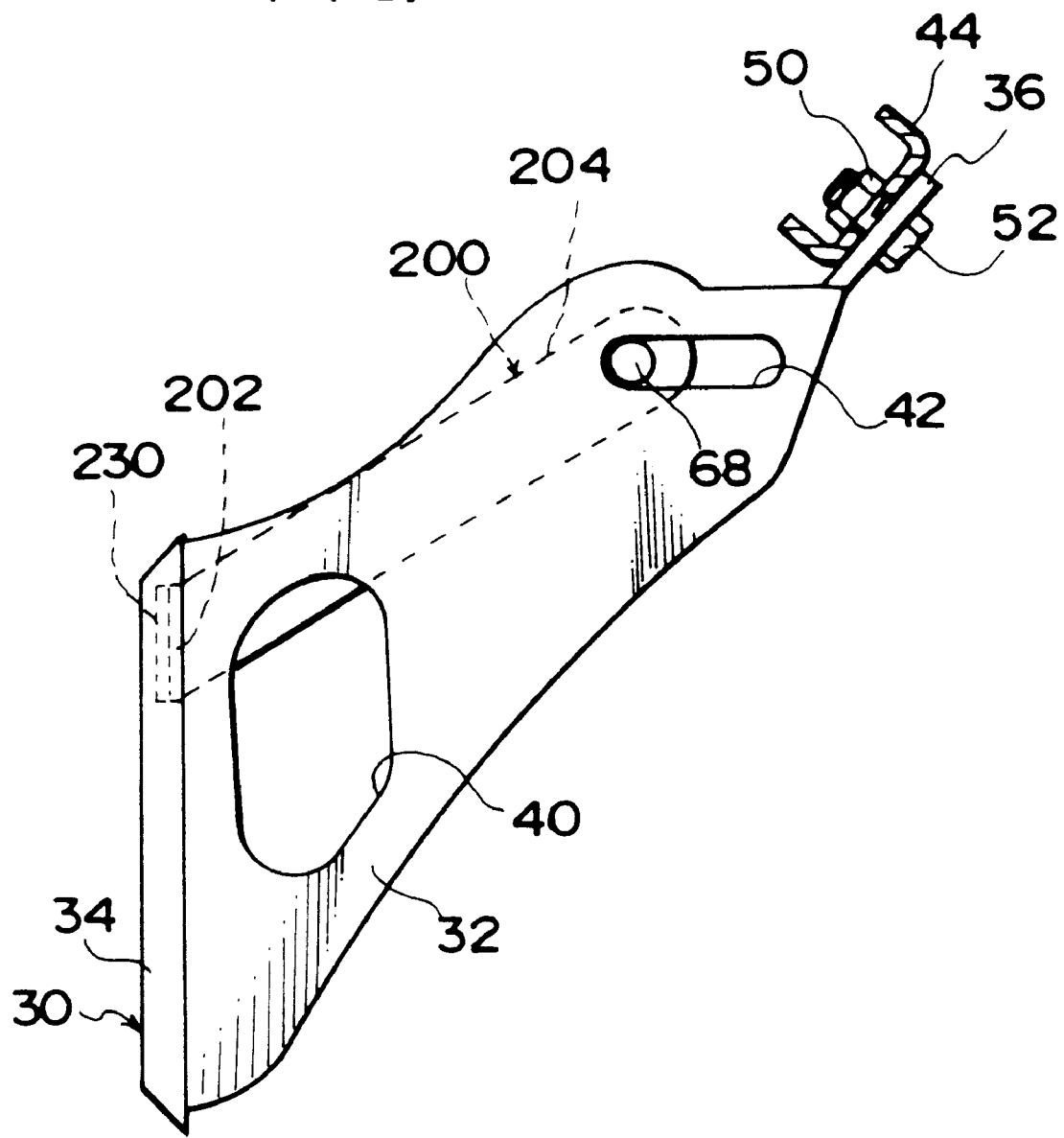
FIG. 43 is a side view of the structure illustrated in FIG. 42.

In the embodiment illustrated in FIGS. 42 and 43, in the above-described structure (i.e., the structure in which the push plate 200 is disposed between the pair of side plates 32), the operational feeling of the brake pedal 10 during ordinary usage thereof is improved.

As shown in FIGS. 42 and 43, a strip-shaped reinforcement 230, whose longitudinal direction is the transverse direction of the vehicle, is fixed by welding or the like to the base portion 202 of the push plate 200 having the same structure as that illustrated in FIG. 36. The reinforcement 230, the base plate 34, and the flange portions of the side plates 32 are joined by the stud bolts 46 and the nuts 46, with both end portions of the reinforcement 230 being nipped between the base plate 34 and the flange portions of the pair of side plates 32 of the pedal bracket 30.

When the structure illustrated in FIG. 36, i.e., the structure in which the base portion 202 of the push plate 200 is directly joined to the base plate 34, is employed, when the brake pedal 10 is being operated (i.e., when the driver is stepping down on the brake pedal 10), the rotating shaft portion 68 receives reaction force from the brake pedal 10, and the rotating shaft portion 68 begins to move rearward. Therefore, the push plate 200 is pulled toward the rear of the vehicle, and tensile force is applied to the base portion 202 in the same direction (i.e., force separating the base portion 202 from the base plate 34). In this way, if, for example, the base portion 202 plastically deforms even slightly toward the rear of the vehicle, there is the possibility that the feeling of rigidity and the feeling of efficacy of the brake pedal 10 will deteriorate, and the operational feeling of the brake pedal 10 during ordinary operation thereof will deteriorate.

However, in accordance with the present embodiment, because the reinforcement 230 is fixed to the base portion 202 of the push plate 200, the plate thickness in a vicinity of the base portion 202 of the push plate 200 increases, and the rigidity in the longitudinal direction increases. Further, tensile force acting on the base portion 202 can be diffused in the surface direction of the reinforcement 230. As a result, plastic deformation of the base portion 202 of the push plate 200 due to operation of the brake pedal 10 can be prevented, and the operational feeling of the brake pedal 10 during ordinary operation thereof can be improved.

In place of the structure in which the reinforcement 230 is added, a structure may be employed in which the plate thickness of the entire base plate 34 is increased. Alternatively, a structure in which the plate thickness of the base plate 34 only at the region at which the base portion 202 is joined may be used.

Figure 44:
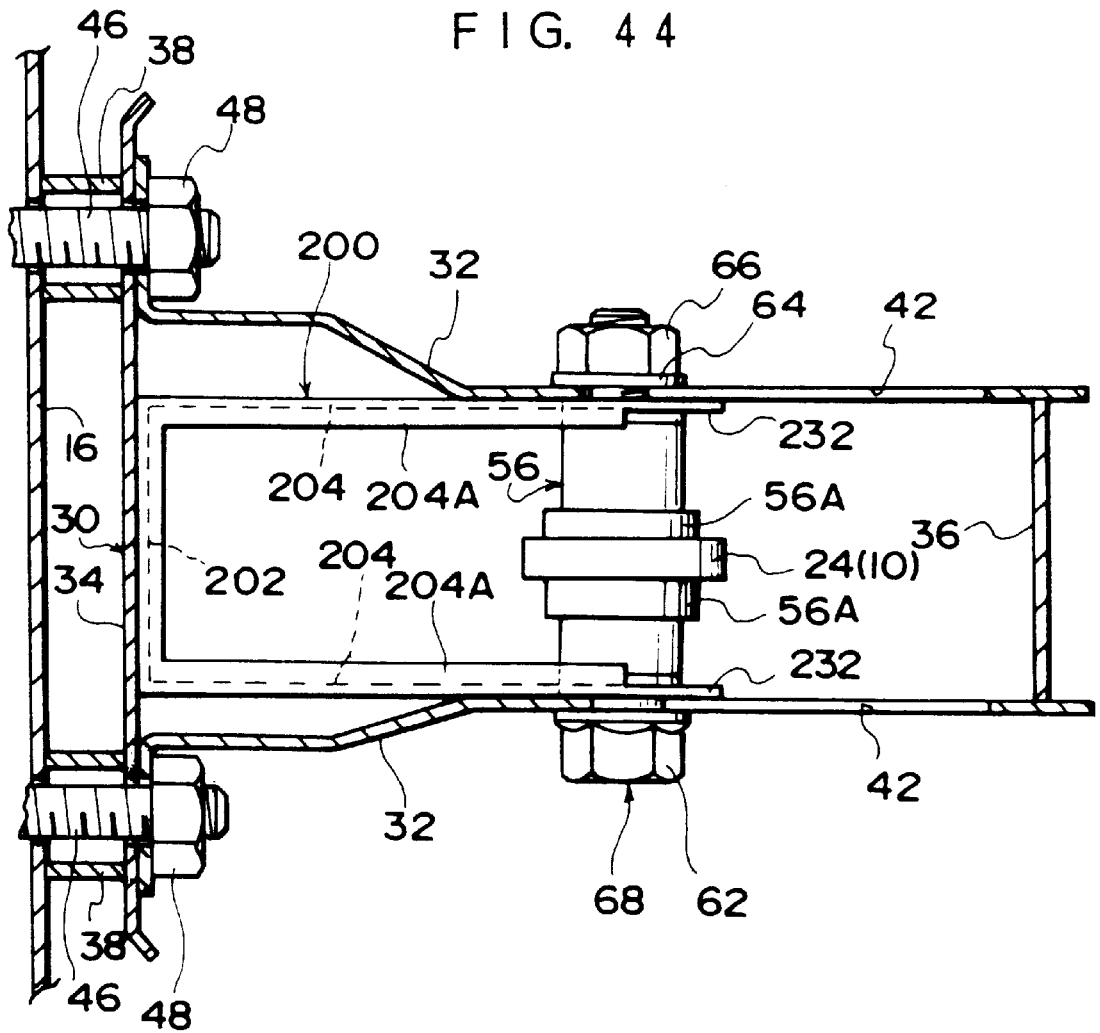
FIG. 44 is a horizontal sectional view corresponding to FIG. 36 and illustrating an embodiment in which the push plate illustrated in FIG. 36 is improved from the point of view of the ability to assemble a pedal.
Figure 45:
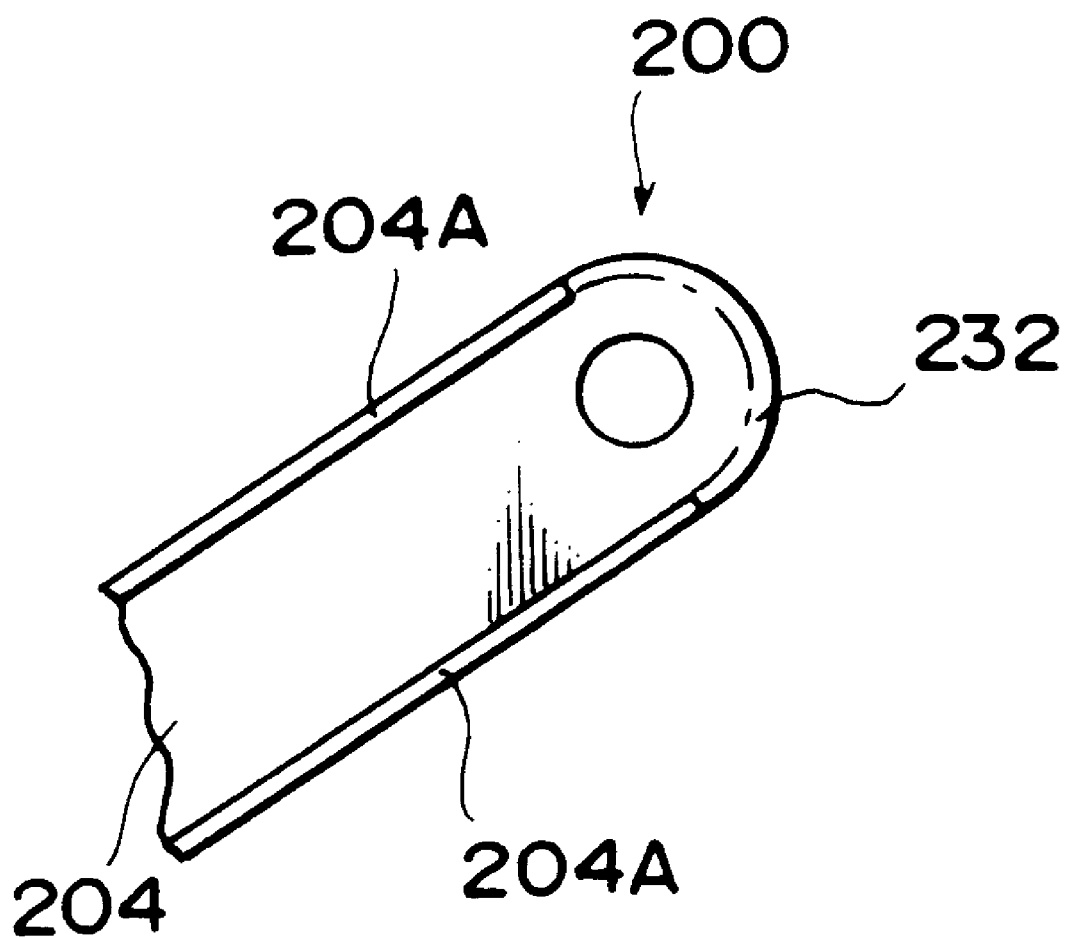
FIG. 45 is a partial side view of the push plate illustrated in FIG. 44.
Figure 46:
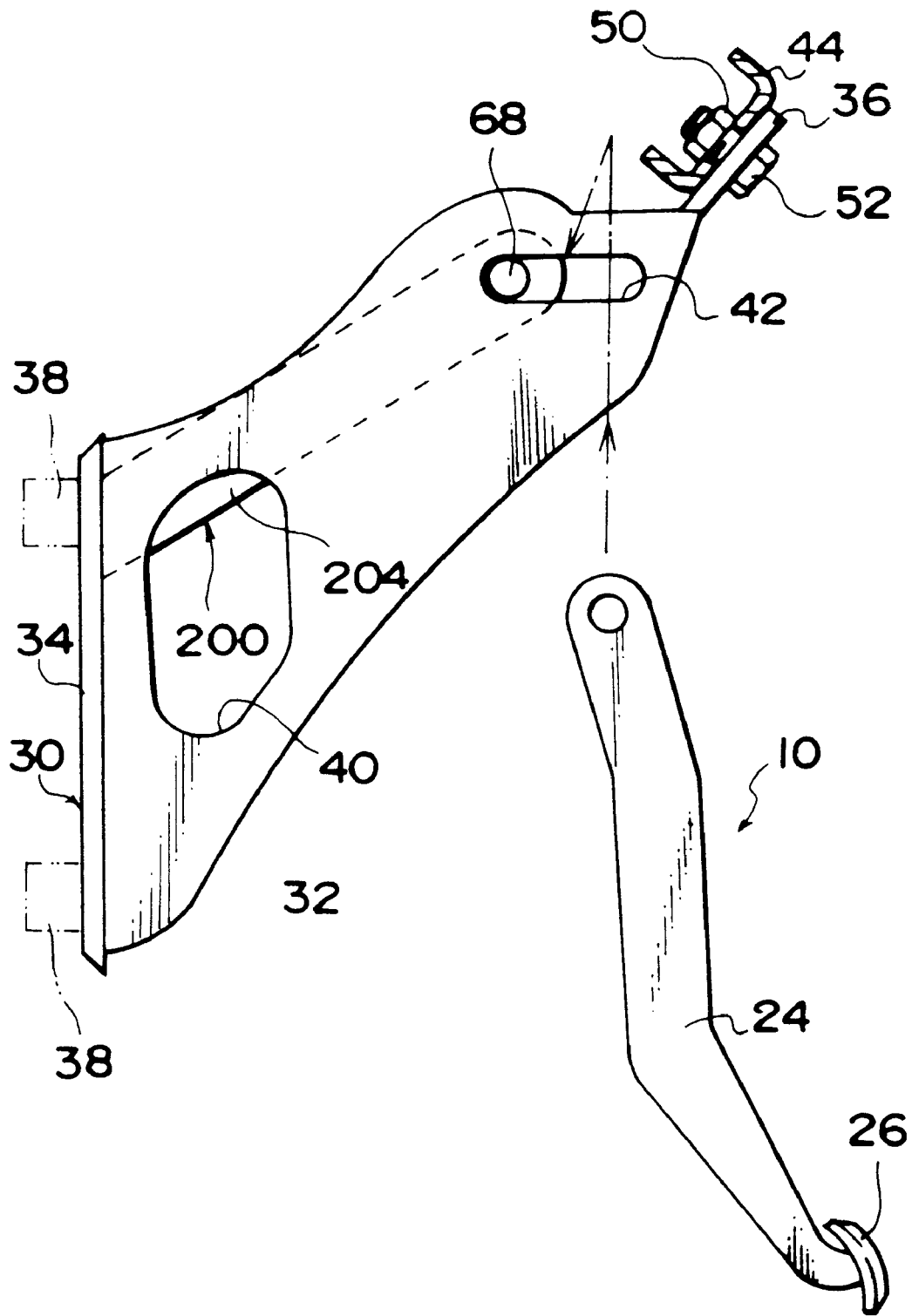
FIG. 46 is a side view illustrating a direction of assembling a brake pedal in the structure illustrated in FIG. 44.

In the embodiment illustrated in FIGS. 44 through 46, in the above-described structure (i.e., the structure in which the push plate 200 is disposed between the pair of side plates 32), the ability to assemble the brake pedal 10 is improved.

As shown in FIGS. 44 through 46, the push pedal 200 having the same structure as that of FIG. 36 is used in the present embodiment as well. However, in the present embodiment, the vehicle rear side end portions of flanges 204A, which extend in directions of approaching each other at the peripheral portions of the side portions 204 of the push plate 200, are removed so as to form cut-out portions 232 (the removed portion is illustrated by the one-dot chain line in FIG. 45).

In accordance with the above-described structure, when the brake pedal 10 is to be assembled to the pedal bracket 30, the brake pedal 10 is inserted, along the direction of the arrow in FIG. 46, between the pair of side plates 32 of the pedal bracket 30. Here, when a structure such as that of the present embodiment is used in which the push plate 200 having the flanges 204A is disposed between the pair of side plates 32, both end portions of the pedal boss 56 of the brake pedal 10 interfere with the rear end portions of the flanges 204A, and assembly is difficult. However, in accordance with the present embodiment, the rear end portions of the flanges 204A, which may interfere with the end portions of the pedal boss 56 of the brake pedal 10, are removed, and the cut-out portions 232 are formed. Therefore, the brake pedal 10 can be assembled to the pedal bracket 30 by using the cut-out portions 232. Accordingly, the ability to assemble the brake pedal 10 to the pedal bracket 30 can be improved.

Hereinafter, a tenth embodiment of the present invention will be described on the basis of FIGS. 47 through 50.

In the present embodiment, a structure for reducing the sliding resistance between the rotating shaft portion, which is pushed by the push plates when the pedal bracket buckles, and the inner peripheral surfaces of the elongated holes, which guide the movement of the rotating shaft portion at this time, is added as an improvement on the elongated holes of the pedal bracket.

Figure 47:
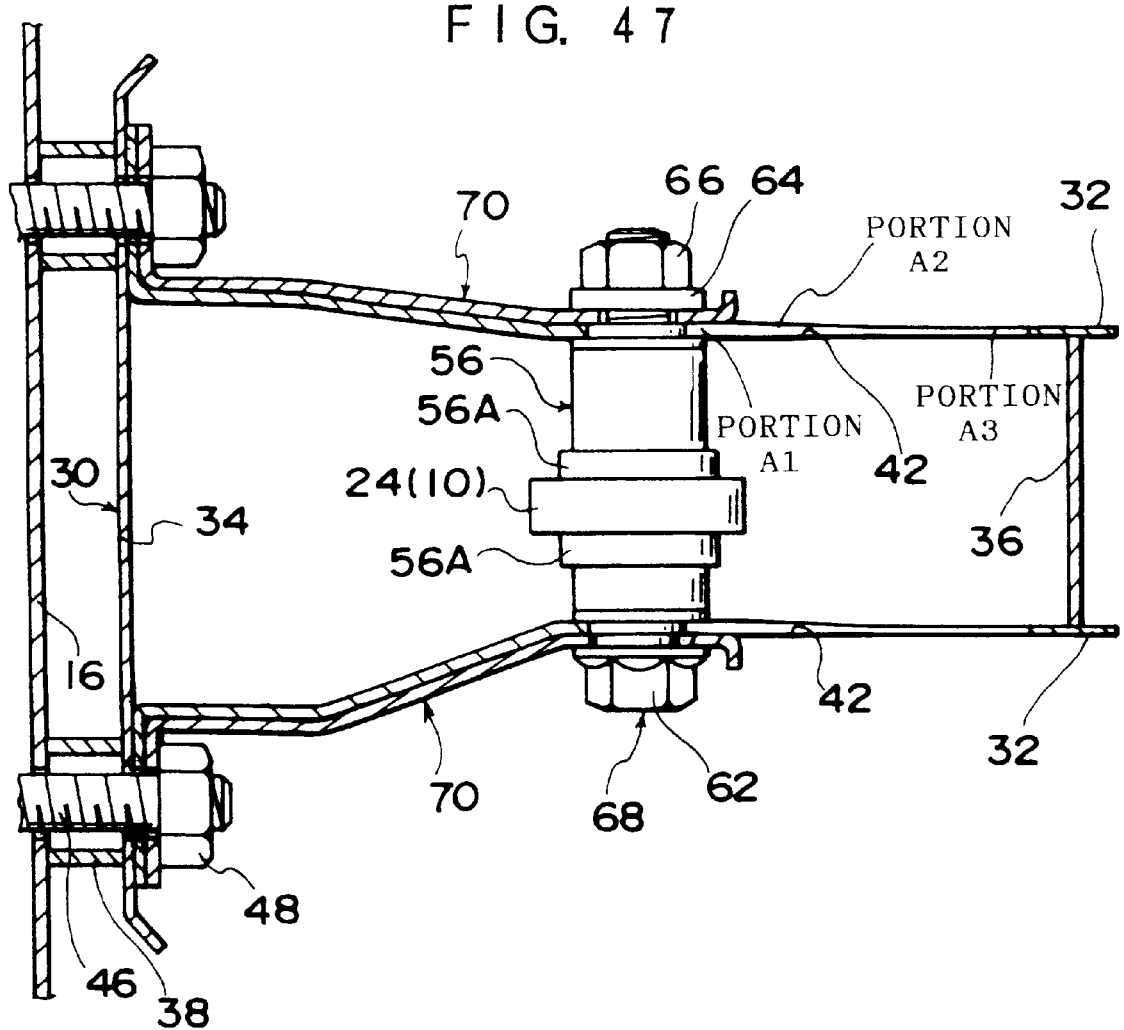
FIG. 47 is a horizontal side view focusing on a pedal bracket and illustrating a supporting structure of a pedal device for a vehicle relating to a tenth embodiment.
Figure 48A:
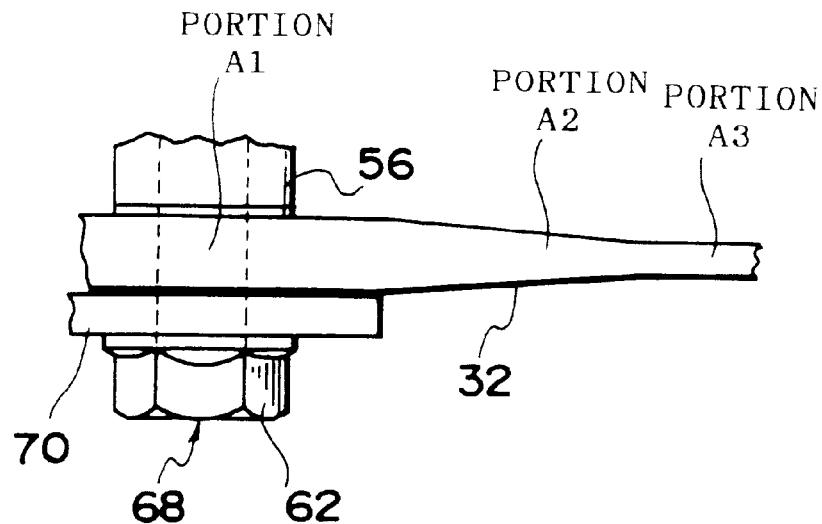
FIG. 48A is an enlarged view of principal portions of FIG. 47.

In the structure illustrated in FIGS. 47 and 48A, the thickness direction dimension of each of the pair of side plates 32 of the pedal bracket 30 is set so as to be thick at the front end side of the elongated hole 42 (portion A1), and gradually decrease at the intermediate portion side (portion A2), and become thin at the rear end side (portion A3). In accordance with this structure, as the rotating shaft portion 68 moves rearward from the front end portions toward the rear end portions of the elongated holes 42, the surface area of contact between the outer peripheral surface of the rotating shaft portion 68 and the inner peripheral surfaces of the elongated holes 42 gradually decreases. As a result, as the rotating shaft portion 68 moves rearward, the sliding resistance between the rotating shaft portion 68 and the elongated holes 42 can be decreased. Accordingly, the rotating shaft portion 68 can be moved reliably and smoothly along the elongated holes 42 substantially toward the rear of the vehicle. As a result, in the present embodiment as well, control is effected so that the pedal pad 26 of the brake pedal 10 is displaced substantially toward the front of the vehicle, and the driver's knee can be kept away from the steering column.

Figure 48B:
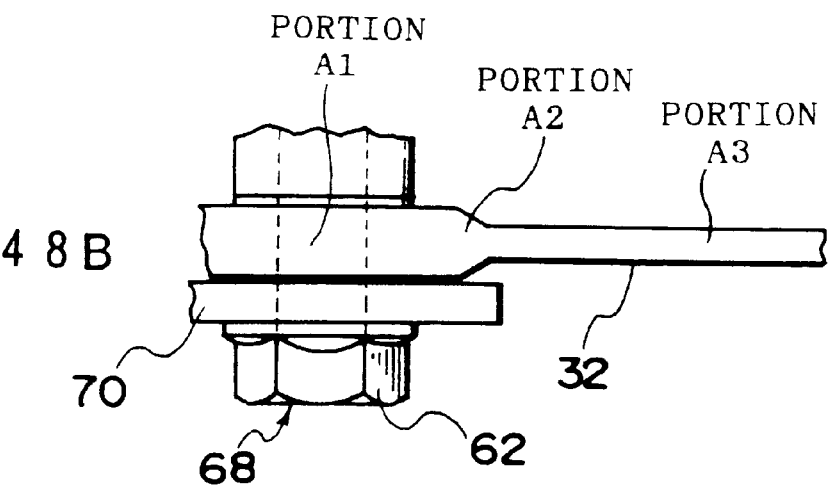
FIG. 48B is an enlarged view of principal portions having a different structure than that illustrated in FIG. 48A.

In the structure illustrated in FIG. 48B, the thickness direction dimension of each of the pair of side plates 32 of the pedal bracket 30 is set so as to be thick at the portion corresponding to the front end side of the elongated hole 42 (portion A1), gradually decrease in a tapered step at the portion corresponding to the intermediate portion side (portion A2), and become thin at the portion corresponding to the rear end side (portion A3). The same operation and effects as those of the structure described above are achieved by the present structure as well.

Figure 49:
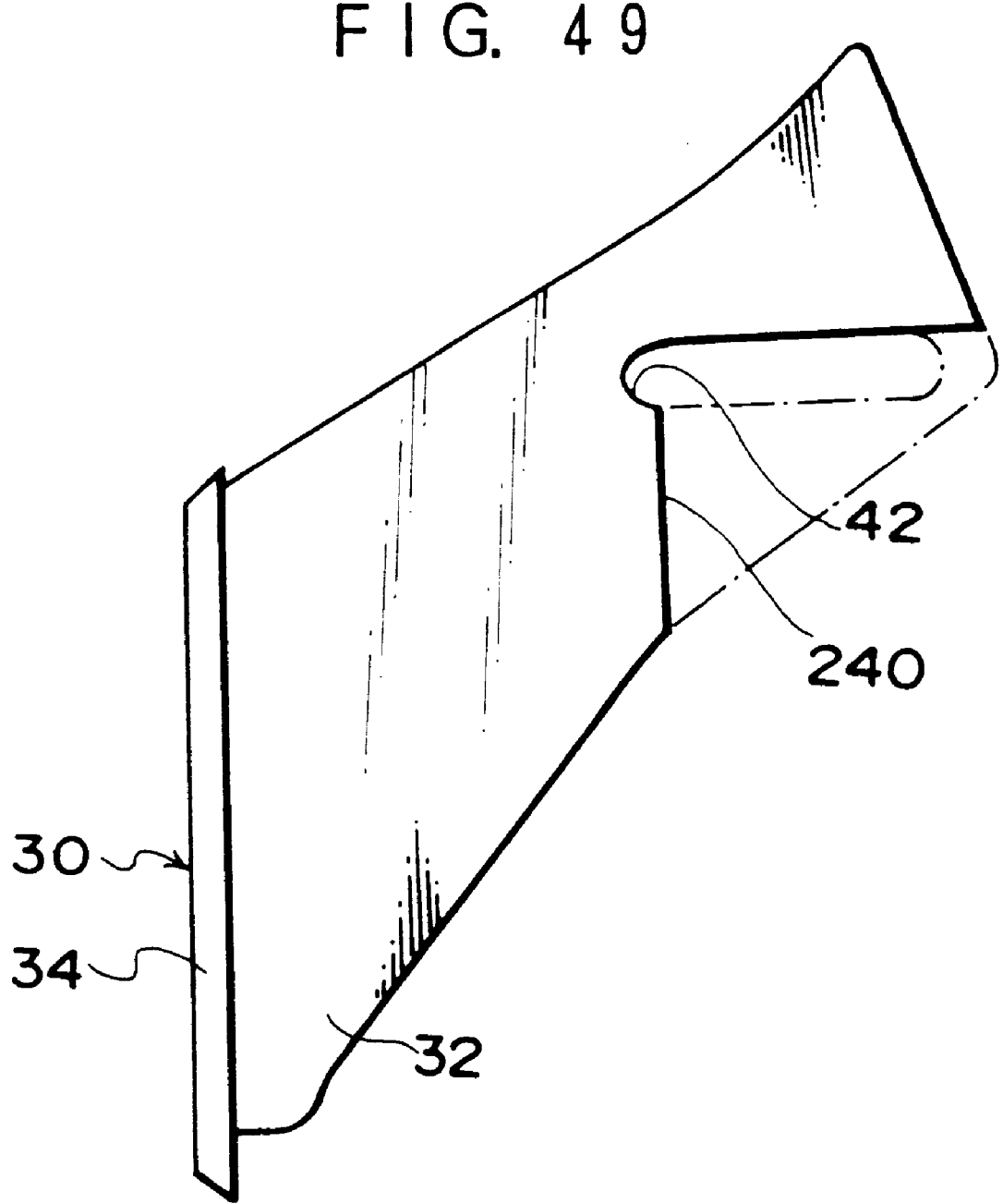
FIG. 49 is a side view of a pedal bracket illustrating another embodiment of a side plate structure and focusing on an elongated hole illustrated in FIG. 47.

In the structure illustrated in FIG. 49, a predetermined region of each of the pair of side plates 32 of the pedal bracket 30 is cut out (the region beneath and toward the rear of the elongated hole 42, excluding the front end portion of the elongated hole 42). Hereinafter, this region is referred to as the "surface cut out portion 240". The original configuration is illustrated by the one-dot chain line in FIG. 49.

In accordance with the above-described structure, when the rotating shaft portion 68 moves rearward from the front end portions toward the rear end portions of the elongated holes 42, the rotating shaft portion 68 falls out from the surface cut out portions 240 of the elongated holes 42. More specifically, the rotating shaft portion 68 no longer contacts the elongated holes 42. As a result, the sliding resistance between the rotating shaft portion 68 and the elongated holes 42 at the time the rotating shaft portion 68 moves rearward can be eliminated. Further, in accordance with the present structure, when the pair of side plates 32 of the pedal bracket 30 buckles in the longitudinal direction, deformation of the configuration of the elongated holes 42 in the transverse direction (in the up and down directions in the figure) and consequent hindering of the rearward movement of the rotating shaft portion 68 can be prevented.

Figure 50:
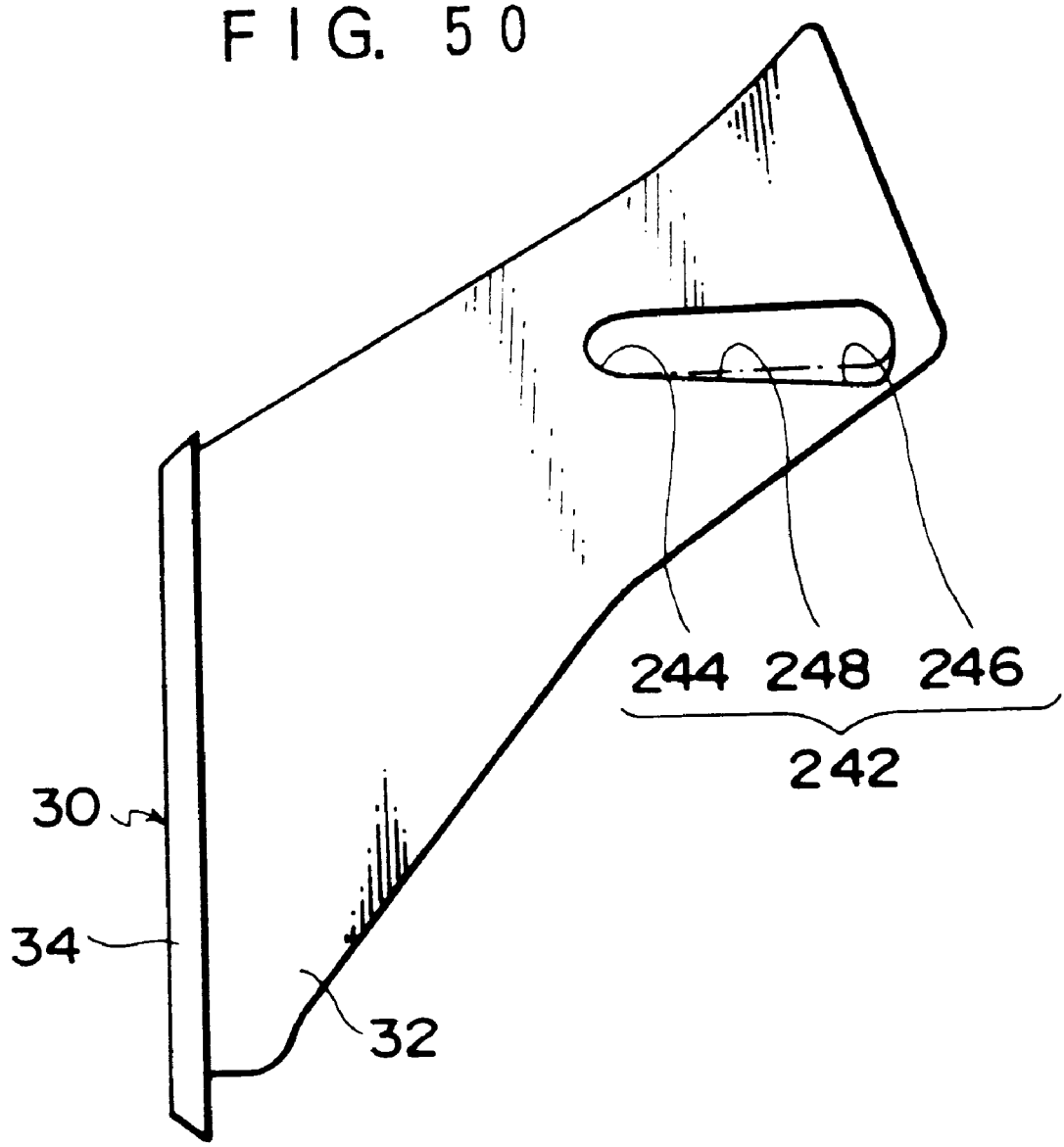
FIG. 50 is a side view of a pedal bracket illustrating another embodiment of a side plate structure and focusing on the elongated hole illustrated in FIG. 47.

In the structure shown in FIG. 50, in place of the elongated holes 42 (illustrated by the one-dot chain line in FIG. 50) whose transverse direction dimension is set to be a uniform dimension, elongated holes 242 whose transverse direction dimension gradually becomes wider are employed. More specifically, the front end side of the elongated hole 242 is a narrow portion 244 whose transverse direction dimension is set to substantially match the diameter dimension of the rotating shaft portion 68. The rear end side of the elongated hole 242 is a wide portion 246 whose transverse direction dimension is set to be greater than the diameter dimension of the rotating shaft portion 68. The intermediate portion of the elongated hole 242 is a gradually-changing portion 248 whose transverse direction dimension gradually increases toward the wide portion 246.

In accordance with the above structure, as the rotating shaft portion 68 gradually moves rearward from the front end portions toward the rear end portions of the elongated holes 242, the contact surface area between the outer peripheral surface of the rotating shaft portion 68 and the inner peripheral surfaces of the elongated holes 242 gradually decreases. For example, when the rotating shaft portion 68 moves along the lower edge sides of the inner peripheral surfaces of the elongated holes 42, the rotating shaft portion 68 no longer contacts the upper edge sides of the inner peripheral surfaces of the elongated holes 42. When the rotating shaft portion 68 moves along the upper edge sides of the inner peripheral surfaces of the elongated holes 42, the rotating shaft portion 68 no longer contacts the lower edge sides of the inner peripheral surfaces of the elongated holes 42. Therefore, the contact surface area decreases in either case. As a result, the sliding resistance between the rotating shaft portion 68 and the elongated holes 42 as the rotating shaft portion 68 moves rearward can be decreased. The rotating shaft portion 68 is moved smoothly and reliably along the elongated holes 42 substantially toward the rear of the vehicle. Further, the structure illustrated in previously-described FIG. 49 is disadvantageous in that the rigidity of the side plates 32 in the longitudinal direction decreases due to the provision of the surface cut out portions 240. However, the present structure illustrated in FIG. 50 is advantageous in that the rigidity of the side plates 32 in the longitudinal direction can be ensured.

An eleventh embodiment of the present invention will be described with reference to FIGS. 51 and 52.

In the eleventh embodiment, the structure in which the following two structures are combined is made into a more simple structure: the structure in which the sliding resistance between the rotating shaft portion, which is pushed by the push plates when the pedal bracket buckles, and the inner peripheral surfaces of the elongated holes, which guide the movement of the rotating shaft portion at this time, is decreased, and the structure in which the stepping surface of the brake pedal is actively displaced substantially toward the front of the vehicle.

Figure 51:
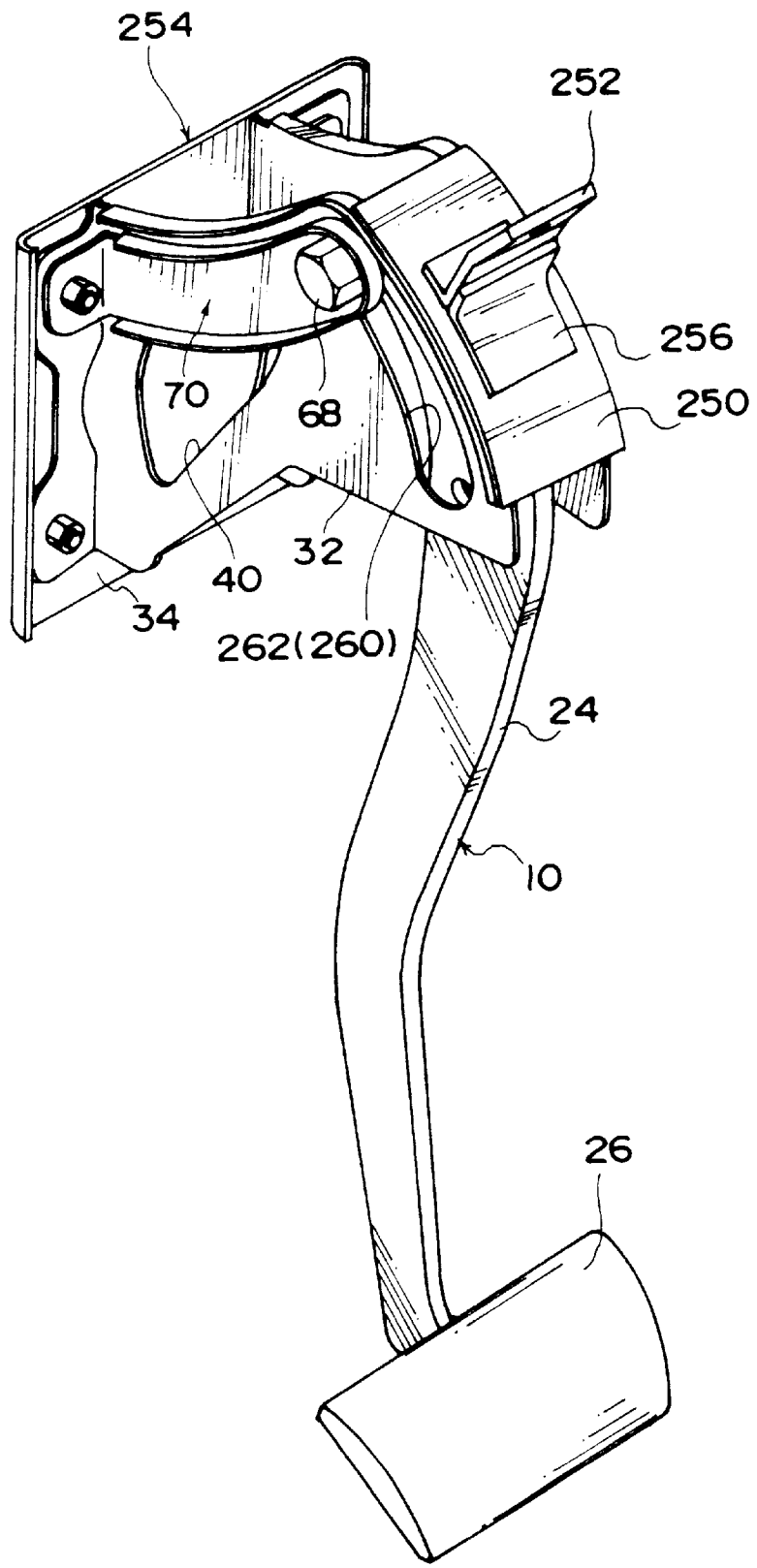
FIG. 51 is a perspective view of a supporting structure of a pedal device for a vehicle relating to an eleventh embodiment in an assembled state.
Figure 52:
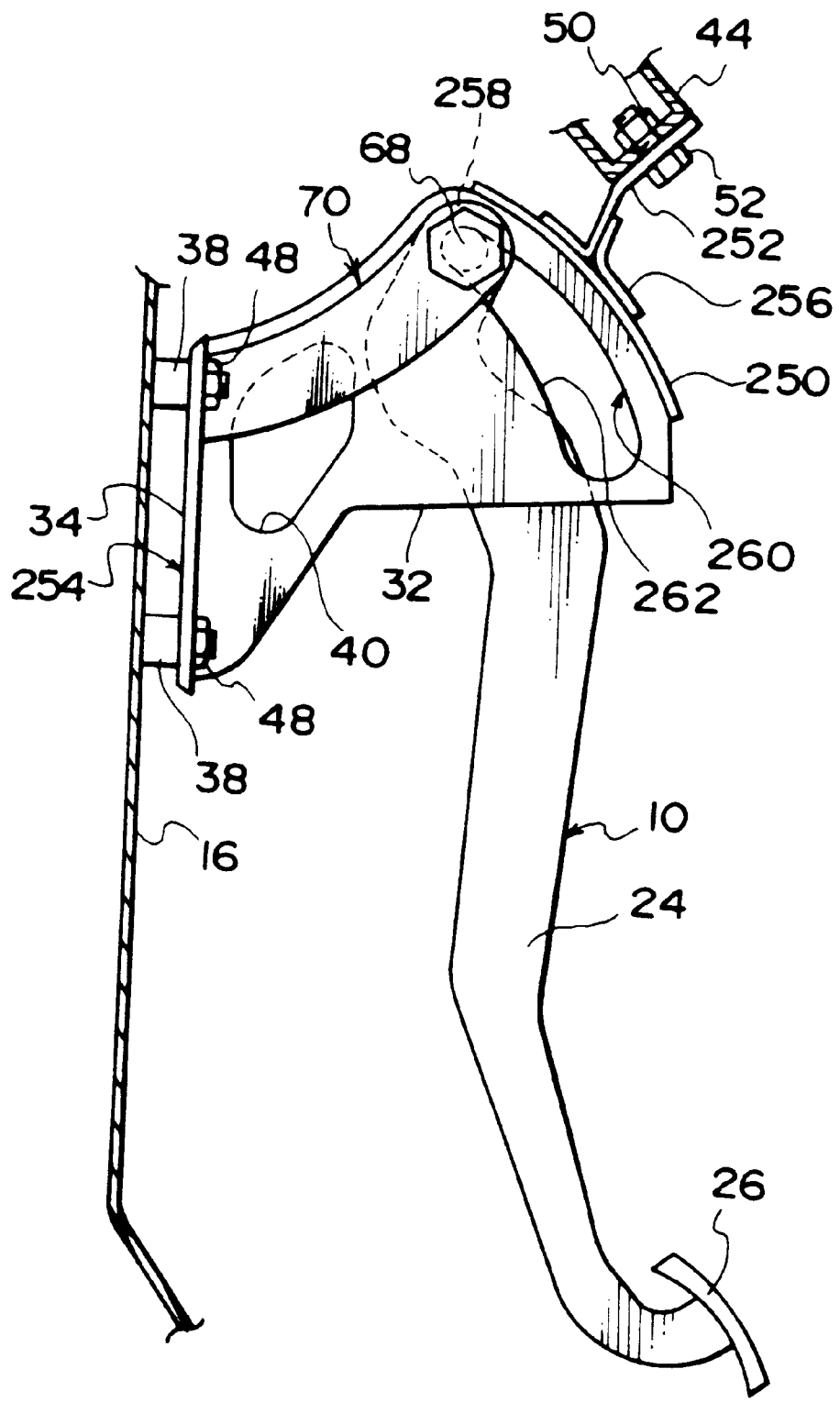
FIG. 52 is a side view of the supporting structure of a pedal device for a vehicle illustrated in FIG. 51.

More specifically, as illustrated in FIGS. 51 and 52, a pedal bracket 254 is structured by the base plate 34, the pair of side plates 32, a slide guiding plate 250 and a rear end fixing plate 252. The slide guiding plate 250 has a curved configuration and is fixed in a state of being fit tightly to the rear end surfaces of the side plates 32. The rear end fixing plate 252 is fixed to the rear end side surface of the slide guiding plate 250. An angled reinforcing member 256 is fixed between the rear end fixing plate 252 and the slide guiding plate 250.

As illustrated in FIG. 52, the outer peripheral surface of the upper end portion (a pedal boss portion 258) of the pedal supporting portion 24 of the brake pedal 10 is disposed in close proximity to the inner peripheral surface (the surface at the side toward the front of the vehicle) of the slide guiding plate 250.

An elongated hole 260, which extends in a circular arc shape substantially toward the rear of the vehicle and downwardly, is formed in each side plate 32 of the pedal bracket 254. The elongated hole 260 is similar to the elongated hole 98 of the previously-described second embodiment (see FIG. 10). However, the elongated hole 260 differs in that the transverse direction dimension thereof gradually becomes wider toward the front side, from the upper end portion toward the lower end portion of the elongated hole 260. (Hereinafter, this wider portion is called a "frontwardly wide portion 262".)

In accordance with the above-described structure, when the dash panel 16 is displaced rearward at the time that an external force of a predetermined value or greater is applied from the front of the vehicle, as the dash panel 16 is displaced rearward, the pair of side plates 32 of the pedal bracket 254 buckle in the longitudinal direction of the vehicle, and the push plates 70 push the rotating shaft portion 68 substantially toward the rear of the vehicle. As a result, the rotating shaft portion 68 moves substantially toward the rear of the vehicle and downwardly along the elongated holes 260 due to the push plates 70. At this time, the push plates 70 rotate substantially toward the rear of the vehicle and downwardly as the push plates 70 deform at the front end portions thereof. However, the hinge means used in the first embodiment may be added to the push plates 70.

In the present embodiment, due to the push plates 70 pushing the rotating shaft portion 68 substantially toward the rear of the vehicle, the outer peripheral surface of the pedal boss portion 258 of the brake pedal 10 abuts the inner peripheral surface of the slide guiding plate 250, and the pedal boss portion 258 slides substantially toward the rear of the vehicle and downwardly along the curved inner peripheral surface of the slide guiding plate 250 (i.e., the pedal boss portion 258 slides as it slidingly contacts the slide guiding plate 250). At this time, pushing force substantially toward the bottom of the vehicle is applied to the rotating shaft portion 68 from the pedal boss portion 258. Accordingly, the rotating shaft portion 68 is reliably moved substantially toward the rear of the vehicle and downwardly along the elongated holes 260.

More specifically, in the present embodiment, the rotating shaft portion 68 is moved substantially toward the rear of the vehicle and downwardly along the elongated holes 260 due to the push plates 70. Further, the rotating shaft portion 68 is moved substantially toward the rear of the vehicle and downwardly along the elongated holes 260 also due to the pedal boss portion 258 being slid along the slide guiding portion 250. Accordingly, when an external force of a predetermined value or greater is applied from the front of the vehicle, the rotating shaft portion 68 can be reliably and smoothly moved substantially toward the rear of the vehicle and downwardly along the elongated holes 260. As a result, in the present embodiment, control can be effected such that the pedal pad 26 of the brake pedal 10 is actively displaced substantially toward the front of the vehicle, and the driver's knee can be kept away from the steering column.

In the present embodiment, because the frontwardly wide portions 262 are formed at the elongated holes 260, as the rotating shaft portion 68 moves substantially toward the rear of the vehicle and downwardly along the elongated holes 260, the rotating shaft portion 68 only contacts the inner peripheral surfaces of the rear sides of the elongated holes 260, and does not contact the inner peripheral surfaces at the front sides. Therefore, the sliding resistance between the outer peripheral surface of the rotating shaft portion 68 and the inner peripheral surfaces of the elongated holes 260 is reduced. Accordingly, when an external force of a predetermined value or greater is applied from the front of the vehicle, the rotating shaft portion 68 can be smoothly and reliably moved along the elongated holes 68 substantially toward the rear of the vehicle and downwardly.

As can be understood from the above description, the present embodiment has a simple structure in which the slide guiding plate 250, which guides the movement of the pedal boss portion 258 of the brake pedal 10, is used in place of the rear plate 36, and in which the elongated holes 260 having the frontwardly wide portions 262 are used. In accordance with this simple structure, the sliding resistance between the rotating shaft portion 68 and the elongated holes 260 at the time the rotating shaft portion 68 moves can be reduced, and the pedal pad 26 of the brake pedal 10 can be actively displaced substantially toward the front of the vehicle.

In the present embodiment, the slide guiding plate 250 is structured so as to guide the pedal boss portion 258. However, the slide guiding plate 250 may be structured so as to guide the rotating shaft portion 68 or the push plates 70.

A twelfth embodiment of the present invention will be described on the basis of FIGS. 53 through 62.

In the twelfth embodiment, a structure in which movement of the pedal boss portion of the brake pedal along the slide guiding plate is made easier, and therefore, movement of the rotating shaft portion along the elongated holes is made more smooth, is added to the structure of the eleventh embodiment using the slide guiding plate.

Figure 53:
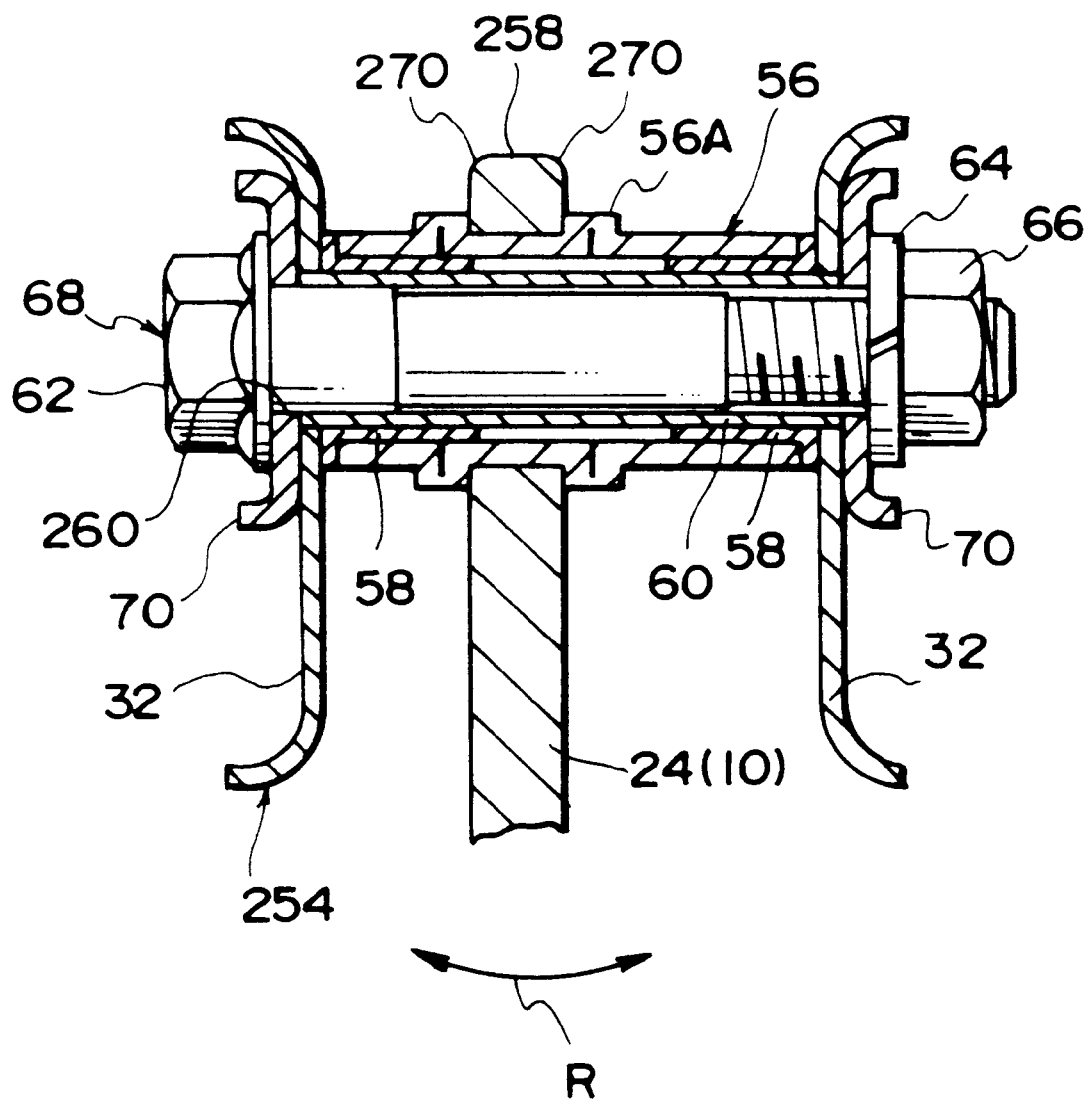
FIG. 53 is a cross-sectional view corresponding to FIG. 2 and illustrating a supporting structure of a pedal device for a vehicle relating to a twelfth embodiment.

More specifically, in the embodiment illustrated in FIG. 53, both end portions of the pedal boss portion 258 at the sides in the direction of thickness thereof are chamfered so as to become circular arc shaped surfaces having a predetermined curvature. (Hereinafter, these portions will be referred to as "chamfered portions 270".) The chamfered portions 270 are formed by grinding processing.

In accordance with the above structure, when the outer peripheral surface of the pedal boss portion 258 abuts the inner peripheral surface of the slide guiding plate 250 due to the same operation as in the previous embodiment when an external force of a predetermined value or greater is applied from the front of the vehicle, the rotating shaft portion 68 moves along the elongated holes 260 substantially toward the rear of the vehicle and downwardly while the outer peripheral surface of the pedal boss portion 258 slides along the curved inner peripheral surface of the slide guiding plate 250.

At this time, if the surface treatment of the outer peripheral surface of the pedal boss portion 258 were rough, the sliding resistance at the time the pedal boss portion 258 slides along the slide guiding plate 250 would be great, and it would be difficult for the rotating shaft portion 68 to move smoothly along the elongated holes 260. Further, if the pushing load applied to the rotating shaft portion 68 from the push plates 70 were different at the left and the right of the rotating shaft portion 68, the brake pedal 10 would slide along the slide guiding plate 250 while tilting in the rolling directions (in the directions of arrow R in FIG. 53). In these cases, because the chamfered portions 270 are not formed at the pedal boss portion 258, the corner portions of the sides of the pedal boss portion 258 in the direction of thickness thereof would slide along the slide guiding plate 250, and therefore, the surface pressure applied to the corner portions would increase.

However, in accordance with the present embodiment, because the chamfered portions 270 are provided at the pedal boss portion 258, in a case in which the brake pedal 10 slides along the slide guiding plate 250 without tilting in the rolling directions, a reduction in the sliding resistance due to a reduction in the contact surface area can be achieved. Further, in a case in which the brake pedal 10 slides along the slide guiding plate 250 while tilting in the rolling directions, an increase in the surface pressure can be avoided to the extent that there are no corner portions. Accordingly, in accordance with the present embodiment, the pedal boss portion 258 of the brake pedal 10 can be moved smoothly along the slide guiding plate 250, and therefore, the rotating shaft portion 68 can be moved smoothly along the elongated holes 260. As a result, in the present embodiment, control can be effected such that the pedal pad 26 of the brake pedal 10 can be even more actively displaced substantially toward the front of the vehicle, and the driver's knee can be kept away from the steering column.

Figure 54:
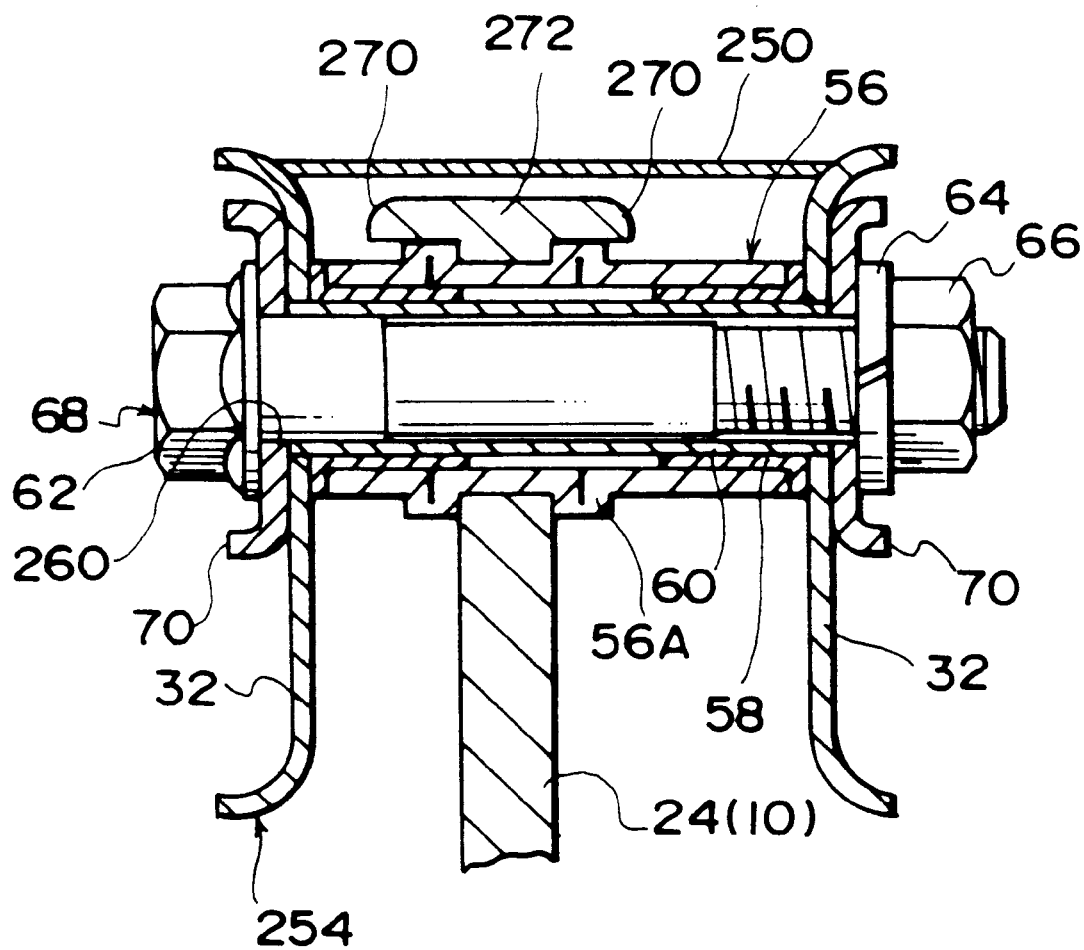
FIG. 54 is a cross-sectional view corresponding to FIG. 53 and illustrating an embodiment in which the cross-sectional configuration of a pedal boss portion illustrated in FIG. 53 is T-shaped.
Figure 55:
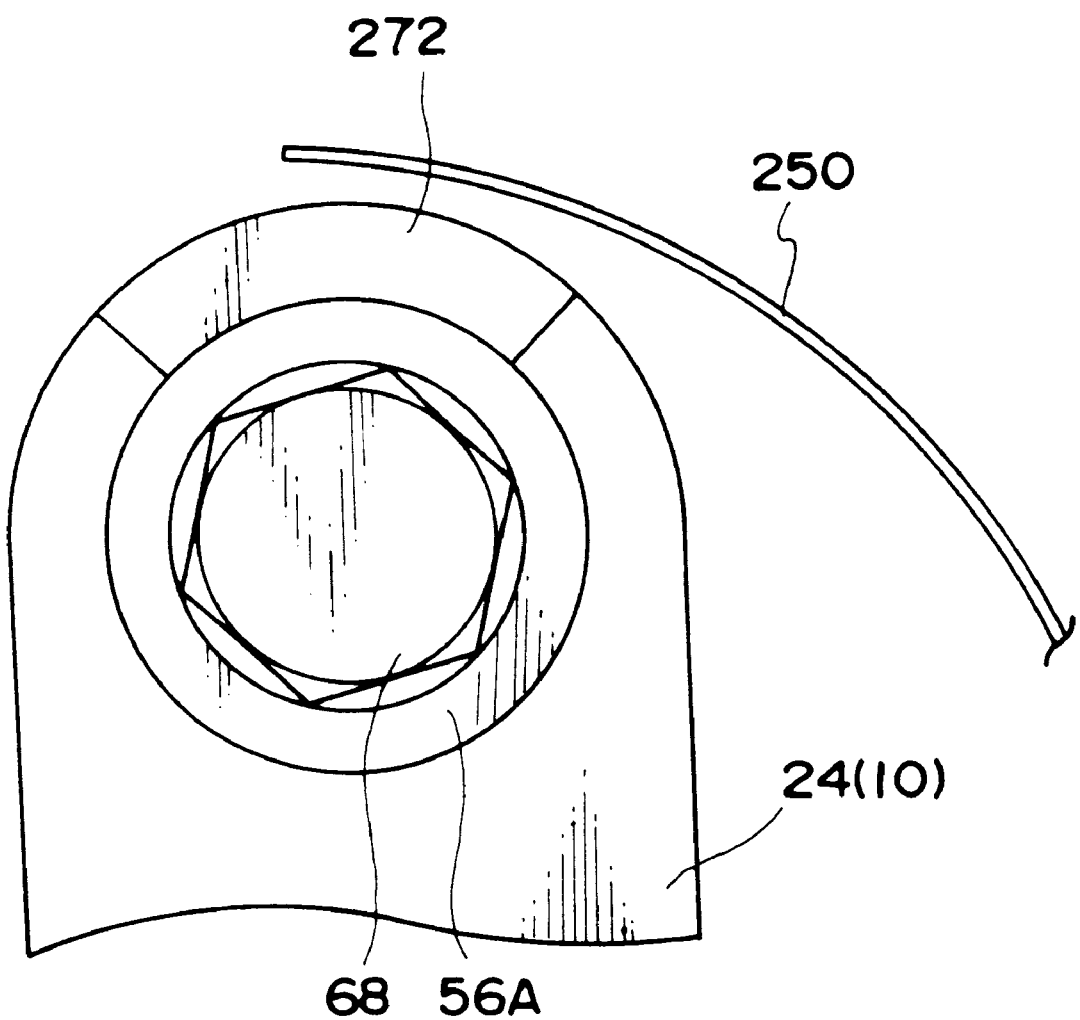
FIG. 55 is an enlarged side view of a pedal boss portion illustrated in FIG. 54.

In the embodiment illustrated in FIGS. 54 and 55, a pedal boss portion 272 of the brake pedal 10 has a substantially T-shaped cross section. More specifically, the pedal boss portion 272 is formed such that a predetermined range of the pedal boss portion 272 in a peripheral direction thereof extends in the direction of thickness of the pedal boss portion 272 so as to form a substantially T-shaped cross section. The chamfered portions 270 are formed at the corner portions at both end portions of the pedal boss portion 272.

The same operation and effects as those of the structure illustrated in the previously-described FIG. 53 are achieved by the present structure as well. Further, the contact surface area when the outer peripheral surface of the pedal boss portion 272 and the inner peripheral surface of the slide guiding plate 250 contact each other increases. Therefore, the surface pressure decreases even more than a case in which the previously-described structure is employed. Accordingly, the pedal boss portion 272 of the brake pedal 10 can be moved even more smoothly along the slide guiding plate 250, and therefore, the rotating shaft portion 68 can be moved even more smoothly along the elongated grooves 260. Moreover, because the cross-sectional configuration of the pedal boss portion 272 is substantially T-shaped, in a case in which the brake pedal 10 slides along the slide guiding plate 250 while tilting in rolling directions as described above, the tilting of the brake pedal 10 in the rolling directions is pushed back by the pedal boss portion 272, and a reaction force which offsets the wrenching force is applied to the pedal boss portion 272 from the slide guiding plate 250. Therefore, for this reason as well, the slidability of the pedal boss portion 272 of the brake pedal 10, and therefore, the movability of the rotating shaft portion 68 along the elongated holes 260 can be improved.

Figure 56:
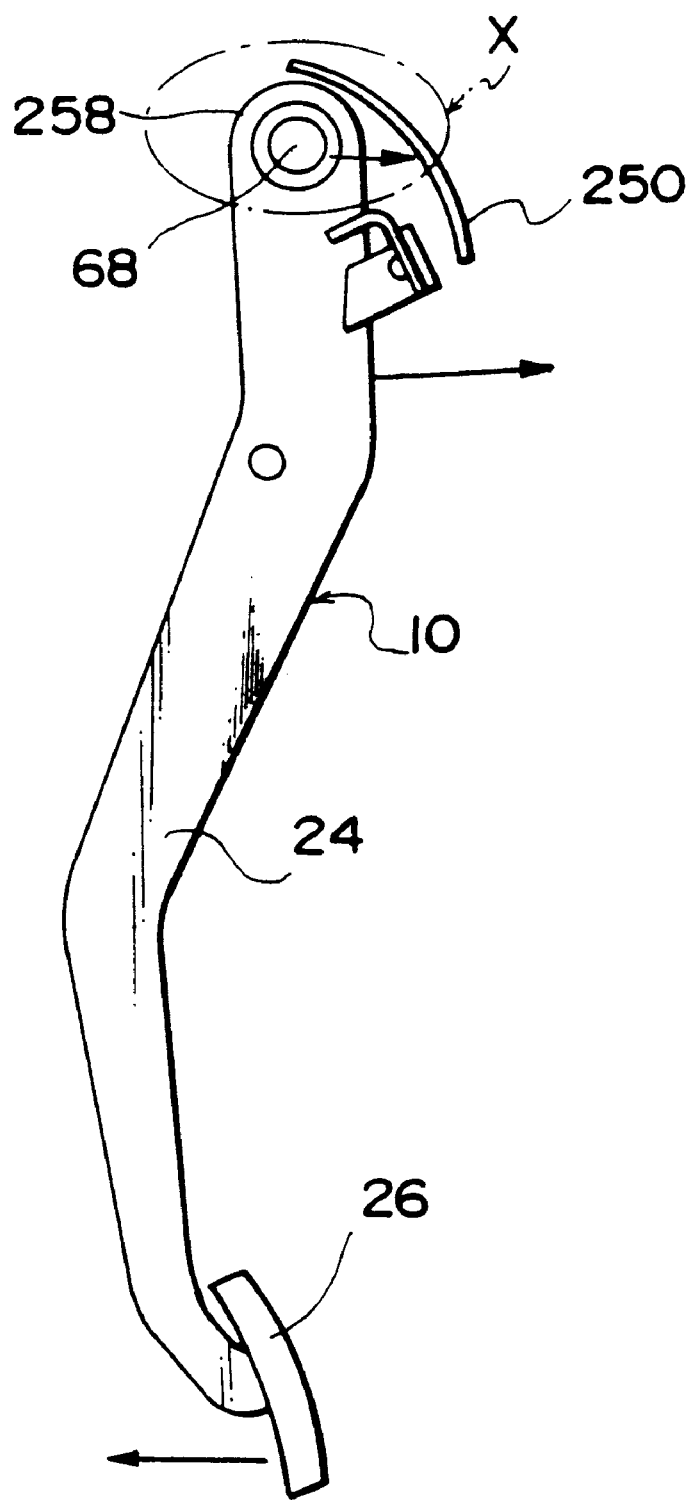
FIG. 56 is a side view of a brake pedal and a slide guiding plate, illustrating an embodiment in which the configuration of a pedal boss portion is round.
Figure 57:
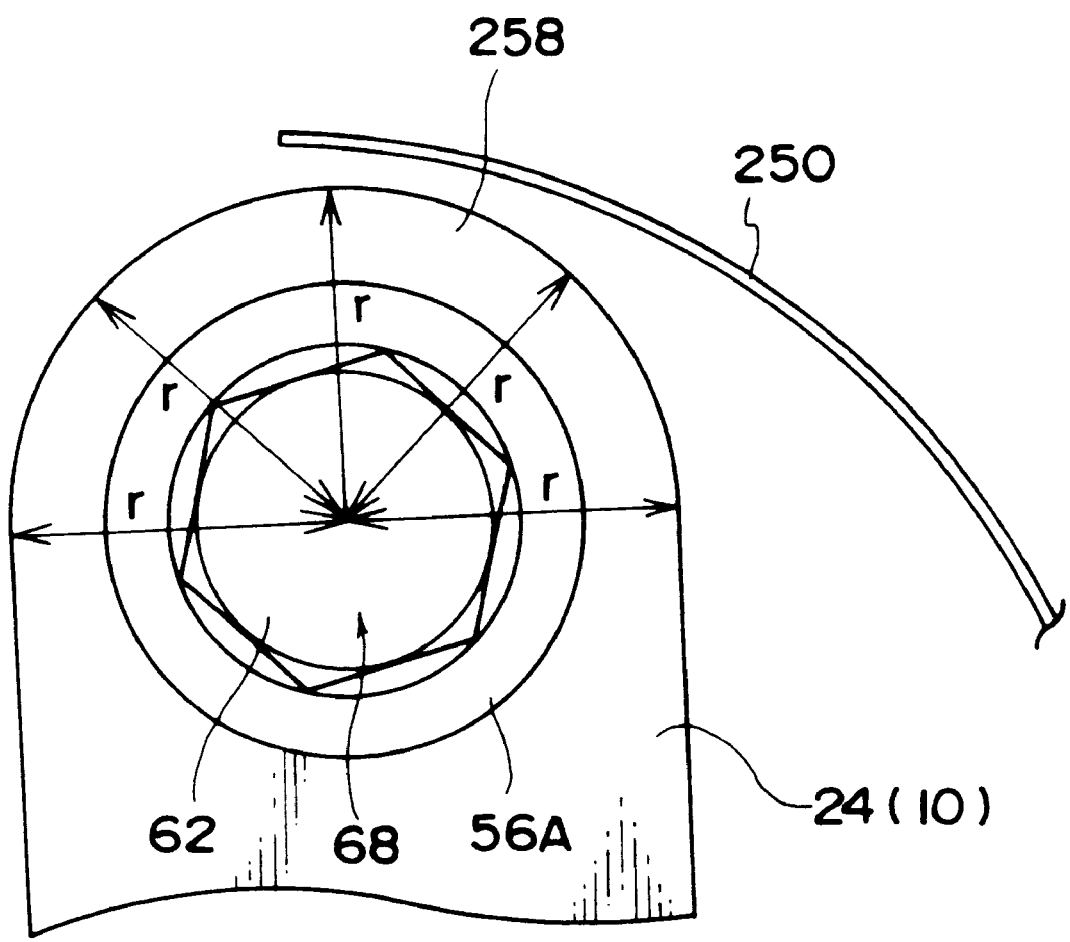
FIG. 57 is an enlarged side view of the region designated by arrow X in FIG. 56.

In the embodiment illustrated in FIGS. 56 and 57, the outer peripheral surface of the pedal boss portion 258 of the brake pedal 10 is a circular arc shaped surface having a radius r and whose center is the axis of the washer faced bolt 62 of the rotating shaft portion 68. Note that among brake pedals 10 which are usually used, there exist brake pedals in which the outer peripheral surface of the pedal boss portion 258 is not a circular arc shaped surface whose center is the axis of the washer faced bolt 62 of the rotating shaft portion 68.

In accordance with the above structure, the outer peripheral surface of the pedal boss portion 258 of the brake pedal 10 abuts the inner peripheral surface of the slide guiding plate 250 due to the same operation as the previously-described embodiment when an external force of a predetermined value or greater is applied from the front of the vehicle. Thereafter, the rotating shaft portion 68 slides along the elongated holes 260 substantially toward the rear of the vehicle and downwardly while the outer peripheral surface of the pedal boss portion 258 slides along the curved inner peripheral surface of the slide guiding plate 250.

Here, when the rotating shaft portion 68 moves substantially toward the rear of the vehicle and downwardly along the elongated holes 260, the region of contact between the outer peripheral surface of the pedal boss portion 258 and the inner peripheral surface of the slide guiding plate 250 gradually changes. Accordingly, if the outer peripheral surface of the pedal boss portion 258 is not a perfectly round configuration, the surface pressure may increase depending on the region of contact. However, in accordance with the present embodiment, the outer peripheral surface of the pedal boss portion 258 is a circular arc shaped surface having a radius r and whose center is the axis of the washer faced bolt 62 of the rotating shaft portion 68. Therefore, even if the region of contact between the outer peripheral surface of the pedal boss portion 258 and the inner peripheral surface of the slide guiding plate 250 changes, the surface pressure always remains constant. As a result, the sliding resistance at the time when the pedal boss portion 258 of the brake pedal 10 slides along the slide guiding plate 250 can be reduced. Accordingly, in accordance with the present embodiment, the pedal boss portion 258 of the brake pedal 10 can be moved smoothly along the slide guiding plate 250, and therefore, the rotating shaft portion 68 can be moved smoothly along the elongated holes 260.

Figure 58:
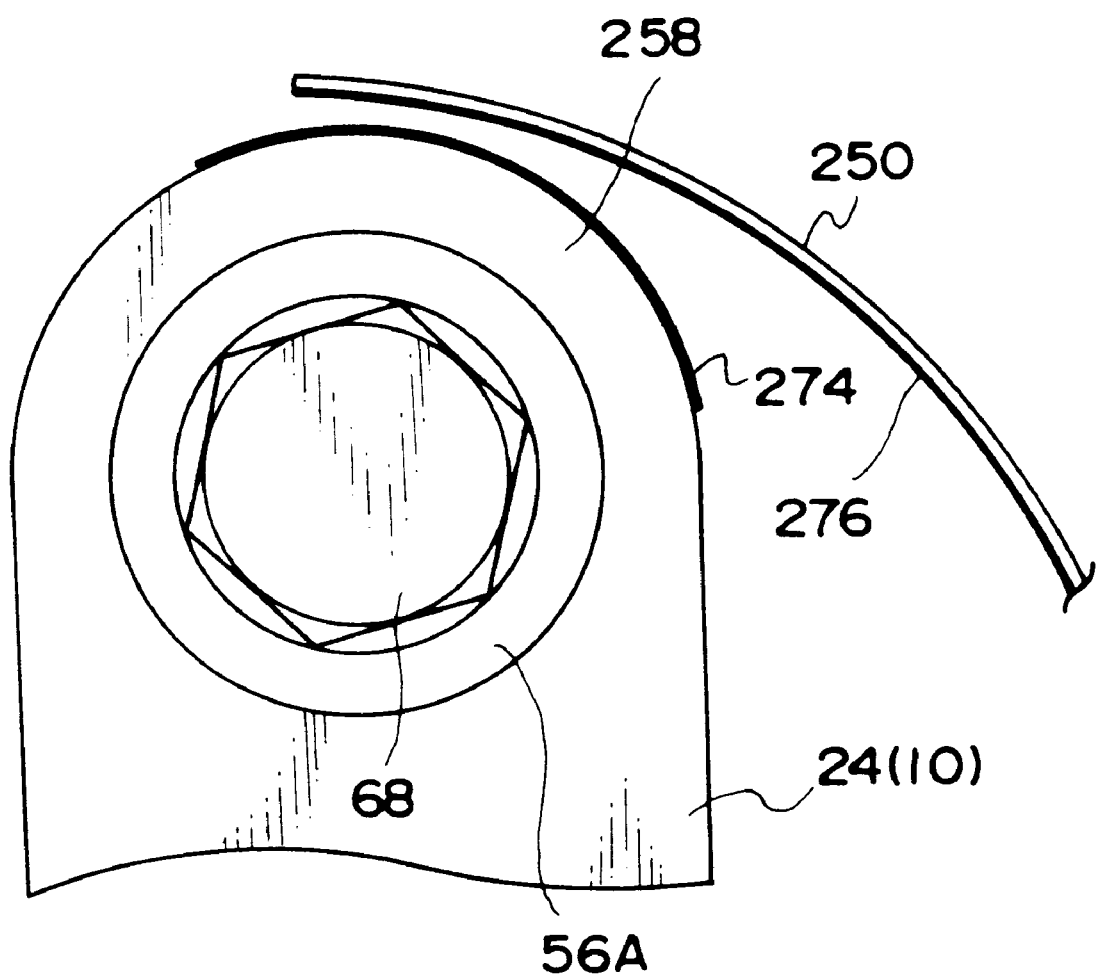
FIG. 58 is an enlarged side view corresponding to FIG. 57 and illustrating an embodiment in which lubricants are applied to the pedal boss portion and a slide guiding plate.

In the embodiment illustrated in FIG. 58, a lubricant 274 such as grease or the like is applied to the range of the outer peripheral surface of the pedal boss portion 258 of the brake pedal 10, which range contacts the inner peripheral surface of the slide guiding plate 250. In the same way, a lubricant 276 such as grease or the like is applied to the inner peripheral surface of the slide guiding plate 250.

In accordance with the above structure as well, when the outer peripheral surface of the pedal boss portion 258 of the brake pedal 10 slides along the inner peripheral surface of the slide guiding plate 250, because the contacting state is maintained via the lubricants 274, 276, the sliding resistance can be reduced. Accordingly, in the present embodiment as well, the pedal boss portion 258 of the brake pedal 10 can be moved smoothly along the slide guiding plate 250, and therefore, the rotating shaft portion 68 can be moved smoothly along the elongated holes 260.

Figure 59:
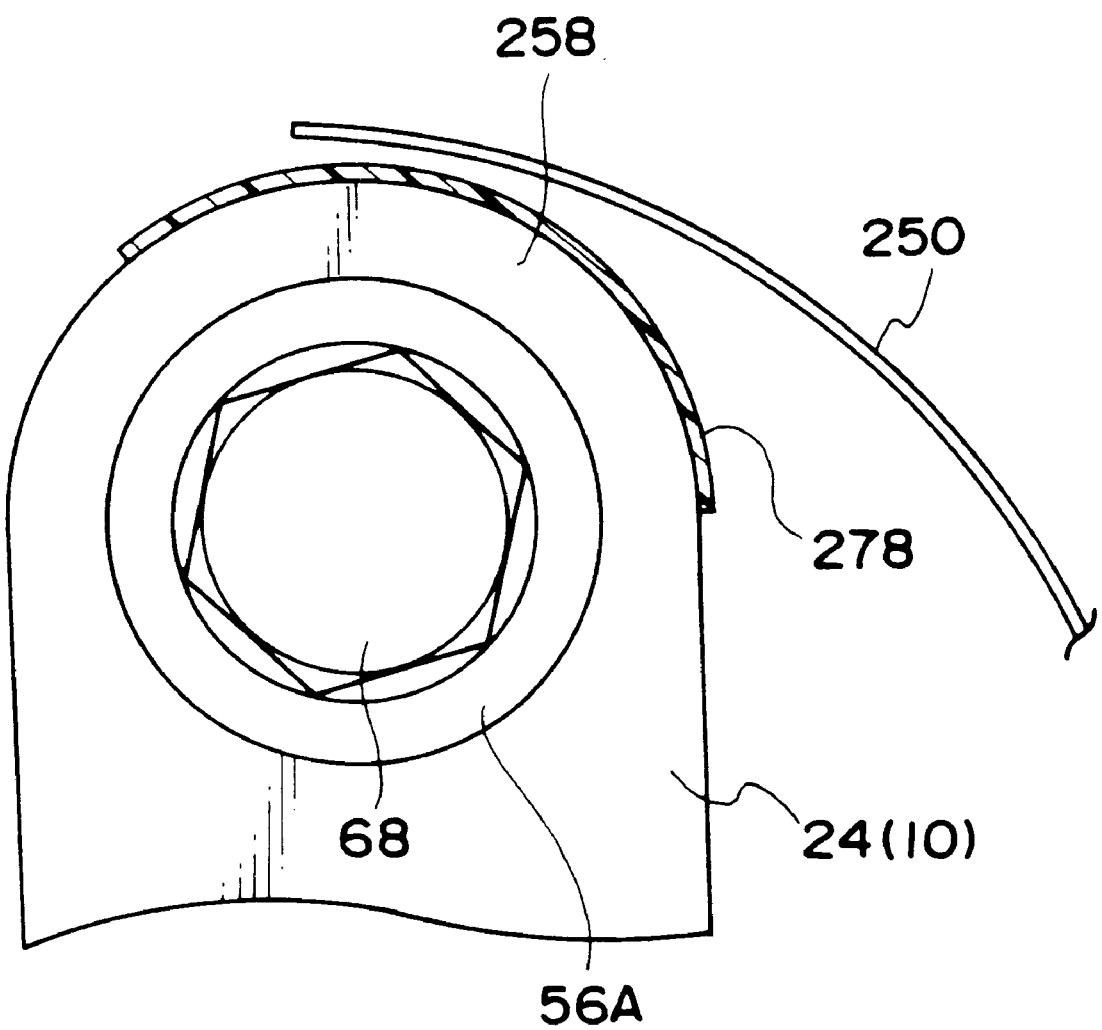
FIG. 59 is an enlarged side view corresponding to FIG. 57 and illustrating an embodiment in which a cover is provided at the outer periphery of the pedal boss portion in place of the lubricants used at the pedal boss portion and the slide guiding plate in FIG. 58.

In the present embodiment, the lubricants 274, 276 are applied to the outer peripheral surface of the pedal boss portion 258 of the brake pedal 10 and to the inner peripheral surface of the slide guiding plate 250. However, the present invention is not limited to the same. As illustrated in FIG. 59, even if a structure, in which a cover 278 of teflon or the like is adhered to the outer peripheral surface of the pedal boss portion 258, is used in place of the structure in which the lubricants 274, 276 are applied, the same effects can be achieved.

Figure 60:
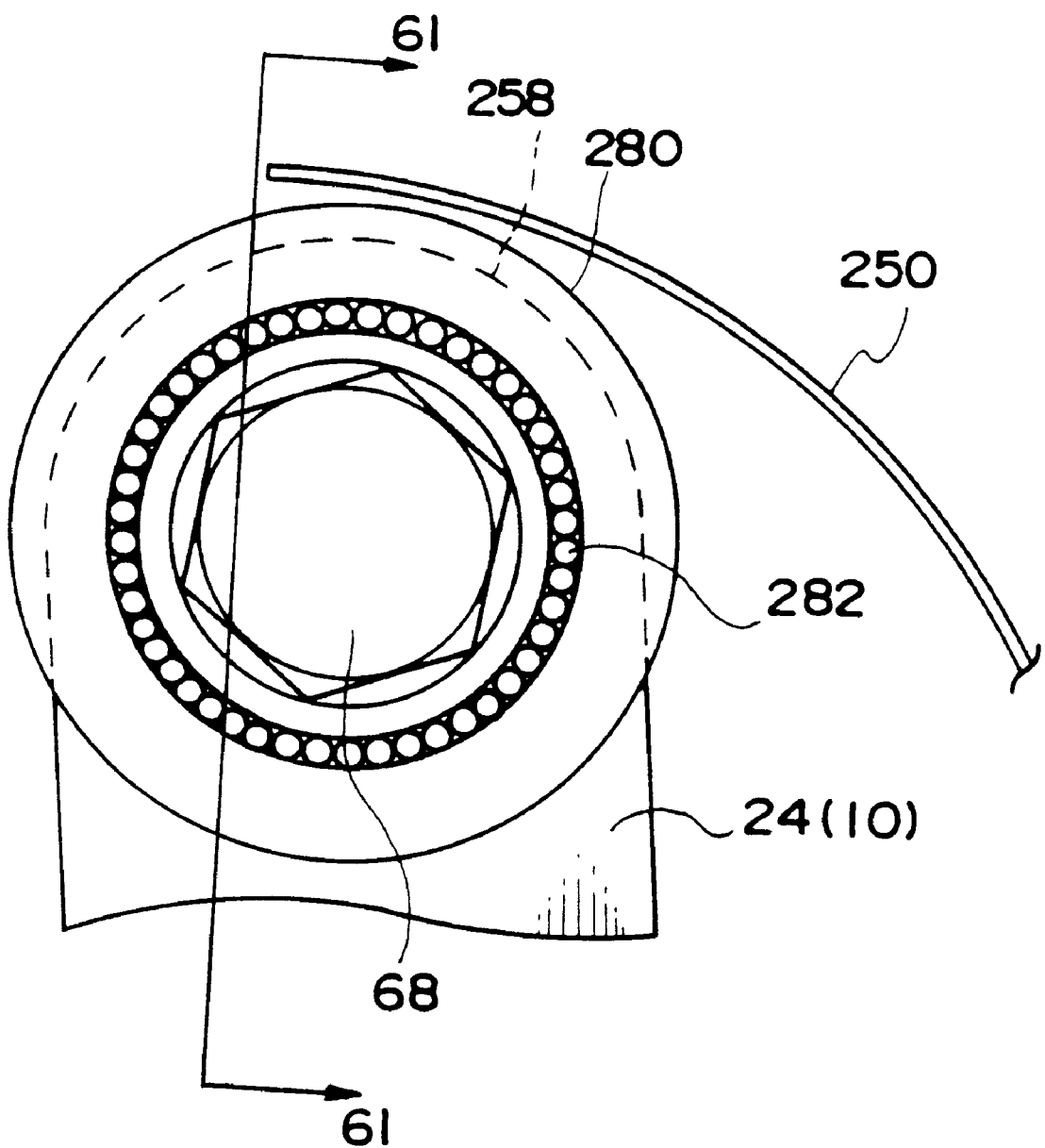
FIG. 60 is an enlarged side view corresponding to FIG. 57 and illustrating an embodiment in which a pair of rollers are provided at a pedal boss of a rotating shaft portion.
Figure 61:
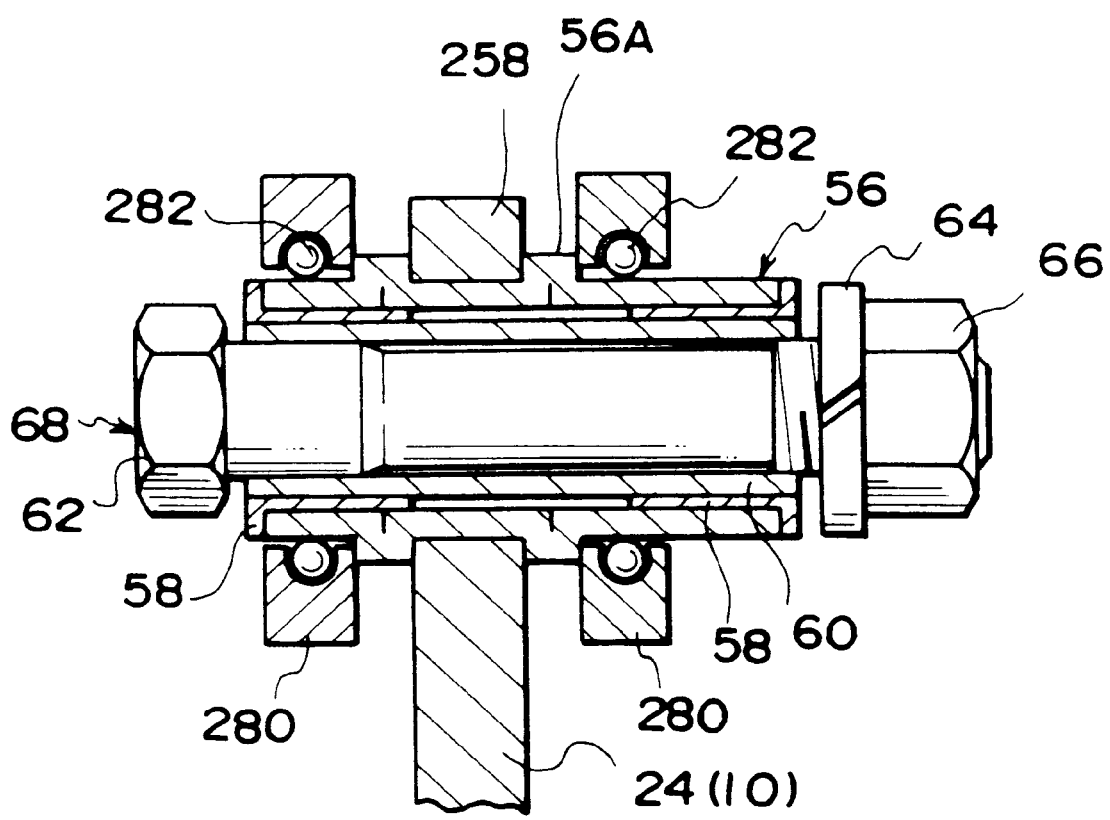
FIG. 61 is a longitudinal sectional view taken along line 61—61 of FIG. 60 of a structure of a periphery of the pedal boss illustrated in FIG. 60.

In the embodiment illustrated in FIGS. 60 and 61, a roller 280 is disposed at the outer periphery of each end portion of the pedal boss 56 of the rotating shaft portion 68 which shaft-supports the pedal supporting portion 24 of the brake pedal 10. The radius of curvature of each of the rollers 280 is set to be larger than the radius of curvature of the pedal boss portion 258 of the pedal supporting portion 24 of the brake pedal 10. A bearing 282 is interposed between the inner peripheral surface of the roller 280 and the outer peripheral surface of the pedal boss 56. Note that the pedal bracket 254 and the push plates 70 have been omitted from FIG. 61.

In accordance with the above structure, when an external force of a predetermined value or greater is applied from the front of the vehicle, the outer peripheral surfaces of the pair of rollers 280 of the brake pedal 10 abut the inner peripheral surface of the slide guiding portion 250 due to the same operation as in the previously-described embodiments. Thereafter, the rotating shaft portion 68 moves substantially toward the rear of the vehicle and downwardly along the elongated holes 260 as the outer peripheral surfaces of the pair of rollers 280 slide along the curved inner peripheral surface of the slide guiding plate 250.

Here, in the present embodiment, the outer peripheral surface of the pedal boss portion 258 of the brake pedal 10 does not directly abut and slide along the inner peripheral surface of the slide guiding plate 250, but rather, the pair of rollers 280, which are provided at the end portions of the pedal boss 56 of the rotating shaft portion 68 via the bearings 282, roll along the inner peripheral surface of the slide guiding plate 250. Therefore, only rolling frictional force is applied between the outer peripheral surfaces of the rollers 280 and the inner peripheral surface of the slide guiding plate 250. As a result, the sliding resistance can be reduced even more than in the previously-described embodiment. Accordingly, in accordance with the present embodiment, the rotating shaft portion 68 can be moved even more smoothly along the elongated holes 260.

In the present embodiment, the pedal boss portion 258 of the brake pedal 10 is disposed at the intermediate portion of the rotating shaft portion 68 in the axial direction thereof, and the pair of rollers 280 are disposed at the sides of the pedal boss portion 258. However, in a case in which the pedal boss portion 258 of the brake pedal 10 is disposed so as to be offset toward one axial direction end portion side of the rotating shaft portion 68, a single roller 280 can be disposed at the axial direction intermediate portion of the rotating shaft portion 68.

Figure 62:
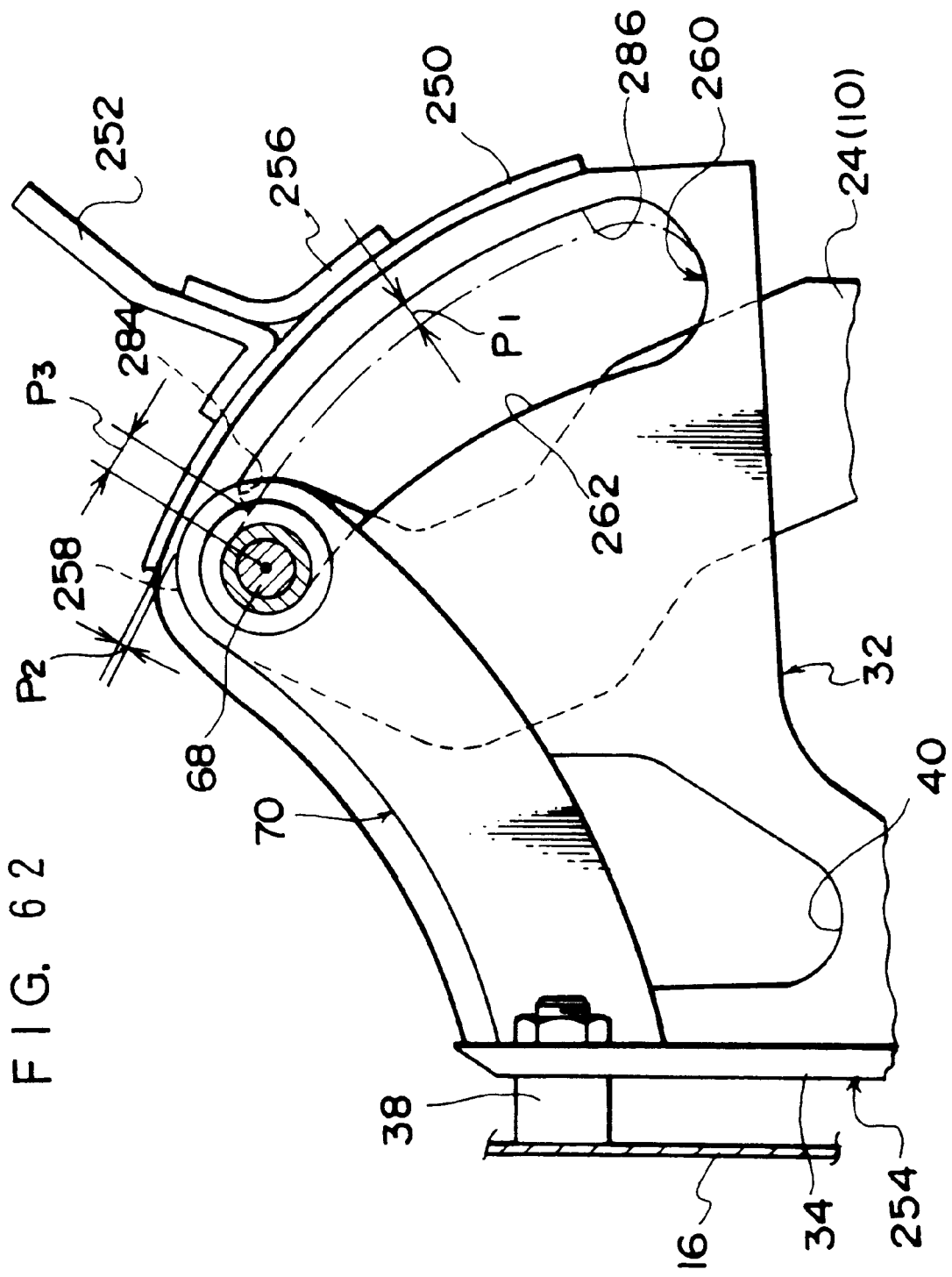
FIG. 62 is a side view of a pedal bracket illustrating an embodiment in which the configuration of an elongated hole formed in a side plate of a pedal bracket has been improved.

In the embodiment illustrated in FIG. 62, the elongated holes 260 formed in the pair of side plates 32 have the following configuration. The configuration illustrated by the one-dot chain line in FIG. 62 is the elongated hole 260 which is used in the eleventh embodiment and whose transverse direction dimension gradually increases toward the front gradually from the upper end portion toward the lower end portion so as to form the frontwardly wide portion 262. In contrast, in the elongated hole 260 used in the present embodiment, a step portion 284 is formed in a vicinity of the upper end portion at the rear portion of the elongated hole 260. Further, a rearwardly wide portion 286, which widens substantially toward the rear of the vehicle by a predetermined width $P_1$, is formed at the portion extending from the step portion 284 to the lower end portion of the rear portion of the elongated hole 260. The transverse direction dimension of the upper end portion of the elongated hole 260 is set to substantially match the outer diameter dimension of the rotating shaft portion 68.

The distance between the inner peripheral surface of the slide guiding portion 250 and the outer peripheral surface of the pedal boss portion 258 of the brake pedal 10 in the state in which the rotating shaft portion 68 is disposed at the upper end portions of the elongated holes 260 is set to $P_2$. The distance from the center of the rotating shaft portion 68 disposed at the upper end portions of the elongated holes 260 to the starting point of the step portion 284 is set to $P_3$. The dimensional relationships must be set to that the width $P_1$>the distance $P_2$. However, if the width $P_1$ is too large, the rigidity of the portions of the side plates 32 of the pedal bracket 254 at the rear sides of the elongated holes 260 will decrease. Therefore, it is preferable that the width $P_1$ be made large as possible within a range in which a certain amount of rigidity can be maintained.

In accordance with the above structure, the rotating shaft portion 68 of the brake pedal 10 is shaft-supported at the upper end portions of the elongated holes 260, and the transverse direction dimensions of the upper end portions of the elongated holes 260 are set to as to substantially match the outer diameter dimension of the rotating shaft portion 68. Therefore, there is no joggling between the rotating shaft portion 68 and the elongated holes 260 during ordinary operation of the brake pedal 10.

When the rotating shaft portion 68 is pushed substantially toward the rear of the vehicle by the push plates 70 at the time an external force of a predetermined value or greater is applied from the front of the vehicle, the gap of the distance $P_2$ is eliminated due to the distortion accompanying the longitudinal direction buckling of the side plates 32, and the outer peripheral surface of the pedal boss portion 258 of the brake pedal 10 abuts the inner peripheral surface of the slide guiding plate 250. Thereafter, when the outer peripheral surface of the pedal boss portion 258 slides substantially toward the rear of the vehicle and downwardly by the distance $P_3$ along the inner peripheral surface of the slide guiding plate 250, the rotating shaft portion 68 reaches the rearwardly wide portions 286 of the elongated holes 260. Therefore, the rotating shaft portion 68 moves substantially toward the rear of the vehicle and downwardly along the elongated holes 260 while using the rearwardly wide portions 286. Accordingly, the rotating shaft portion 68 does not contact the inner peripheral forward portions of the elongated holes 260 and does not receive surface pressure therefrom, and further, the surface pressure received from the inner peripheral rearward portions of the elongated holes 260 decreases as well. As a result, the sliding resistance can be decreased even more. In accordance with the present embodiment, the rotating shaft portion 68 can be moved even more smoothly along the elongated holes 260.

Moreover, also in cases in which wrenching force is applied to the brake pedal 10 at the time the rotating shaft portion 68 moves along the elongated grooves 260, because the rearwardly wide portions 286 are formed at the elongated holes 260 in the present embodiment, the wrenching force can be absorbed at the rearwardly wide portions 286. (Here, wrenching force is the force in a direction of rotating the rotating shaft portion 68 of the brake pedal 10 around the longitudinal direction center of the rotating shaft portion 68 as seen in plan view.) Accordingly, the rotating shaft portion 68 can be moved smoothly along the elongated holes 260 also in cases in which such wrenching force is applied to the brake pedal 10.

A thirteenth embodiment of the present invention will be described hereinafter with reference to FIGS. 63 through 68.

The thirteenth embodiment features a structure for buckling longitudinal direction portions of the push plates, in a direction substantially along the direction in which the rotating shaft portion is guided by the elongated holes, at the time the pedal bracket buckles.

Figure 64A:
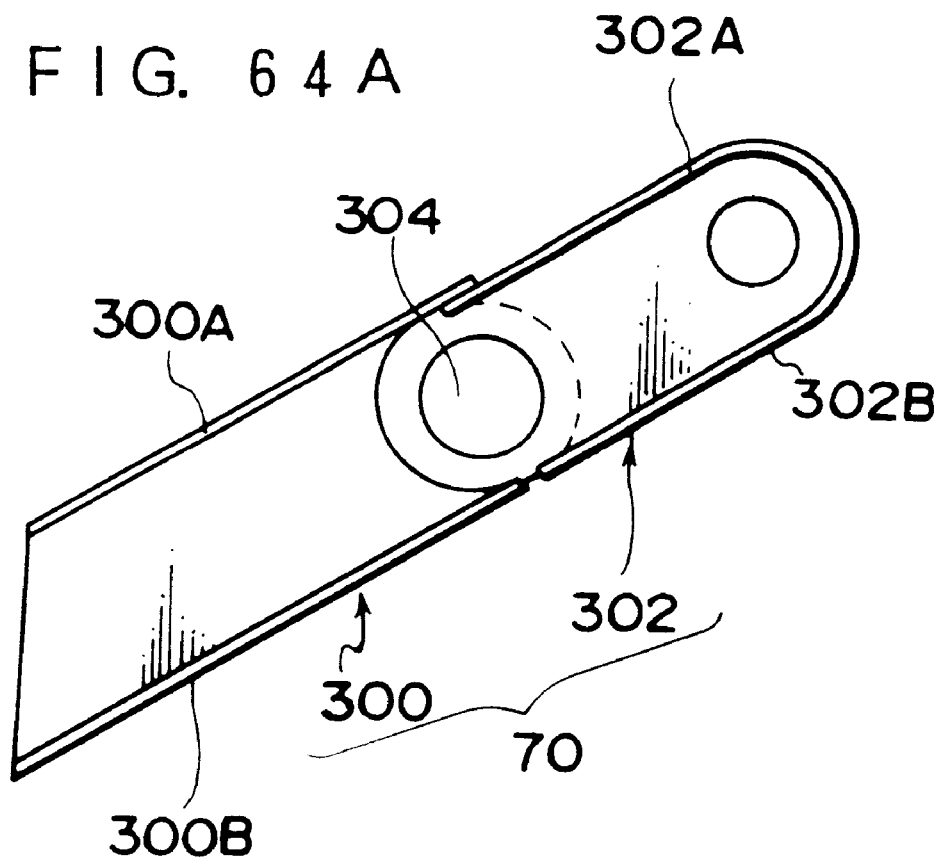
FIG. 64A is an enlarged view of the push plate illustrated in FIG. 63.
Figure 64B:
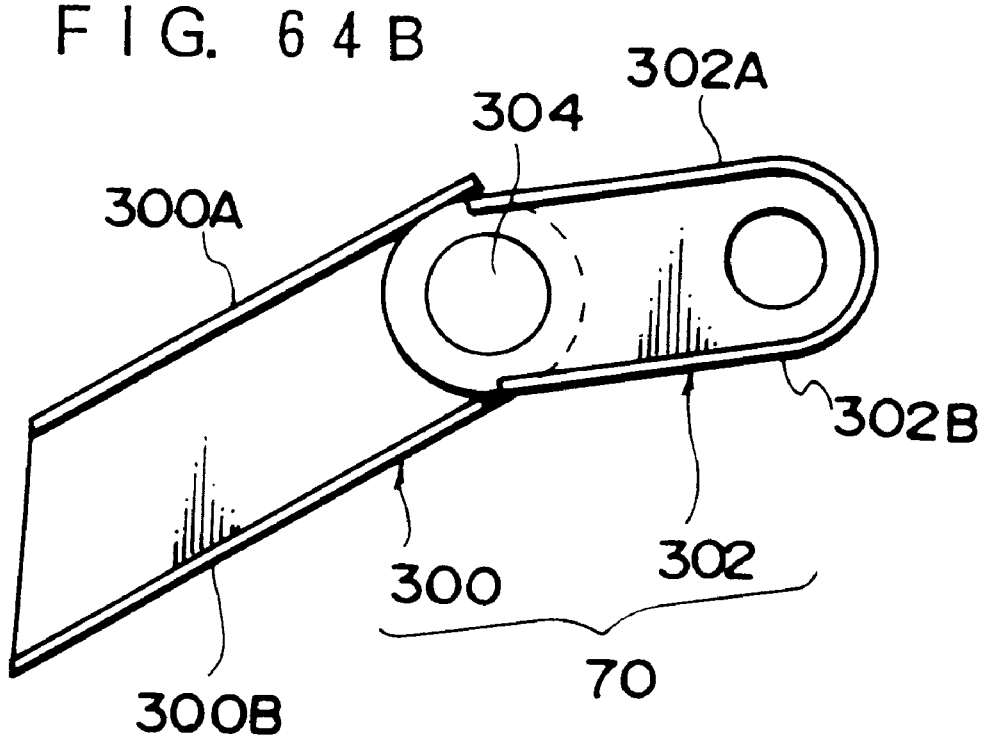
FIG. 64B is an enlarged view of the push plate illustrated in FIG. 63.

More specifically, in the embodiment illustrated in FIGS. 63 and 64, the push plates 70 disposed at the outer sides of the side plates 32 of the pedal bracket 30 are respectively divided into a front plate 300 and a rear plate 302. The dividing point of the push plate 70 is set to be in a vicinity of the rotating shaft portion 68. The rear end portion of the front plate 300 and the front end portion of the rear plate 302 are hinge-joined by a hinge pin 304. The front end portion of a rear side upper flange 302A, which is formed at the upper edge portion of the rear plate 302, is superposed with the lower surface of the rear end portion of a front side upper flange 300A which is formed at the upper edge portion of the front plate 300. The rear end portion of a front side lower flange 300B, which is formed at the lower edge portion of the front plate 300, and a rear side lower flange 302B, which is formed at the lower edge portion of the rear plate 302, oppose each other with a predetermined gap therebetween. Accordingly, the rear plate 302 cannot rotate counterclockwise around the hinge pin 304 with respect to the front plate 300, but can rotate clockwise.

In accordance with the present structure, when an external force of a predetermined value or more is applied from the front of the vehicle and the dash panel 16 is displaced rearward, as the dash panel 16 is displaced rearward, the pair of side plates 32 of the pedal bracket 30 buckle in the longitudinal direction, and the push plates 70 move the rotating shaft portion 68 along the elongated holes 42 substantially toward the rear of the vehicle. At this time, in a case in which the dash panel 16 is displaced rearward asymmetrically to the left and the right, if the push plates 70 having undivided structures are used, the direction in which the rotating shaft portion 68 is pushed by the push plates 70 differs in the longitudinal direction of the elongated holes 42 (the guiding direction). Therefore, the frictional force between the outer peripheral surface of the rotating shaft portion 68 (more correctly, the outer peripheral surface of the collar 60) and the inner peripheral surfaces of the elongated holes 42 increases, and it is difficult for the rotating shaft portion 68 to move substantially toward the rear of the vehicle.

However, in accordance with the present embodiment, each of the push plates 70 is divided into the front plate 300 and the rear plate 302 which are hinge-joined, and the direction of rotation is limited to one direction. Therefore, when a load of a predetermined value or greater is inputted to the push plates 70 via the dash panel 16, the rear plates 302 of the push plates 70 rotate downwardly around the hinge pins 304 (the state shown in FIG. 64B). In this way, the direction of the pushing applied to the rotating shaft portion 68 via the push plates 70 coincides with the longitudinal direction of the elongated holes 42, and the sliding resistance between the outer peripheral surface of the rotating shaft portion 68 and the inner peripheral surfaces of the elongated holes 42 is decreased. Accordingly, when an external force of a predetermined value or greater is applied from the front of the vehicle, the rotating shaft portion 68 can be reliably and smoothly moved substantially toward the rear of the vehicle along the elongated holes 42. As a result, in the present embodiment as well, control can be effected such that the pedal pad 26 of the brake pedal 10 is displaced substantially toward the front of the vehicle, and the driver's knee can be kept away from the steering column.

In the embodiments illustrated in FIG. 65, a rigidity decreasing portion (weak portion), which decreases the rigidity in the longitudinal direction, is provided at a predetermined region of the push plate 70 formed by a base portion 306, a mounting portion 308, an upper flange portion 310 and a lower flange portion 312. An insertion hole for the rotating shaft portion 68 is formed in the base portion 306. The mounting portion 308 is formed by bending outwardly the base plate 34 side end portion of the base portion 306. An insertion hole for the stud bolt 46 or the like is formed in the mounting portion 308. The upper flange portion 310 is formed by bending outwardly the upper edge portion of the base portion 306, whereas the lower flange portion 312 is formed by bending outwardly the lower edge portion of the base portion 306.

In the push plate 70 illustrated in FIG. 65A, a cut-out portion 314 is formed in the lower flange portion 312 from the mounting portion 308 to a vicinity of the rotating shaft portion 68 insertion hole. In the push plate 70 of FIG. 65B, a slit-shaped notch portion 316, which extends from the upper edge side toward the lower edge side, is formed in the front end portion (in a vicinity of the mounting plate 308) of the base portion 306. In the push plate 70 illustrated in FIG. 65C, a triangular opening portion 318 is formed in the front end portion of the base portion 306, and a cutaway portion 320 is formed in the front end portion of the lower flange portion 312. In the push plate 70 shown in FIG. 65D, a slit 322 extending in vertical directions is formed in the front end portion of the base portion 306. In the push plate 70 shown in FIG. 65E, a triangular cut-out portion 324 is formed in the front end portion of the base portion 306, and a rectangular cut-out portion 326 which communicates with the cut-out portion 324 is formed in the front end portion of the bottom flange portion 312.

In accordance with the above-described structures, by providing the cut-out portion 314 and the like, the rigidity of the push plates 70 in the longitudinal direction can be decreased to that extent in each of the above embodiments. Therefore, when the push plate 70 is pushed substantially toward the rear of the vehicle via the dash panel 16 at the time an external force of a predetermined value or greater is applied from the front of the vehicle, the push plate 70 bends downwardly in the figure, with the rigidity decreasing portion being the starting point of the bending, and the rotating shaft portion 68 rotates clockwise in the drawing around the rigidity decreasing portion. Accordingly, particularly when the circular arc shaped elongated holes 98, 260 are used, the rotating shaft portion 68 can be smoothly moved substantially toward the rear of the vehicle and downwardly along the direction of guiding by the elongated holes 98, 260.

In accordance with the present embodiment, a structure for integrally bending the push plate 70 when the push plate 70 is press molded can be formed. Therefore, in the present embodiment, the structure is more simple and the number of manufacturing processes can be reduced as compared to the structure illustrated in FIG. 63.

Rigidity increasing portions such as beads or the like may be added to the above-described structures of the push plates 70 so as to improve the bendability of the push plates 70. Examples are described hereinafter.

In the push plate 70 illustrated in FIG. 66A, a pair of beads 328, which extend in the longitudinal direction of the base portion 306, are set at the front end and the rear end of the base portion 306. A triangular cut-out portion 330 is formed in the lower edge side of the base portion 306 between the beads 328. Further, FIGS. 66B through 66E illustrate structures in which beads 332 extending in the longitudinal direction of the base portions 306 have been added to the base portions 306 of the push plates 70 illustrated in FIGS. 65B through 65E.

In accordance with these structures, the rigidity of the portion in which the cut-out portion 330 or the like is formed is decreased, while on the other hand, the rigidity of the base portion 306 of the push plate 70 is increased by the addition of the beads 328, 332. Therefore, when a load substantially toward the rear of the vehicle is received from the dash panel 16, this load can be efficiently transmitted to the cut-out portion 330 or the like which is the rigidity decreasing portion. Accordingly, the bendability of the push plate 70 can be improved.

Figure 67:
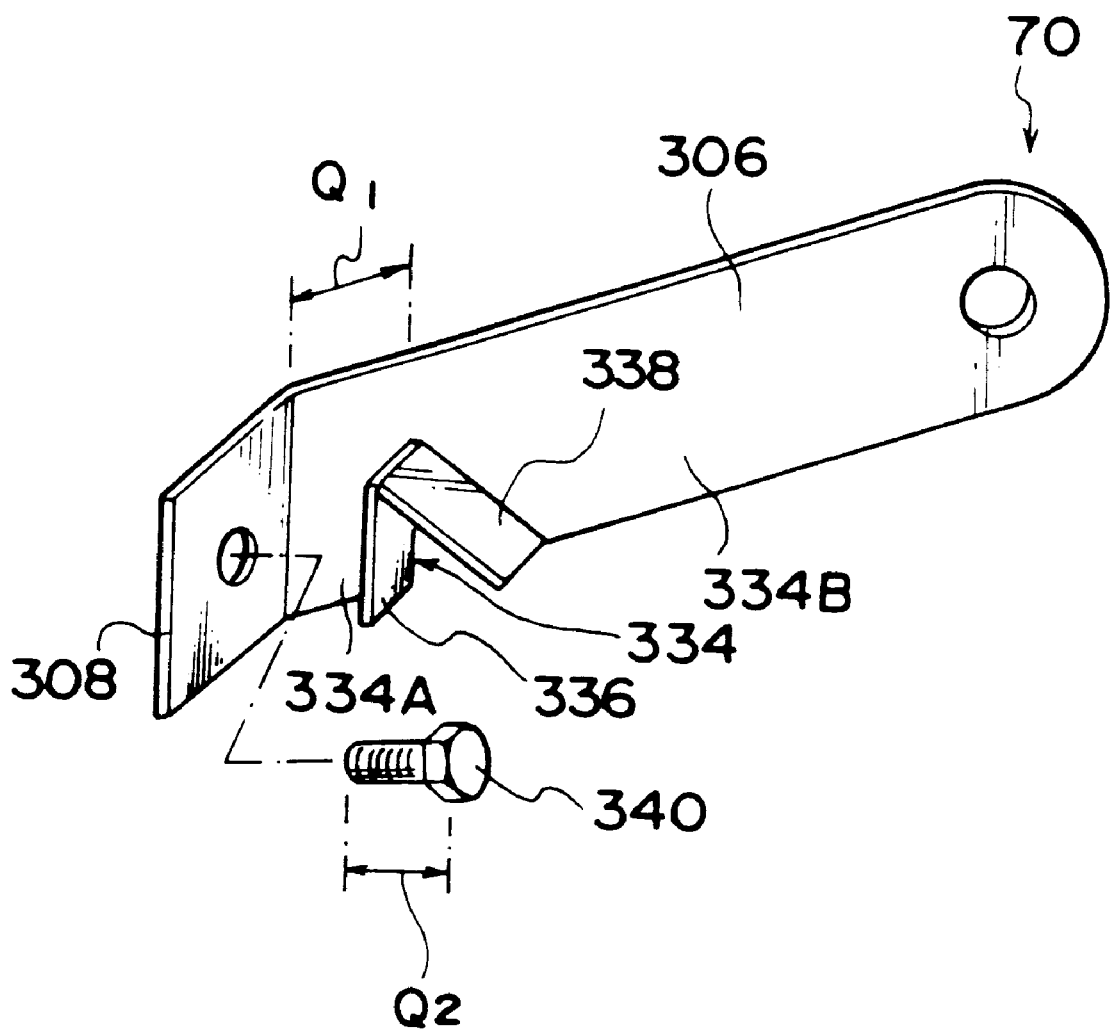
FIG. 67 is a perspective view illustrating an embodiment in which a stopper function has been added to a push plate having a bending function.

In the embodiment shown in FIG. 67, a triangular cutout portion 334 is formed in the lower edge side of the front end portion of the base portion 306 of the push plate 70. Further, in this structure, a rectangular front side flange portion 336 is disposed at the base portion 306 in a direction orthogonal to the surface of the base portion 306, along the peripheral edge portion of the front edge side of the cut-out portion 334. A rectangular rear side flange portion 338 is disposed at the base portion 306 in a direction orthogonal to the surface of the base portion 306, along the peripheral edge portion of the rear edge side of the cut-out portion 334. The front side flange portion 336 and the rear side flange portion 338 oppose each other, and are set at a predetermined angle in order to obtain a bending angle which coincides with the guiding direction of the elongated hole 42. In place of the structure in which the stud bolt 46 is inserted into the insertion hole formed in the mounting portion 308 and screwed with the nut 48, a mounting bolt 340 may be inserted from the vehicle interior side. In consideration of this structure, the interval $Q_1$ between the mounting portion 308 and the front side flange portion 336 of the push plate 70 is set so as to be greater than an axial direction dimension $Q_2$ of the mounting bolt 340.

Operation of the above-described embodiment is as follows. When only the cut-out portion 334 is formed in the base portion 306 of the push plate 70 (corresponding to the structure illustrated in FIG. 66E), when the push plate 70 bends, a front portion 334A of the cut-out portion 334 may pass by a rear portion 334B of the cut-out portion 334 without abutting the rear portion 334B. However, if the front side flange portion 336 and the rear side flange portion 338 are provided at the front and rear of the cutout portion 334 of the push plate 70 as in the present embodiment, when the push plate 70 bends, the front side flange portion 336 reliably abuts the rear side flange portion 338. The front portion 334A of the cut-out portion 334 passing by the rear portion 334B of the cut-out portion 334 can be prevented. Further, the angle formed by the front portion 334A and the rear portion 334B is set to an angle which is optimal in consideration of the guiding direction of the elongated hole 42. Therefore, the push plate 70 is bent at an optimal bending angle. Accordingly, in accordance with the present embodiment, the push plate 70 can be bent appropriately, and thus, the rotating shaft portion 68 can be moved smoothly and reliably substantially toward the rear of the vehicle and downwardly.

Figure 68:
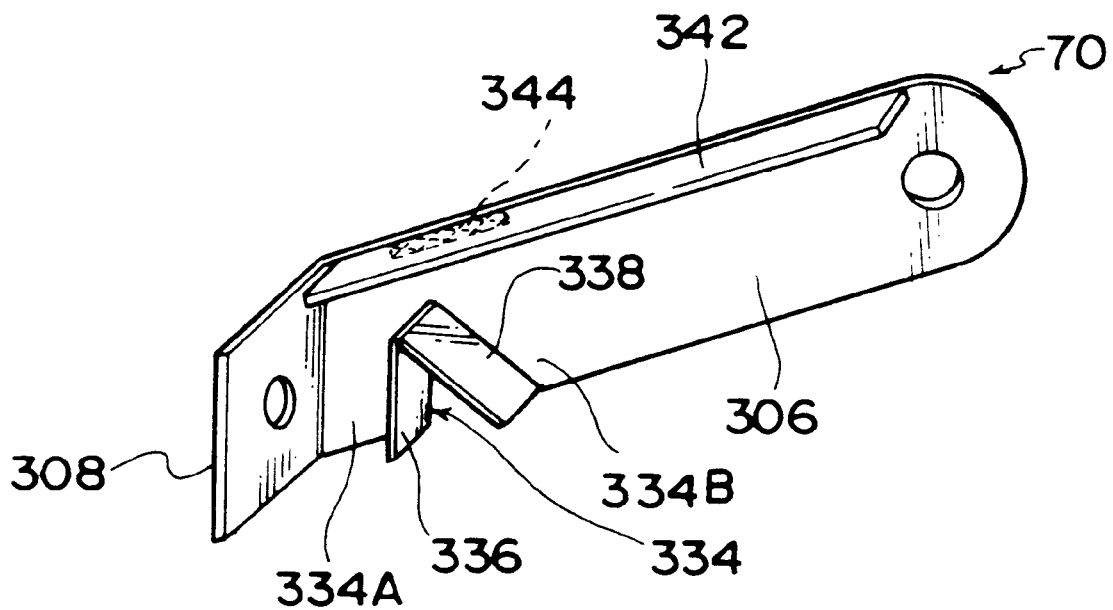
FIG. 68 is a perspective view corresponding to FIG. 67 and illustrating an embodiment in which a rib has been added to the push plate illustrated in FIG. 67.

In the embodiment illustrated in FIG. 68, in the push plate 70 illustrated in FIG. 67, a narrow, plate-shaped rib 342 is attached by welding or the like to the upper edge portion of the base portion 306 subsequent to formation of the push plate 70. The rib 342 is disposed such that the surface direction thereof is the direction of thickness of the base portion 306. The rib 342 is welded to the upper edge portion of the base portion 306 at regions other than a region 344 directly above the cut-out portion 334.

In accordance with the above structure, the following operation and effects are achieved in addition to the operation and effects of a case in which the push plate 70 illustrated in previously-described FIG. 67 is used. By providing the rib 342 at the upper edge portion of the base portion 306 of the push plate 70, the rigidity of the push plate 70 in the longitudinal direction can be increased. As a result, the tensile strength applied to the push plate 70 at the time of ordinary operation of the brake pedal 10 can be increased, and the compressive strength applied to the push plate 70 at the time that an external force of a predetermined value or more is applied from the front of the vehicle can be increased. Accordingly, the operational feeling during ordinary operation of the brake pedal 10 can be improved, and the pushability of the rotating shaft portion 68 by the push plates 70 can be improved.

The operation and effects of providing the rib 342 are as described above. In a case in which the rib 342 is merely provided at the upper edge portion of the base portion 306 of the push plate 70, the appropriate bendability of the push plate 70, which is the original object, may be hindered. However, in accordance with the present embodiment, the structure is employed in which the rib 342 is welded to the base portion 306 at regions other than the region 344 directly above the cut-out portion 334. Therefore, the decrease in the rigidity due to the provision of the cut-out portion 334 is maintained as is. Accordingly, a satisfactory bending performance of the push plate 70 can also be maintained.

Hereinafter, a fourteenth embodiment of the present invention will be described with reference to FIGS. 69 through 71.

In the present embodiment, a structure for preventing deformation of the pedal bracket, in the rotating direction as viewed from above, at the time the pedal bracket buckles is added.

Figure 69:
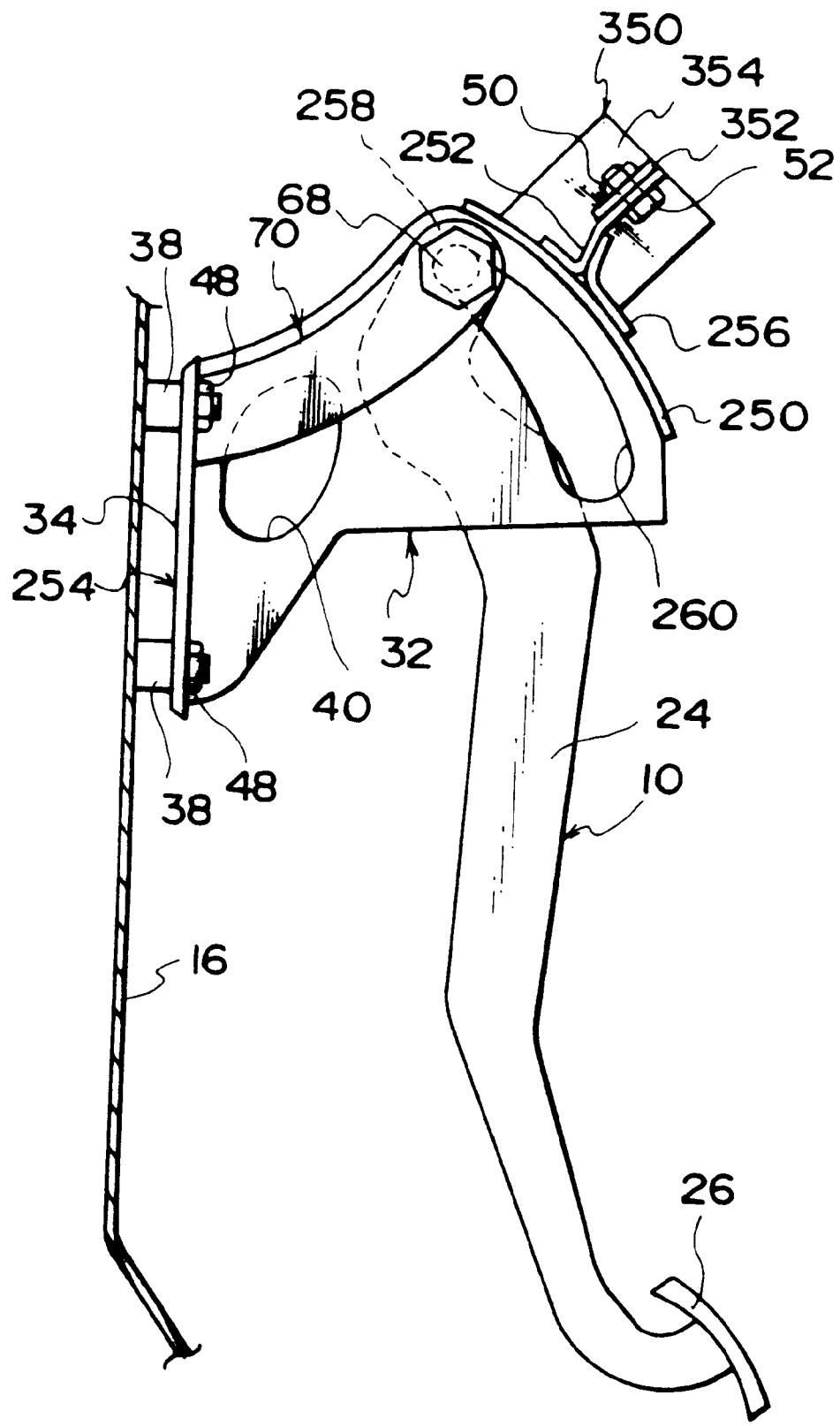
FIG. 69 is a side view focusing on a bracket at the vehicle body and illustrating a supporting structure of a pedal device for a vehicle relating to a fourteenth embodiment.
Figure 70:
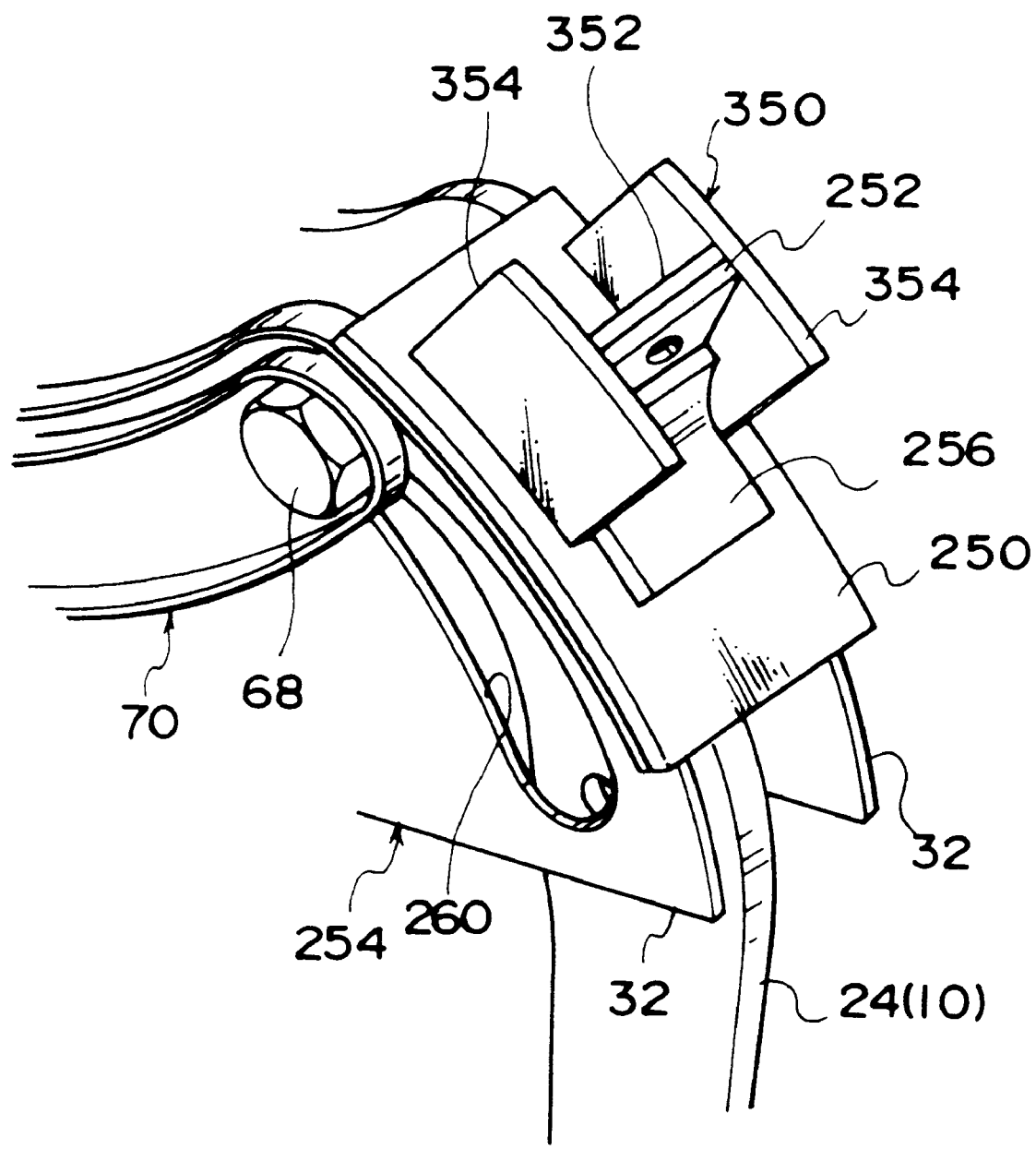
FIG. 70 is a perspective view of principal portions of the structure illustrated in FIG. 69.

More specifically, in the embodiment illustrated in FIGS. 69 and 70, a bracket 350 at the vehicle body, which is the portion to which the rear end side of the pedal bracket 254 is assembled, is formed in a substantially H-shaped configuration by a fixing portion 352 and a pair of rotation regulating portions 354 which are fixed to the end portions of the fixing portion 352 such that the surface directions of the rotation regulating portions 354 are substantially orthogonal to the fixing portion 352. The rear end fixing plate 252 of the pedal bracket 254 is fit to the fixing portion 352. In this state, the rear end fixing plate 252 and the fixing portion 352 are fastened by the mounting bolt 52 and the welding nut 50. In the state in which the rear end fixing plate 252 is fixed to the fixing portion 352, the pair of rotation regulating portions 354 are disposed so as to orthogonally abut the end portions of the rear end fixing plate 252. The bracket 350 at the vehicle body is fixed in advance by welding or the like to the cowl inner panel or the instrument panel reinforcement.

When the pedal bracket 254 buckles in the longitudinal direction as the dash panel 16 is displaced rearward when an external force of a predetermined value or greater is applied from the front of the vehicle, as described above, because the rear end fixing plate 252 of the pedal bracket 254 is usually fixed to the bracket 44 at the vehicle body at one place by the mounting bolt 52 and the weld nut 50 (see FIG. 52), rotational force in the direction of rotation as seen in plan view acts on the pedal bracket 254 in accordance with the way in which the dash panel 16 deforms, and the bracket 44 at the vehicle body rotates in the same direction. In this case, there is the concern that the bracket 44 at the vehicle body will interfere with an unillustrated steering support due to the rotation of the bracket 44 at the vehicle body.

However, in accordance with the present embodiment, both end portions of the rear end fixing plate 252 fixed to the pedal bracket 254 are pushed in by the pair of rotation regulating portions 354 of the bracket 350 at the vehicle body. Therefore, even if rotational force acts on the pedal bracket 254, the pedal bracket 254 does not deform in the rotating direction as seen in plan view. As a result, the rotating shaft portion 68 can be moved smoothly substantially toward the rear of the vehicle and downwardly. Therefore, in the present embodiment as well, control can be carried out such that the pedal pad 26 of the brake pedal 10 is displaced substantially toward the front of the vehicle, and the driver's knee can be kept away from the steering column.

In accordance with the present embodiment, because the pair of rotation regulating portions 354 are provided at the bracket 350 at the vehicle body, rotation of the pedal bracket 254 as seen in plan view can be regulated by a simple structure.

Figure 71:
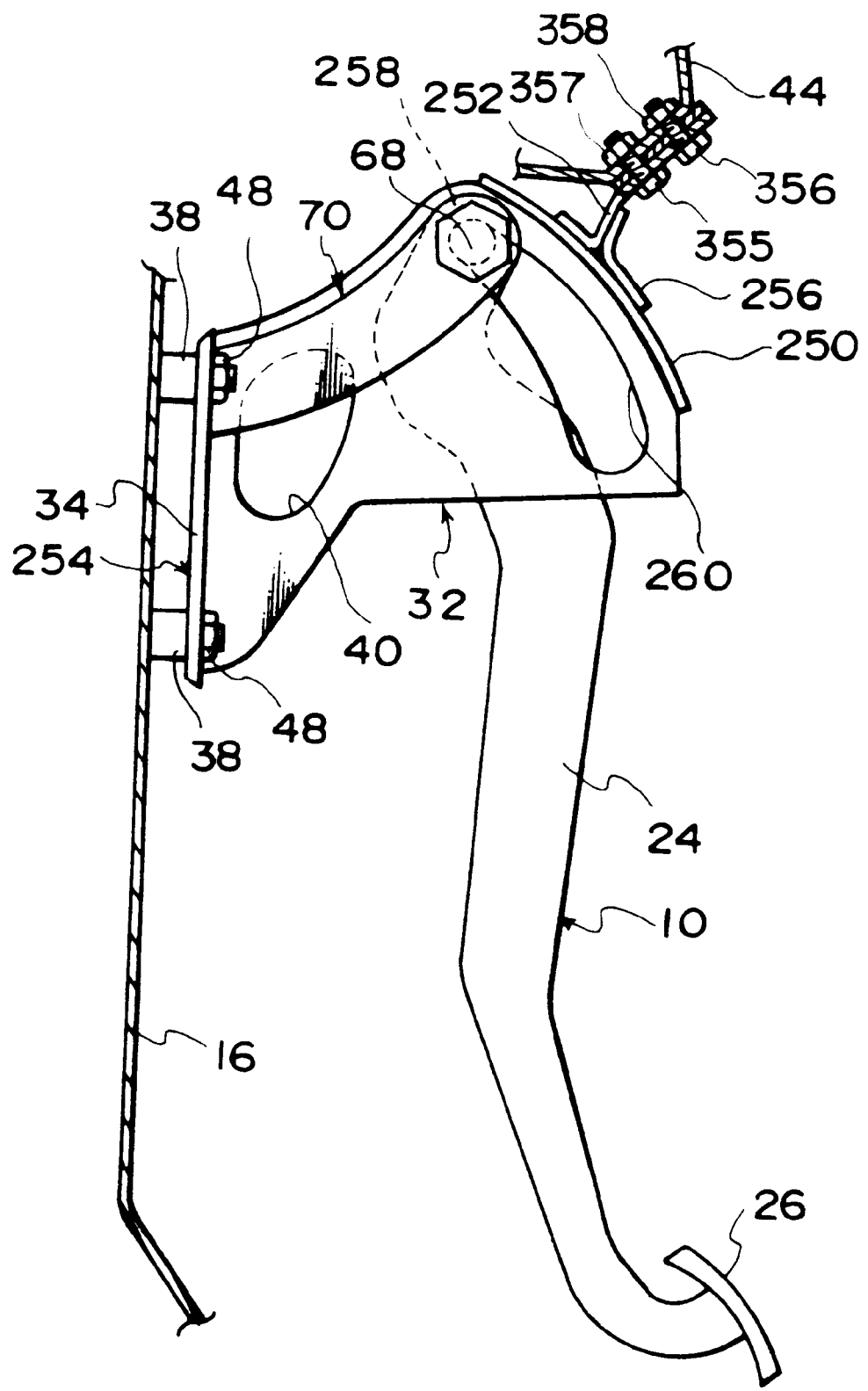
FIG. 71 is a side view corresponding to FIG. 69 and illustrating an embodiment in which, in place of the bracket at the vehicle body illustrated in FIG. 69, there are two fastening points in the longitudinal direction.

The bracket 44 at the vehicle body, which has the substantially U-shaped cross-section and which is used in the previously-described embodiment, is used in the embodiment illustrated in FIG. 71. However, in the embodiment of FIG. 71, the rear end fixing plate 252 of the pedal bracket 254 and the bracket 44 at the vehicle body are fixed together in two places substantially along the longitudinal direction of the vehicle by mounting bolts 355, 356 and weld nuts 357, 358.

Accordingly, the same operation and effects as those in a case in which the bracket 350 at the vehicle body is used are obtained in accordance with the present structure as well.

A fifteenth embodiment of the present invention will be described hereinafter on the basis of FIG. 72.

In the fifteenth embodiment, a structure for suppressing the deformation of the elongated holes caused by the buckling of the pedal bracket is added.

Figure 72:
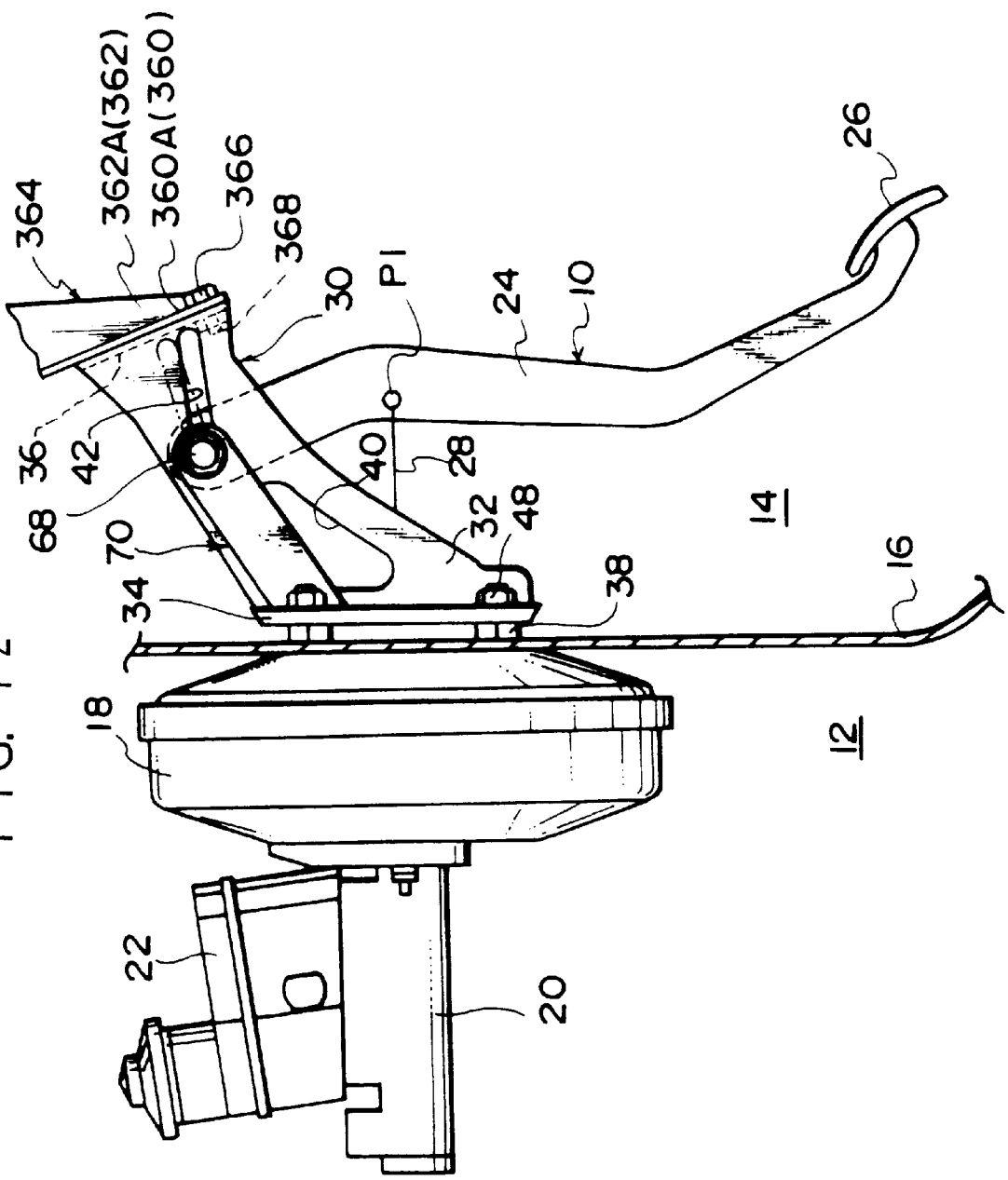
FIG. 72 is a side view focusing on a bracket at the vehicle body and illustrating a supporting structure of a pedal device for a vehicle relating to a fifteenth embodiment.

More specifically, as illustrated in FIG. 72, a bracket 364 at the vehicle body, which is formed from a mounting portion 360 having high rigidity and a pair of side portions 362 positioned vertically at the end portions of the mounting portion 360, is used. The bracket 364 at the vehicle body extends to the lower end portion of the rear plate 36 of the pedal bracket 30. (Hereinafter, these regions are referred to as "mounting portion extended portion 360A" and "side portion extended portions 362A".) The mounting portion extended portion 360A of the bracket 364 at the vehicle side is fixed to the lower end portion of the rear plate 36 of the pedal bracket 30 by a bolt 366 and a nut 368. From the standpoint of load support, it is preferable that the region of fixing by the bolt 366 and the nut 368 is set to be on a horizontal plane which passes through the vertical direction center of the base plate 34 of the pedal bracket 30.

When the side plates 32 of the pedal bracket 30 buckle in the longitudinal direction due to the rearward displacement of the dash panel 16 at the time an external force of a predetermined value or greater is applied from the front of the vehicle, in accordance with the way in which the dash panel 16 deforms, the side plates 32 may buckle such that the elongated holes 42 are raised upward toward the top of the vehicle (refer to the two-dot chain line in FIG. 72), and smooth movement of the rotating shaft portion 68 substantially toward the rear of the vehicle may be hindered. However, in accordance with the present embodiment, the mounting portion extended portion 360A and the side portion extended portions 362A are provided at the bracket 364 at the vehicle side for fixing the rear end side of the pedal bracket 30 to the vehicle body. Because these extended portions are fixed to the lower end portion of the rear plate 36 of the pedal bracket 30, the support strength at the rear end side of the pedal bracket 30 can be increased. Accordingly, the deformation of the elongated holes 42 which accompanies the buckling of the pedal bracket 30 can be suppressed, and the rotating shaft portion 68 can be smoothly moved substantially toward the rear of the vehicle and downwardly. As a result, in the present embodiment as well, control can be effected such that the pedal pad 26 of the brake pedal 10 is displaced substantially toward the front of the vehicle, and the driver's knee can be kept away from the steering column.

A sixteenth embodiment of the present invention is described hereinafter with reference to FIGS. 73 through 76.

A structure for applying rotational force to the brake pedal substantially toward the front of the vehicle around the rotating shaft portion by using a brake switch supporting structure is added in the present embodiment.

Figure 73:
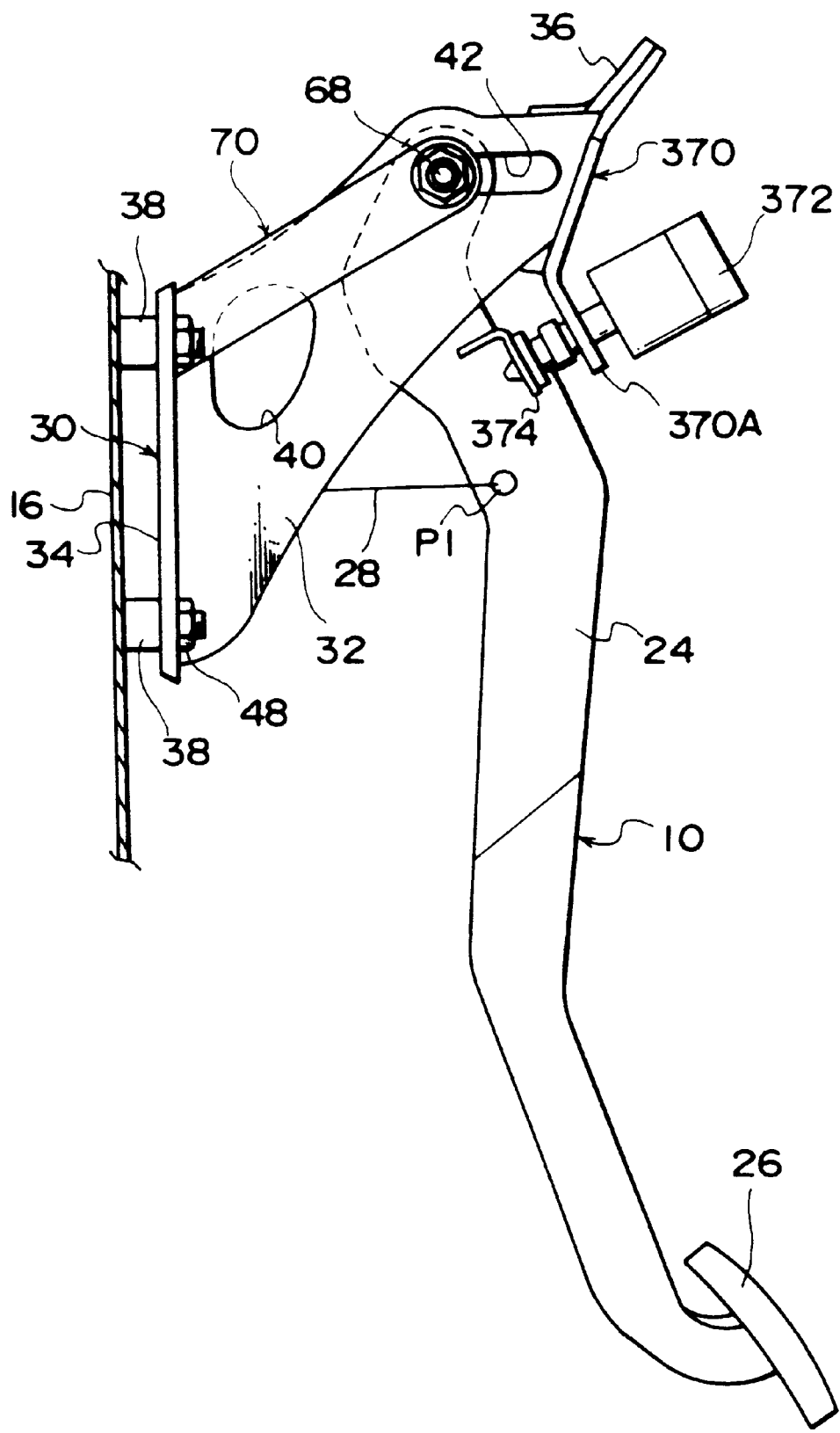
FIG. 73 is a side view focusing on a brake switch bracket and illustrating a supporting structure of a pedal device for a vehicle relating to a sixteenth embodiment.
Figure 74:
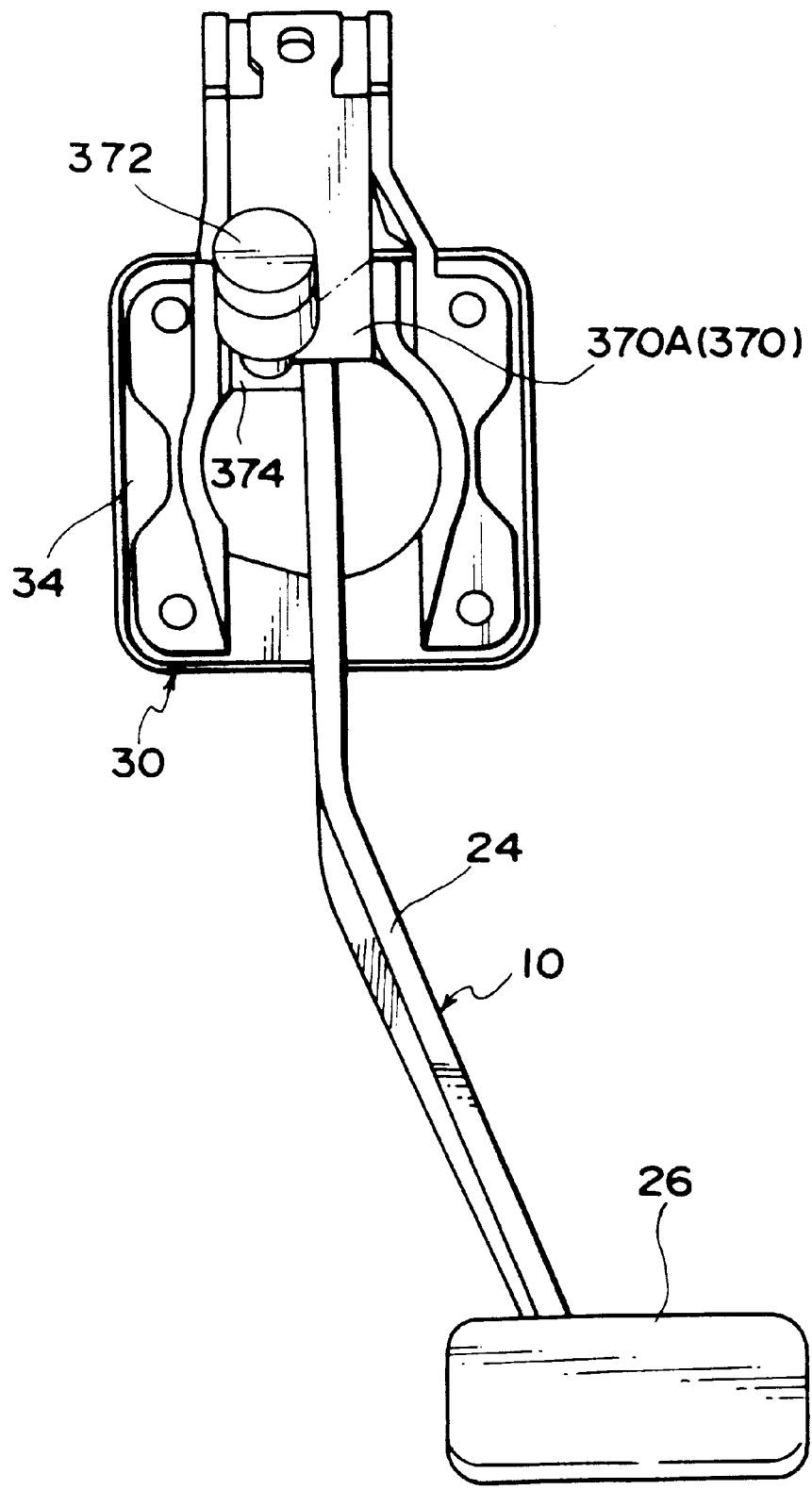
FIG. 74 is a rear view of the structure illustrated in FIG. 73.

As illustrated in FIGS. 73 and 74, a brake switch bracket 370, which extends toward the bottom of the vehicle, is fixed at the reverse side of the rear plate 36 of the pedal bracket 30. A brake switch 372 is mounted to the lower end portion of the brake switch bracket 370. An angled bracket 374 at the pedal for turning the brake switch 372 on and off is fixed to a side surface of the pedal supporting portion 24 of the brake pedal 10. In this way, when the brake pedal 10 is operated, the brake switch 372 is turned on due to the motive force of the bracket 374 at the pedal, and it is detected that the brake pedal 10 is being operated.

In the present embodiment, the plate thickness of the plate switch bracket 370 is set to be thicker than usual (e.g., the plate thickness of the plate switch bracket 370 is set to 4 mm). Accordingly, the rigidity of the brake switch bracket 370 in the longitudinal direction is higher than in usual cases. Further, a lower end portion 370A of the brake switch bracket 370 extends in the transverse direction. For reference, the outer configuration and the position of the lower end portion 370A of a conventional brake switch bracket 370 are illustrated by the two-dot chain line in FIG. 74.

As the dash panel 16 is displaced rearward at the time an external force of a predetermined value or greater is applied from the front of the vehicle, the rotating shaft portion 68 is moved substantially toward the rear of the vehicle along the elongated holes 42 by the push plates 70. At this time, due to the movement of the rotating shaft portion 68 substantially toward the rear of the vehicle, force in the same direction is applied to the pedal supporting portion 24 of the brake pedal 10. This force is applied to the brake switch 372 from the bracket 374 at the pedal, and is also applied to the brake switch bracket 370.

Here, in the present embodiment, because the plate thickness of the brake switch bracket 370 is increased and the brake switch bracket 370 is made more rigid, a reaction force substantially toward the front of the vehicle is applied to the pedal supporting portion 24 of the brake pedal 10 from the brake switch bracket 370. Moreover, because the lower end portion 370A of the brake switch bracket 370 is extended in the transverse direction in the present embodiment, even if the bracket 374 at the pedal were to deform due to the reaction force from the brake switch bracket 370, the pedal supporting portion 24 would directly abut the lower end portion 370A of the brake switch bracket 370, and a reaction force substantially toward the front of the vehicle would be applied to the brake pedal 10. Accordingly, in accordance with the present embodiment, reaction force substantially toward the front of the vehicle can be applied to the brake pedal 10 from the brake switch bracket 370 at the time the rotating shaft portion 68 moves rearward. As a result, in the present embodiment as well, control can be effected such that the pedal pad 26 of the brake pedal 10 is displaced substantially toward the front of the vehicle, and the driver's knee can be kept away from the steering column.

Figure 75:
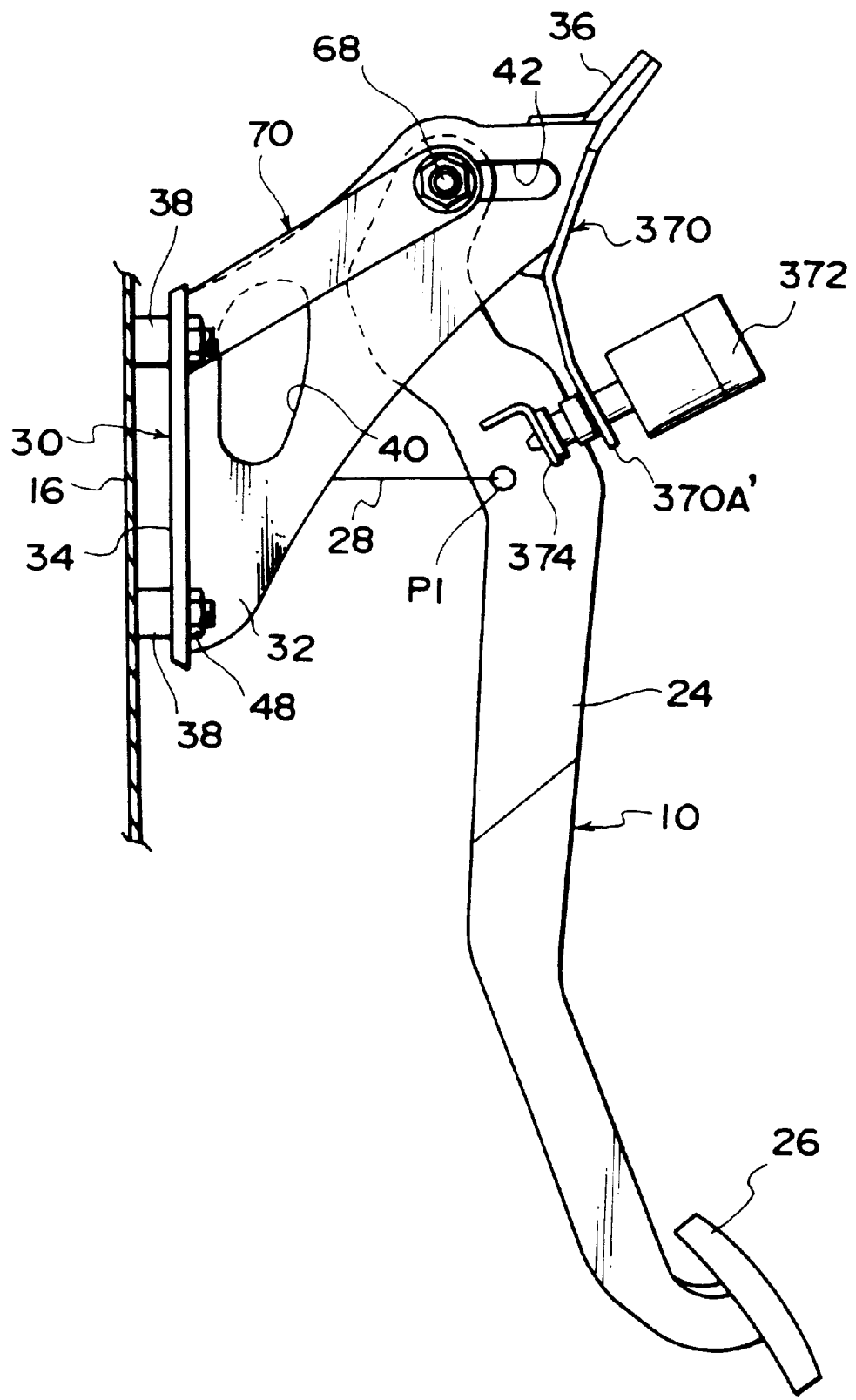
FIG. 75 is a side view corresponding to FIG. 73 and illustrating an embodiment in which a lower end portion of a brake switch bracket in the structure illustrated in FIG. 73 is extended downwardly.
Figure 76:
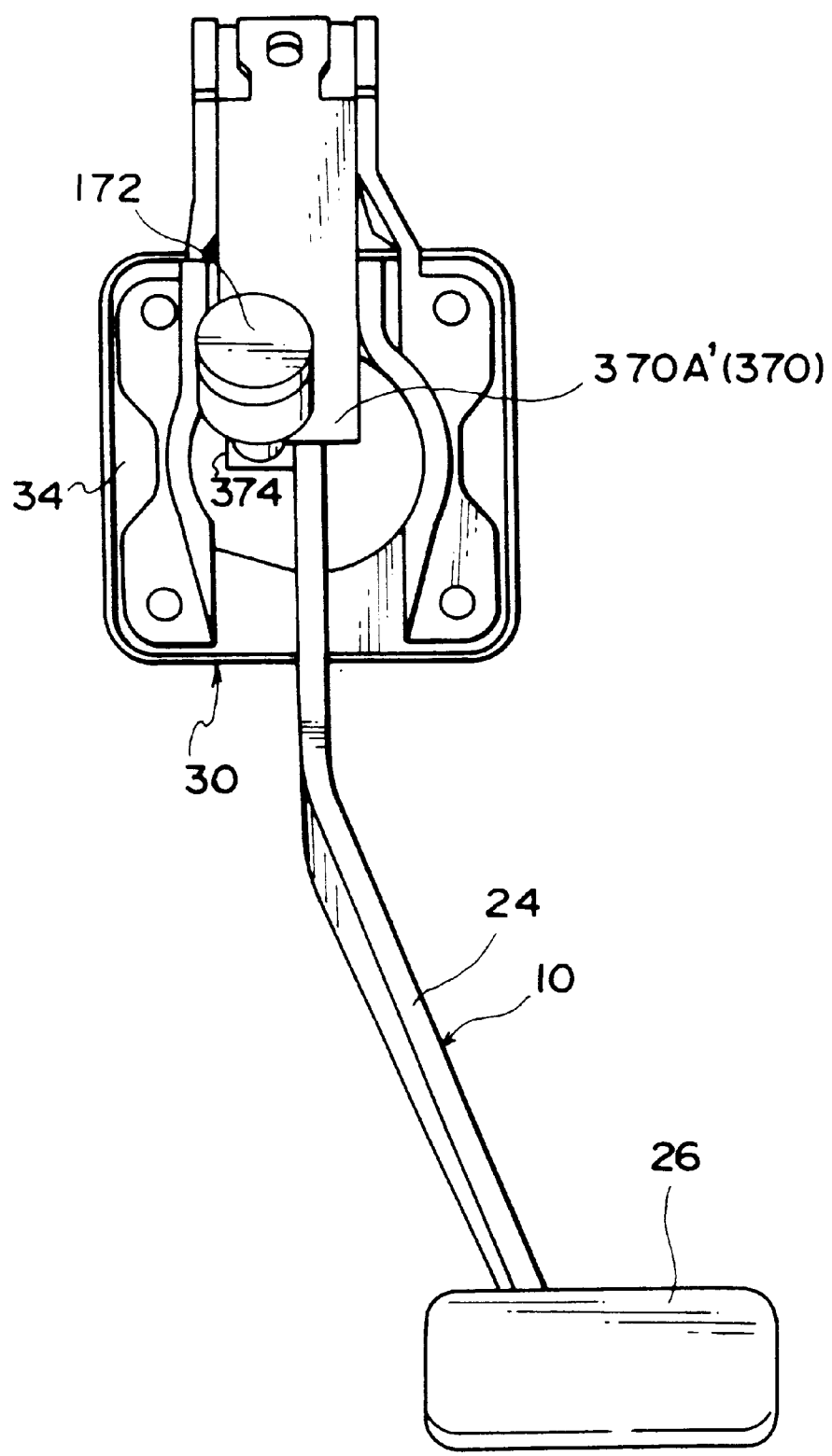
FIG. 76 is a rear view of the structure illustrated in FIG. 75.
Figure 77:
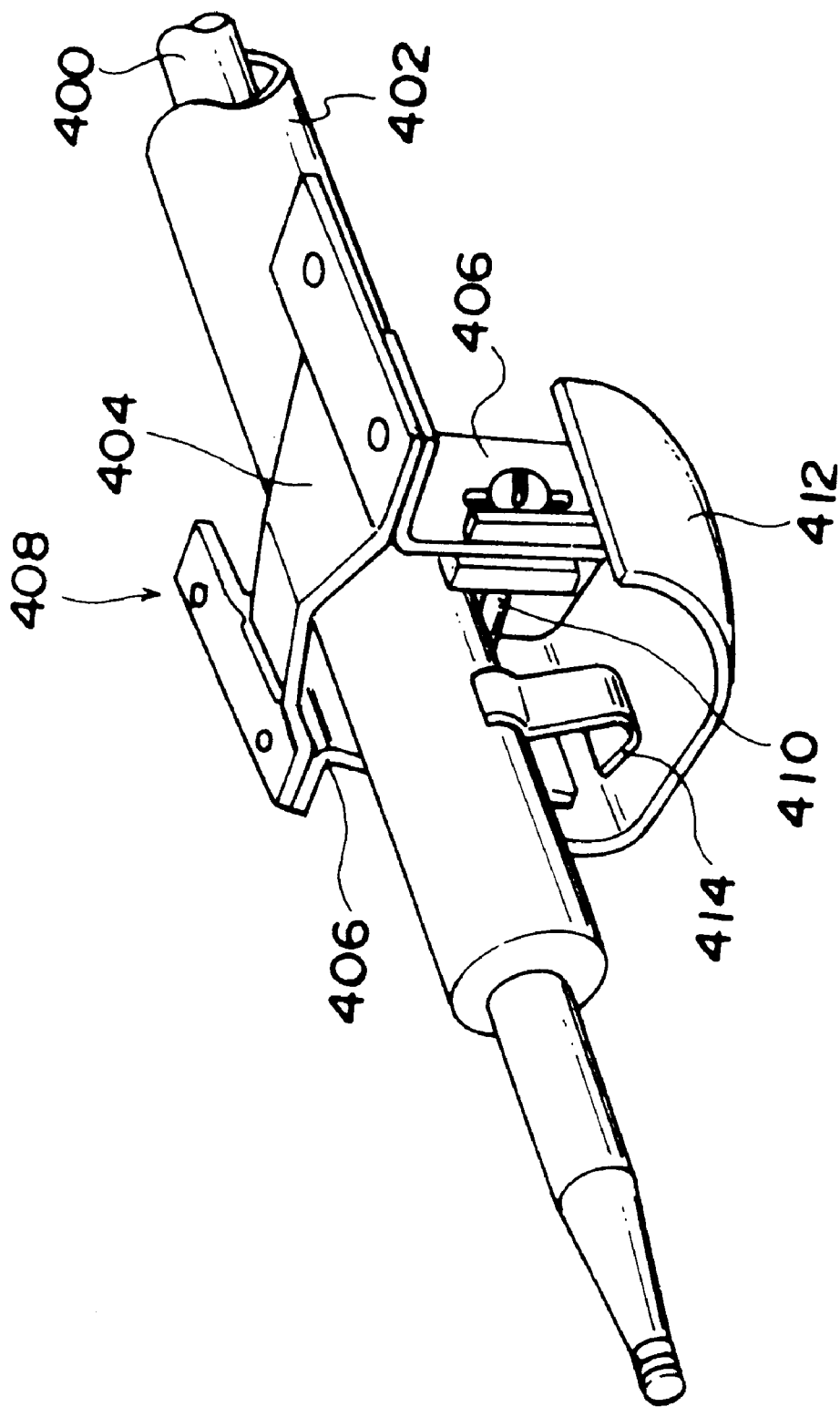
FIG. 77 is a perspective view illustrating a conventional structure.

In the embodiment illustrated in FIGS. 75 and 76, although the plate thickness of the brake switch bracket 370 is slightly smaller than in the above-described structure, a lower end portion 370A' of the brake switch bracket 370 is extended to a vicinity of the connecting point (P1) of the brake pedal 10 and the push rod 28. As a result, the reaction force applied to the brake pedal 10 from the brake switch bracket 370 can be applied to the vicinity of the connecting point (P1) of the brake pedal 10 and the push rod 28, and rotational force substantially toward the front of the vehicle can be effectively applied to the vicinity of the connecting point (P1). Accordingly, the displacement of the pedal pad 26 of the brake pedal 10 substantially toward the front of the vehicle due to the movement of the rotating shaft portion 68 along the elongated holes 42 can be promoted.

What is claimed is:

1. A supporting structure of a pedal device for a vehicle comprising:

a pedal bracket fixed to a vehicle body and supporting a rotating shaft portion of the pedal device, the rotating shaft portion being a center of rotation of the pedal device;

a swinging link supported at said pedal bracket so as to be swingable around the rotating shaft portion, one end portion of said swinging link being connected to an operational force transmitting means which transmits, to a stepping force augmenting means, a stepping force applied to a stepping surface of the pedal device;

linking means for transmitting, to the operational force transmitting means, rotational force toward a front of the vehicle around the center of rotation of the pedal device by linking another end portion of said swinging link with an end portion of the pedal device at a side opposite the stepping surface of the pedal device; and displacement controlling means for transmitting to a rotating shaft portion of said swinging link external force of a predetermined value or greater at the time when the external force is applied to a front portion of the vehicle, and controlling displacement of the stepping surface of the pedal device via said linking means such that the rotating shaft portion of said swinging link is moved toward a rear of the vehicle.

2. A supporting structure of a pedal device for a vehicle according to claim 1, wherein said displacement controlling means has:

connecting means for connecting the rotating shaft portion and a load receiving portion which is disposed further toward a front of the vehicle than the pedal device and which is displaced toward the rear of the vehicle by receiving external force of a predetermined value or greater applied to the front portion of the vehicle, a rigidity of said connecting means in a longitudinal direction of the vehicle being set higher than a rigidity of said pedal bracket in the longitudinal direction of the vehicle; and guiding means, provided at said pedal bracket, for guiding movement of the rotating shaft portion toward the rear of the vehicle.

* * * * *